United States Patent
Doulton

(10) Patent No.: US 8,989,713 B2
(45) Date of Patent: Mar. 24, 2015

(54) SELECTION OF A LINK IN A RECEIVED MESSAGE FOR SPEAKING REPLY, WHICH IS CONVERTED INTO TEXT FORM FOR DELIVERY

(75) Inventor: Daniel Michael Doulton, Buckinghamshire (GB)

(73) Assignee: Nuance Communications, Inc., Burlington, MA (US)

( * ) Notice: Subject to any disclaimer, the term of this patent is extended or adjusted under 35 U.S.C. 154(b) by 114 days.

(21) Appl. No.: 13/302,342

(22) Filed: Nov. 22, 2011
(Under 37 CFR 1.47)

(65) Prior Publication Data
US 2013/0165086 A1   Jun. 27, 2013

Related U.S. Application Data

(63) Continuation of application No. 13/087,689, filed on Apr. 15, 2011, now abandoned, which is a continuation of application No. 12/873,733, filed on Sep. 1, 2010, now abandoned, which is a continuation of application No. 12/522,544, filed as application No. PCT/GB2008/000047 on Jan. 9, 2008, now abandoned.

(51) Int. Cl.
*H04M 3/42* (2006.01)
*H04L 12/58* (2006.01)
(Continued)

(52) U.S. Cl.
CPC .......... *H04L 12/5835* (2013.01); *H04W 4/12* (2013.01); *G06Q 10/107* (2013.01);
(Continued)

(58) Field of Classification Search
USPC .......... 455/414.4, 412.1, 413, 417, 445, 466, 455/406; 379/88.11, 88.14, 88.16, 88.19
See application file for complete search history.

(56) References Cited

U.S. PATENT DOCUMENTS

| 5,121,421 | A | 6/1992 | Alheim |
|---|---|---|---|
| 5,163,081 | A | 11/1992 | Wycherley et al. |

(Continued)

FOREIGN PATENT DOCUMENTS

| EP | 0 876 043 A2 | 11/1998 |
|---|---|---|
| EP | 0 917 038 A2 | 5/1999 |

(Continued)

OTHER PUBLICATIONS

Extended European Search Report dated Oct. 21, 2011 for European Application No. 11 151 739.7.

(Continued)

*Primary Examiner* — Kashif Siddiqui
(74) *Attorney, Agent, or Firm* — Wolf, Greenfield & Sacks, P.C.

(57) ABSTRACT

A link, called an X-Link™ and is placed in a message (SMS, MMS, email etc.) that is sent to a user and displayed on their device (e.g. mobile telephone). When the link is selected by the user, it connects the user's device to a conversion system, enabling the user to speak a reply which is then converted to a text based reply message; the reply message is then sent to the original message sender (and/or another appropriate recipient). This approach enables a text message to be responded to by voice: it is an example of an asymmetric communication. There are many circumstances where this approach is very useful—for example if the message is a SMS and the recipient does not know how to respond using SMS, or is in an environment where it is difficult (perhaps when walking or driving).

22 Claims, 35 Drawing Sheets

(51) Int. Cl.
*H04W 4/12* (2009.01)
*G06Q 10/10* (2012.01)
*H04M 3/533* (2006.01)
*H04M 3/537* (2006.01)

(52) U.S. Cl.
CPC ........ *H04L 51/066* (2013.01); *H04M 3/42382* (2013.01); *H04M 3/533* (2013.01); *H04M 3/537* (2013.01); *H04L 12/5895* (2013.01); *H04M 2201/60* (2013.01); *H04M 2203/651* (2013.01)
USPC ......... 455/414.1; 455/413; 455/466; 704/235

(56) References Cited

U.S. PATENT DOCUMENTS

| | | |
|---|---|---|
| 5,557,639 A | 9/1996 | Heikkila et al. |
| 5,712,901 A | 1/1998 | Meermans |
| 5,729,741 A | 3/1998 | Liaguno et al. |
| 5,805,771 A | 9/1998 | Muthusamy et al. |
| 5,867,562 A | 2/1999 | Scherer |
| 5,909,482 A | 6/1999 | Engelke |
| 5,940,794 A | 8/1999 | Abe |
| 6,236,717 B1 | 5/2001 | Bremer et al. |
| 6,240,170 B1 | 5/2001 | Shaffer et al. |
| 6,240,391 B1 | 5/2001 | Ball et al. |
| 6,289,085 B1 | 9/2001 | Miyashita et al. |
| 6,385,306 B1 | 5/2002 | Baxter, Jr. |
| 6,408,176 B1 | 6/2002 | Urs |
| 6,449,342 B1 | 9/2002 | Johanson |
| 6,507,643 B1 | 1/2003 | Groner |
| 6,507,735 B1 | 1/2003 | Baker et al. |
| 6,513,003 B1 | 1/2003 | Angell et al. |
| 6,535,849 B1 | 3/2003 | Pakhomov et al. |
| 6,567,506 B1 | 5/2003 | Kermani |
| 6,570,964 B1 | 5/2003 | Murveit et al. |
| 6,606,373 B1 | 8/2003 | Martin |
| 6,687,339 B2 | 2/2004 | Martin |
| 6,724,864 B1 | 4/2004 | Denenberg et al. |
| 6,775,651 B1 | 8/2004 | Lewis et al. |
| 6,781,962 B1 | 8/2004 | Williams et al. |
| 6,873,687 B2 | 3/2005 | Smith, II |
| 6,987,840 B1 | 1/2006 | Bosik et al. |
| 7,013,155 B1 | 3/2006 | Ruf et al. |
| 7,167,701 B1 | 1/2007 | Jordan, Jr. |
| 7,190,950 B1 | 3/2007 | Baker et al. |
| 7,451,082 B2 | 11/2008 | Gong et al. |
| 7,502,731 B2 | 3/2009 | Emonts et al. |
| 7,873,519 B2 | 1/2011 | Bennett |
| 8,296,139 B2 | 10/2012 | Da Palma et al. |
| 8,374,863 B2 | 2/2013 | Doulton |
| 8,509,825 B2 | 8/2013 | Doulton |
| 8,654,933 B2 | 2/2014 | Doulton |
| 8,682,304 B2 | 3/2014 | Doulton |
| 8,750,463 B2 | 6/2014 | Doulton |
| 2002/0055950 A1 | 5/2002 | Witteman |
| 2002/0067808 A1 | 6/2002 | Agraharam et al. |
| 2002/0087569 A1 | 7/2002 | Fischer et al. |
| 2002/0131566 A1 | 9/2002 | Stark et al. |
| 2002/0152071 A1 | 10/2002 | Chaiken et al. |
| 2002/0161579 A1 | 10/2002 | Saindon et al. |
| 2002/0165713 A1 | 11/2002 | Skoglund et al. |
| 2002/0181669 A1 | 12/2002 | Takatori et al. |
| 2002/0188467 A1 | 12/2002 | Eke |
| 2003/0028602 A1 | 2/2003 | Bhattacharya |
| 2003/0033294 A1 | 2/2003 | Walker et al. |
| 2003/0134648 A1 | 7/2003 | Reed et al. |
| 2004/0025192 A1 | 2/2004 | Angel et al. |
| 2004/0252679 A1 | 12/2004 | Williams et al. |
| 2004/0260533 A1 | 12/2004 | Wakita et al. |
| 2005/0010407 A1 | 1/2005 | Jaroker |
| 2005/0047561 A1 | 3/2005 | Seiferth |
| 2005/0053201 A1 | 3/2005 | Bhargava et al. |
| 2005/0060088 A1 | 3/2005 | Helal et al. |
| 2005/0114129 A1 | 5/2005 | Watson et al. |
| 2005/0131676 A1 | 6/2005 | Ghasemi et al. |
| 2005/0131884 A1 | 6/2005 | Gross et al. |
| 2005/0136955 A1* | 6/2005 | Mumick et al. ............... 455/466 |
| 2005/0176451 A1 | 8/2005 | Helferich |
| 2005/0195798 A1 | 9/2005 | Kirkland et al. |
| 2005/0232402 A1 | 10/2005 | Greve |
| 2005/0238148 A1 | 10/2005 | Poustchi et al. |
| 2006/0026003 A1 | 2/2006 | Carus et al. |
| 2006/0058049 A1 | 3/2006 | McLaughlin et al. |
| 2006/0128409 A1 | 6/2006 | Gress et al. |
| 2006/0136375 A1 | 6/2006 | Cox et al. |
| 2006/0193450 A1 | 8/2006 | Flynt et al. |
| 2006/0217978 A1 | 9/2006 | Mitby et al. |
| 2006/0223502 A1 | 10/2006 | Doulton |
| 2007/0047702 A1 | 3/2007 | Newell et al. |
| 2007/0054678 A1* | 3/2007 | Doulton ............... 455/466 |
| 2007/0116204 A1 | 5/2007 | Doulton |
| 2007/0117543 A1 | 5/2007 | Doulton |
| 2007/0117544 A1 | 5/2007 | Doulton |
| 2007/0117545 A1 | 5/2007 | Doulton |
| 2007/0117546 A1 | 5/2007 | Doulton |
| 2007/0117547 A1 | 5/2007 | Doulton |
| 2007/0123280 A1* | 5/2007 | McGary et al. ............... 455/466 |
| 2007/0127638 A1 | 6/2007 | Doulton |
| 2007/0127688 A1 | 6/2007 | Doulton |
| 2007/0143103 A1 | 6/2007 | Asthana et al. |
| 2007/0177717 A1 | 8/2007 | Owens et al. |
| 2007/0219978 A1 | 9/2007 | Myers |
| 2007/0260454 A1 | 11/2007 | Gemello et al. |
| 2008/0049906 A1 | 2/2008 | Doulton |
| 2008/0049907 A1 | 2/2008 | Doulton |
| 2008/0049908 A1 | 2/2008 | Doulton |
| 2008/0052070 A1 | 2/2008 | Doulton |
| 2008/0052071 A1 | 2/2008 | Doulton |
| 2008/0063155 A1 | 3/2008 | Doulton |
| 2008/0109221 A1 | 5/2008 | Doulton |
| 2008/0133219 A1 | 6/2008 | Doulton |
| 2008/0133231 A1 | 6/2008 | Doulton |
| 2008/0133232 A1 | 6/2008 | Doulton |
| 2008/0162132 A1 | 7/2008 | Doulton |
| 2008/0205605 A1 | 8/2008 | Gao et al. |
| 2009/0052636 A1 | 2/2009 | Webb et al. |
| 2009/0144048 A1 | 6/2009 | Dvorin et al. |
| 2009/0170478 A1 | 7/2009 | Doulton |
| 2009/0248415 A1 | 10/2009 | Jablokov et al. |
| 2009/0292539 A1 | 11/2009 | Jaroker |
| 2010/0057435 A1 | 3/2010 | Kent et al. |
| 2010/0094657 A1 | 4/2010 | Stern et al. |
| 2010/0119045 A1 | 5/2010 | Caputo et al. |
| 2010/0150322 A1 | 6/2010 | Yin et al. |
| 2010/0158214 A1 | 6/2010 | Gravino et al. |
| 2010/0217591 A1 | 8/2010 | Shpigel |
| 2012/0202535 A1 | 8/2012 | Chaddha et al. |
| 2012/0296650 A1 | 11/2012 | Bates et al. |
| 2013/0041646 A1 | 2/2013 | Farley et al. |
| 2013/0128820 A1 | 5/2013 | Yuan et al. |
| 2013/0144619 A1 | 6/2013 | Lord et al. |
| 2013/0286900 A1 | 10/2013 | Castell et al. |
| 2014/0006028 A1 | 1/2014 | Hu |

FOREIGN PATENT DOCUMENTS

| | | |
|---|---|---|
| EP | 1 139 677 A2 | 10/2001 |
| GB | 2 323 693 A | 9/1998 |
| GB | 2 334 404 A | 8/1999 |
| GB | 2 364 850 A | 2/2002 |
| GB | 2 420 942 A | 6/2006 |
| JP | 09-321914 A | 12/1997 |
| JP | 2002-368885 A | 12/2002 |
| WO | WO 98/05154 A1 | 2/1998 |
| WO | WO 99/56275 A1 | 11/1999 |
| WO | WO 01/69905 A1 | 9/2001 |
| WO | WO 02/23872 A1 | 3/2002 |
| WO | WO 02/061730 A1 | 8/2002 |
| WO | WO 03/023766 A2 | 3/2003 |
| WO | WO 2004/095814 A1 | 11/2004 |
| WO | WO 2004/095821 A2 | 11/2004 |
| WO | WO 2005/114656 A1 | 12/2005 |

(56) References Cited

OTHER PUBLICATIONS

UK Combined Search and Examination Report Under Sections 17 & 18(3) dated Oct. 29, 2004 for GB0408988.4.

International Search Report and International Preliminary Report on Patentability for PCT/GB2004/001805 dated Mar. 10, 2005 and Aug. 17, 2005 respectively.

European Search Report and Search Opinion dated Oct. 11, 2012 for European Application No. 12 17 5610.

European Search Report and Search Opinion dated Oct. 4, 2012 for European Application No. 12 17 5598.

Extended European Search Report and Search Opinion dated Oct. 4, 2012 for European Application No. 12 17 5603.

International Search Report mailed May 25, 2007 for International Application No. PCT/GB2007/000483.

International Preliminary Report on Patentability and Written Opinion mailed Aug. 12, 2008 for International Application No. PCT/GB2007/000483.

International Preliminary Report on Patentability dated Jul. 14, 2009 for International Application No. PCT/GB2008/000047.

Belkin et al., Translating Voice Mail to Text for Short Message Delivery. IP.com J. May 15, 2002.

Koumpis et al., An Advanced Integrated Architecture for Wireless Voicemail Data Retrieval. Proc Intl Conf Info Netw. Jan. 31, 2001; 403-10.

User's Guide: Nokia 3330. Nokia Mobile Phones. 9353142, Issue 2. Copyright 2001. <http://nds1.nokia.com/phones/files/guides/3330_usersguide_en.pdf>.

* cited by examiner

SELECTION OF A LINK IN A RECEIVED MESSAGE FOR SPEAKING REPLY, WHICH IS CONVERTED INTO TEXT FORM FOR DELIVERY

RELATED APPLICATIONS

This application claims priority under 35 U.S.C. §120 and is a continuation of U.S. patent application Ser. No. 13/087,689, filed Apr. 15, 2011, entitled "SELECTION OF A LINK IN A RECEIVED MESSAGE FOR SPEAKING REPLY, WHICH IS CONVERTED INTO TEXT FOR DELIVERY," which claims priority under 35 U.S.C. §120 and is a continuation of U.S. patent application Ser. No. 12/873,733, filed Sep. 1, 2010, entitled "SELECTION OF A LINK IN A RECEIVED MESSAGE FOR SPEAKING REPLY, WHICH IS CONVERTED INTO TEXT FOR DELIVERY," which claims priority under 35 U.S.C. §120 and is a continuation of U.S. patent application Ser. No. 12/522,544, filed Jul. 9, 2009, entitled "SELECTION OF A LINK IN A RECEIVED MESSAGE FOR SPEAKING REPLY, WHICH IS CONVERTED INTO TEXT FOR DELIVERY," which claims priority to International Patent Application No. PCT/GB2008/000047, filed Jan. 9, 2008, entitled "SELECTION OF A LINK IN A RECEIVED MESSAGE FOR SPEAKING REPLY, WHICH IS CONVERTED INTO TEXT FOR DELIVERY," which claims priority to British Application No. GB0700376.7 filed Jan. 9, 2007, and British Application No. GB0700379.1 filed Jan. 9, 2007, and British Application No. GB0702706.3 filed Feb. 12, 2007, and British Application No. GB0708658.0 filed May 4, 2007, and British Application No. GB0717246.3 filed Sep. 5, 2007, and British Application No. GB717247.1 filed Sep. 5, 2007, and British Application No. GB0717249.7 filed Sep. 5, 2007, and British Application No. GB0717250.5 filed Sep. 5, 2007, the contents of all of which are incorporated herein by reference.

BACKGROUND OF THE INVENTION

1. Field of the Invention

This invention relates to a method of replying to an electronically-received message; the message is sent from an original message sender to a user who receives the message using electrical hardware. The electrical hardware includes, without limitation, mobile telephones, smart phones, communicators, wireless messaging terminals, personal computers, computers and application specific devices. It includes devices able to communicate in any manner over any kind of network, such as GSM or UMTS, CDMA and WCDMA mobile radio, Bluetooth, IrDA etc.

2. Description of the Prior Art

Messaging and communications in general is, in the prior art, symmetric—namely you either exchange text (SMS, email, Fax, letter, etc. . . . ) or you talk to another person. But you rarely mix the two in the same exchange: if someone sends you a SMS, you don't reply with an email.

SMS texting, email and IM (Instant messaging) are all hugely popular. But because they are fundamentally symmetric forms of communication, once someone sends you a SMS, for example, then the normal way of responding is with a reply SMS. For many people, voice is still a preferred communication mechanism, but it can be awkward to respond to someone who has sent you an SMS by just calling them up: the natural assumption is that they sent a SMS because that was their preferred messaging type (perhaps they were in a meeting, or driving etc or simply prefer SMS'ing) and hence calling them on the telephone 'breaks' the protocol established by the SMS sender. A very large proportion of consumers have also yet to master sending SMS messages; an inability for them to reply in an appropriate manner is not only frustrating for them, but clearly a lost revenue opportunity for the telecoms operators.

It is known to convert voicemail for a mobile telephone user into text, with that text then sent as an SMS or email to the user. This is described in more detail in WO 2004/095821 A2, to SpinVox, the contents of which are incorporated by reference.

SpinVox therefore performs one form of asymmetric communication: people can speak messages which are then converted to text and sent as text to the message recipient. This leverages the increasing capability of mobile telephones for both voice and display: speech for leaving the voice mail, doing what a mobile phone does best (which is voice communication); and then text for displaying the incoming SMS text (which is a fast and non-intrusive way of getting the message received).

One feature deployed in the SpinVox service that converts voicemail to SMS text messages is a link in the SMS text message which enables the recipient to directly access and hear that message—QuickLinks™ (see GB2420942B, the contents of which are incorporated by reference).

The present invention takes the idea of an embedded link in a text message and builds a new message reply mechanism around it.

SUMMARY OF THE INVENTION

The invention is a method of replying to an electronically-received message which has been sent from an original message sender to a user who receives the message using electrical hardware, the method including the steps of
(a) displaying a link in the received message;
(b) the user selecting the link;
(c) the user being connected to a conversion system;
(d) the user speaking a reply which is then converted to a text based reply message by the conversion system; and
(e) the original message sender, or another destination associated with the link receiving the text based reply message.

A link, called an X-Link™ and is placed in a message (SMS, MMS, email, IM, WAP push—or any other message, document or image or sound file etc) that is sent to a user and displayed on their device (e.g. mobile telephone). When the link is selected by the user, it connects the user's device to a conversion system, enabling the user to speak a reply, which is then converted to a text based reply message; the reply message is then sent to the original message sender (and/or another appropriate recipient).

This approach enables a text message to be responded to by voice: it is an example of an asymmetric communication. There are many circumstances where this approach is very useful—for example if the message is a SMS and the recipient does not know how to respond using SMS, or is in an environment where it is difficult (perhaps when walking or driving).

The original message may be converted from voice, but does not have to be. Where it is, then the effect is to turn voicemail into full two-way push messaging.

The reply text can be in any format (SMS, email, IM etc) that the original message sender set as a preference.

Where the original voice mail is not converted to text, there can be just a notification that a voice mail has been received, plus a link to listen to it. This is a very valuable product in developing economies where a low-cost product suitable across all literacy levels is needed.

This approach works across different messaging products—e.g. original message can be SMS, but returned text can be SMS or email or vice versa.

Each link can be a unique address of some kind—e.g. phone number, email, IP address, IM, VoIP etc. Each link can be formed from a service number (acts to access the conversion system) and a unique identifier (acts to identify the original message sender). Alternatively, each link could be a 'click to call' word or words.

Alternatively, each link could be a virtual number (a full number that terminates in the network and is then mapped by the network to real numbers associated with end user equipment).

Unique addresses can act as implicit address books. For example, each user can have their own list of X-links, each X-link being associated with the unique MSISDN of a person that has sent a text to that user. Individual X-Links can be deleted, if desired.

X-links can be saved into an address book—calling the X-link starts a normal voice call since the X-Link is associated with a MSISDN; likewise, the user can send a text to the X-Link. Selecting an x-link can cause a communications application to launch (e.g. VoIP).

It can allow any voice-enabled device to be used to cause a text message to be displayed on a recipient's screen: non-Spinvox subscribers can also reply to a text message by speaking a message which is then converted.

Implementing the present invention can be entirely network based and use existing network services/technologies.

BRIEF DESCRIPTION OF THE DRAWINGS

FIG. 28 shows the Fast Address list, which on an N95 device is limited to the last 5 people which you spoke to, emailed, sent or received a text from or spoke a message to.

DETAILED DESCRIPTION

Figure 1:
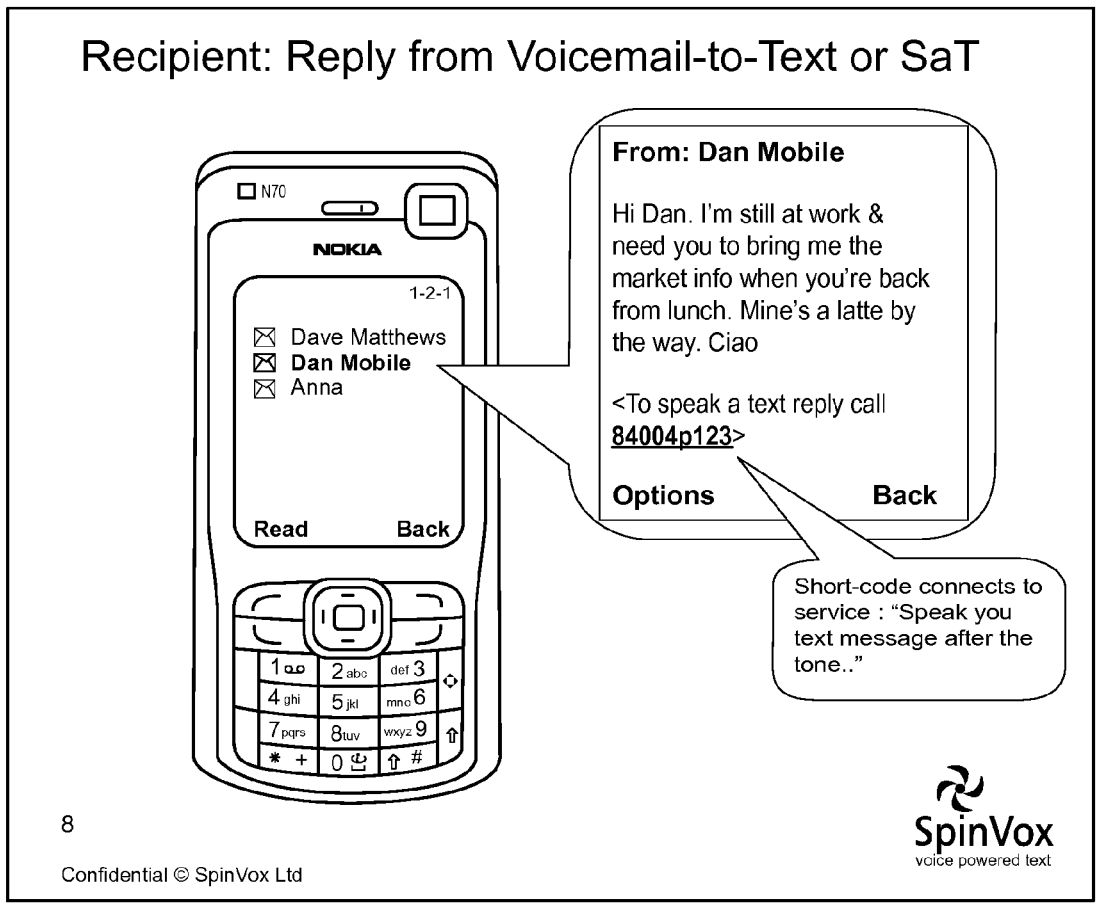
FIG. 1 shows a Spoken text message from 'Dan Mobile'. It includes the X-Link 84004p123 in the message.

SpinVox has developed a simpler more natural user interface for messaging—Voice. Messaging and communications in general is, in the prior art, symmetric—namely you either exchange text (SMS, email, Fax, letter, etc. . . . ) or you talk to another person. By converting speaker independent free-form speech SpinVox transforms and enables asymmetric communication which now changes the rules of the game. It enables full voice messaging and is creating the Voice-to-Screen™ messaging category that simply enables existing products/services and markets/users with a spoken input and a text output from any phone or speech input device to any screen.

In doing so, it leverages the increasing asymmetric ability of phones: phone screens for reading (which today are becoming good text display devices) and human speech, which is one of the most natural forms of communicating and virtually all humans on the planet can use, and is after all what phones are best at. Or put the other way, phones are poor text input devices, but great at voice input and decent at text display.

This transformation also enables new, deeper services, such as unifying all sources of voice messages into easily accessible text on screen and solves many of the complex system issues of getting two disparate worlds to appear to be one (telephony and email/web pages). But excitingly, by having voice messages of any source as text, they can be indexed and intelligent search results embedded into the message. The value is that the majority of searches are triggered by information communicated between parties, and voicemail and voice messages have a high percentage of such data points. This solves many of the limitations of phone key-based or pen based input methods to do search in traditional forms via search engines and several stages to find the result. And because this is server-side, it will become intelligent to your context—Intelligent-to-me™.

This Detailed Description will describe a wide variety of SpinVox innovations and product features, in addition to the specific invention defined by the Claims.

Key Elements of SpinVox products includes the following.
  X-Links™ which enables communities to effortlessly share use of SpinVox allows non-SpinVox subscribers/users to reply via speaking a text allows users to speak text across products, not just within
  X-Links™ implicit address book makes links seamless
  Network based spoken text messaging
  Call Return via spoken text messaging
  Speaking an SMS/MMS or email
  Speaking an Instant Message
  Mobile blogging
  Mobile photo messaging
  'Push to message'—application for push to talk
  All services/products are based on 'fire and forget' principle
  They all turn existing voicemail into a full two-way push messaging service and off of existing technology, create new products and markets
  They use the fact that we trust people in our communities to message us, rather than call us: 80% of messages come from a limited number of people
    Voicemail—8 people
    SMS—4-6 people
    Instant Messaging—2-3 people
  Missed Call Messenger (No Answer—Speak-a-Text™)—On-net+Off-net behaviour, 1$^{st}$ use of X-Links, and new revenue sources as an evolution and deployment with carrier in Spain
  Unified Communications for Voice Messaging—disconnected services, unified by conversion, distributed to any screen creates a new mode of multi-point voice messaging
  S-Links detailing embedded nature of context based smart links within text messages converted from voice messages—a new approach to mobile search and Advertising Search markets
  Intelligent-to-Me™: embedded intelligent passive search ability driven out of many-to-one communications, as opposed to one-to-one pull methods typically found in search today
  Spoken community messaging via web and SMS—Twitter, Facebook, MySpace, etc. . . .
  Voice Blasts™: concept of being able to speak a message and have it instantly sent as text in any form to your web-based community as a broadcast message directly from you.

The following sections will consider these (and other features) in more detail:
Section A: X-Links
Section B: S-Links
Section C: Web 2.0
Section D: Missed Call Messenger
Section E: An overview of the main SpinVox products
Appendix I: Speak-a-Text
Appendix II: Voicemail to email
Appendix III: Viral/link marketing campaigns
Appendix IV: Unified Communications
Appendix V: Voice SMS
Appendix VI: Acronyms SECTION A: X-Links™

This extends the original feature SpinVox deployed within Voicemail-to-Text™ whereby a link in the message enabled the recipient to directly access and hear that message—QuickLinks™ (see GB2420942B, the contents of which are incorporated by reference).

X-Links allows any recipient of any message converted by SpinVox to speak the sender a reply. By selecting the link, the user is connect directly to a SpinVox conversion service, prompted to speak their message and it is then sent directly back to the person they received the original message from.

X-Links are placed in every message, so two parties can endlessly communicate via spoken messages sent as text whenever they like.

For example, a user might receive a voicemail message as text and it will now contain an X-Link so that they simply select it and they can speak the person who originally left them a voicemail, a text reply. Likewise, if you're the recipient of a Spoken text message, you will be offered an X-Link to speak them a reply by text For example, FIG. 1 shows a Spoken text message from 'Dan Mobile'. It includes the X-Link 84004p123 in the message <To speak a text reply call 84004p123>

X-Link works across different messaging products, so if for example you receive a spoken message as SMS with an X-Link in it, you could be speaking the person a reply by email, or visa versa.

Technology

A link is formed by a service number and a unique identifier shown as:

<service number>+<unique identifier> e.g. Links in the UK could look like:
  02079652000p123 or
  84004p123

Service number—phone number which acts as access point to the conversion system, e.g.
    full standard phone number (e.g. a DDI such as 02079652000)
    voice short code (e.g. 84004)
    VoIP or network number if used within IP based telecommunication or messaging
  Unique identifier—identifies who the sender is for the reply, e.g.
    Over-dial digits used in standard telephony
      Often uses a 'p' (pause) or equivalent network symbol when using DTMF driven systems
      May use a special digit to further denote service type—e.g. '*' or a digit '1'
    Can be either the full phone number (e.g. MSISDN), or a code that links this on the system
      84004p123 or
      84004p07812101742

In next generation systems, the link would be an embedded link to 'click to call' as found in WAP pages and used extensively by operators such as Hutchison 3G in the UK. The benefit is that these links would be simple words, rather than phone numbers, so that it would read "Speak Text Reply" rather than "Speak Text Reply: 84004-p123".

X-List: Implicit Address Book

In the above examples, the unique identifier is shown as a 3-digit code (e.g. 123). The length is arbitrary and becomes the full phone number if it reaches the same number of digits as the mapped phone number (e.g. p12345678910 is no longer a useful code in the UK as all phone numbers are 11 digits).

X-Links rely on the service creating a list of people who you've received a message from and want to reply to. The reason this works as a limited list is because the number of people who call you 80% of the time is on average just 10-12.

Example

1. David speaks Jim a text message. Jim is not a SpinVox subscriber.
2. Jim receives the text with an X-Link to speak David a reply. He clicks on it.
3. When Jim's call connects, the system uses his CLI to identify who has messaged him—David's number is one of these.
4. The unique identifier then tells the system which of these SpinVox people spoke Jim a message. In this case it finds David's CLI (MSISDN)
5. Jim speaks his text message.
6. David now receives a spoken text message from Jim with an X-Link in so that he can reply.
7. The loop goes on ad infinitum.
  Key elements of this implicit X-Link address book are:
  A list of MSISDNs (or equivalent phone numbers) is built up of all callers who left a message for each SpinVox user on the X-Link service.
  This list is unique to each SpinVox user, identified by their MSISDN (or equivalent phone number). Each user has their own X-Link list keyed from their MSISDN.
  Every new person that leaves a message for the SpinVox user has a new entry created in this list, and a corresponding unique identifier allocated.
  The list grows to the allowable limit, which with just 3 numbers is 1000. It can be longer, or shorter depending on the needs of the user and service provider.
  Each time the SpinVox user calls in using the X-Link, the system knows which list is theirs (by use of their MSISDN), and can then decode the unique identifier digits into the person's MSISDN they want to speak a message to.
  SpinVox users can save these X-Jinks straight into their address books for future reference and know that calling it will always allow them to speak the associated person a text message.
  Optional: the system recycles the users' X-Link list so that as soon as it's full, it goes back and replaces the least used entry with the new one. This keeps the unique identifier short (e.g. 3 numbers) and uses the basis that you're most likely to use the X-Link in the message you recently received to reply and therefore correctly connect to that person. It is possible to dig out a very old message with an X-Link that now points at a new person.
  Note: Users of this service don't have to be SpinVox subscribers. They only have to have received a message with an X-Link in to start benefiting from this.

X-List Mechanism

Unique X-Lists are created for each person (A-F in this example) and list elements generated by using the caller/speaker's CLI and an associated unique identifier (UID). In this case, the UID is '*'+'3-digits'

|  | List owners | | | | | |
| --- | --- | --- | --- | --- | --- | --- |
| Listees | A | B | C | D | E | F |
| A | — | *001 | *079 | *022 | *333 | *010 |
| B | *003 | — | *012 | *025 | *334 | *099 |
| C | *011 | *007 | — | *003 | *351 | *015 |
| D | *002 | *011 | *001 | — | *002 | *101 |
| E | *139 | *099 | *006 | *011 | — | *069 |
| F | *001 | *010 | *589 | *287 | *006 | — |

The address book is built up simply by creating a list for each person who is either a recipient or a sender of a SpinVox message. The list contains links (shown as *xyz) which map to the actual phone number (CLI/MSISDN). Anytime a new person messages another via this system, they are added to their list. So both SpinVox subscribers and non-subscribers both have lists created for them.

For example: A's unique address book is shown by the vertical list under A.

A was called by F first (*001), D second (*002), B third (*003), then after 7 others, by C (*011) and by E $139^{th}$ (*139).

So if A uses the X-Link at the end of a message they receive (e.g. Phone_no.*002), the system knows that it's A calling from their network CLI (MSISDN), and that they want number 2 in the list to speak a text to. The system has keyed A's list number 2 to D's phone number.

X-Lists are built up through the calling/messaging patterns between communities of people.

Bi-Directional Messaging

Using the above list example, here's how A and B are linked in each other's Address List:
1. A is a SpinVox user. B is not.
2. B called and left A a voice message which was converted and sent to A as text.

a. When B's first left A a message, B was added to the list and happened to be the third, hence *003 is given to B's number.
3. A now speaks B a text reply using the message X-Link.
   a. This is the first time B has had a spoken message sent to them via SpinVox, so B's list is now created and A is added as the first entry (*001) in B's list
4. The system send A's message to B with an X-Link UID as *001
5. B receives the message and by using the X-Link calls the SpinVox service, is identified as B (CLI/MSISDN) and presents *001 as the destination—namely A.
6. A now receives a message back with B's UID (*003) and the loop can continue ad infinitum.

Saving X-Links—Reliable for Local Address Book Use

Because the X-Link service reliably links people to each other, users can safely save the X-Link in say their mobile phone's address/contact list for future use. So, A in this example could reliably save 84004p*003 in their phone's address list as the entry for speaking B a text message. Likewise, in this example, B can also save an entry for speaking A a text message as 84004p*001.

This method allows communities to reliably connect using X-Links. On average, we receive 80% of our calls from just 12 people, 80% of our voicemails from just 8 people, 80% of our SMS messages from just 6 people and 80% of our Instant Messages from just 4 people.

Naturally, X-Lists have a finite limit, so in the example shown, 3 digit unique identifiers limits to 1000 other people. Changing the number of digits in the unique identifier changes the possible number of people you can be connected to through your X-List.

Note: 84004 is an example service number, but could be any other number/address depending on network and numbering plans.

X-List: Any Address or Identifier

Although the method of X-Lists is explained using phone numbers, in fact any type of address can be used—email, IP address, Instant Message, VoIP no., etc. . . . —as long as it is a reliable identifier with which to address a message. So X-Lists can be used for any messaging community, not just phone number based communities.

This further means that a user may choose to receive messages as email, but always speak messages back as SMS.

X-Link: Launch Messaging Application

The concept of the X-Link reaches to another level when applied with any communication application. The link is not only a phone number or address, but also a link to launch the relevant application.

For example, the X-Link sent inside a standard spoken SMS or voicemail-to-text could be a link to call them back via a VoIP application rather than standard voice call.

The link might just show: VoIP Call back?
Clicking on this (or selecting this inside the applications menu, typically 'use detail') would:
1. Launch the phone's VoIP application—e.g. Skype
2. Place the call automatically back to the caller, using the VoIP application.
3. If there was no VoIP application, it might actually connect to the VoIP provider's web service and either download the application, or request a 'call back' so that they could connect via this method.

Note: this could be a very powerful way of acquiring subscribers to a VoIP service as each link is a call to connect and/or download their client and use their service.

X-Link as Public QuickLink

QuickLinks are used for SpinVox subscribers to be able to dial in and listen (retrieve) to any voice message by simply entering the QuickLink digits (e.g. *12) found at the bottom of each message.

Figure 2:
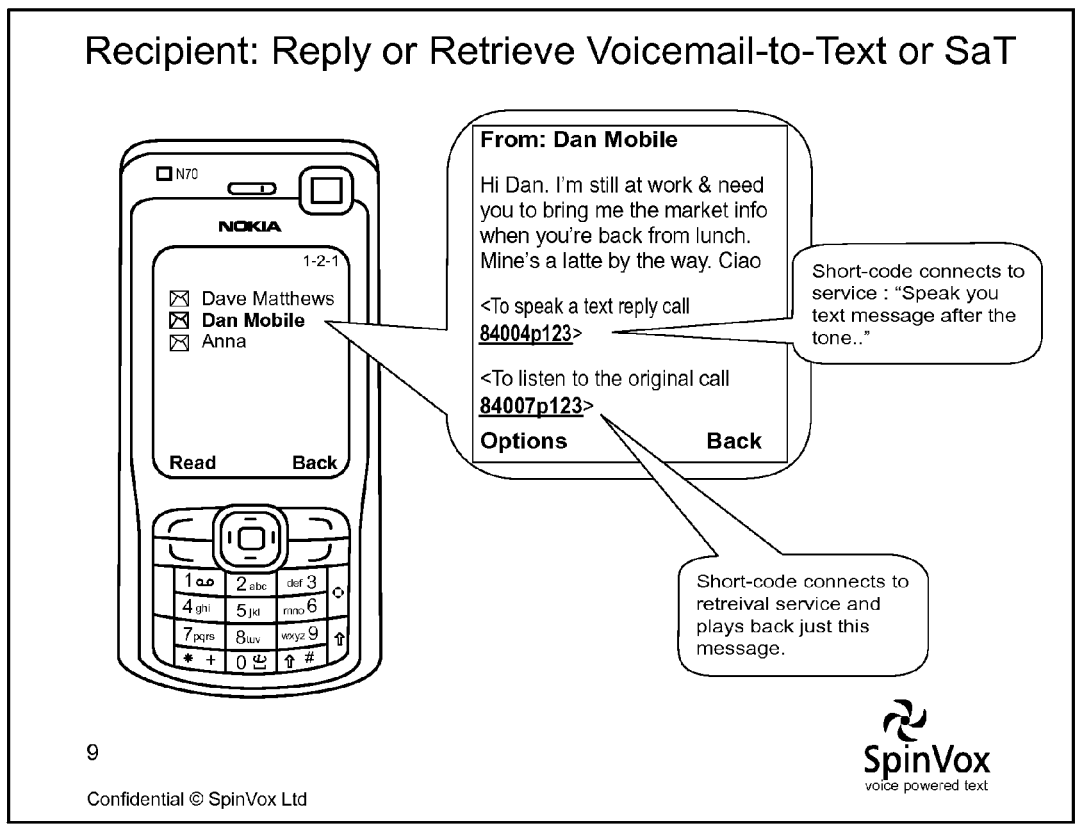
FIG. 2 shows how using X-Link's address book, anybody who receives a spoken message as text can now call in and listen to the original voice message that was left for them.

Using X-Link's address book, anybody who receives a spoken message as text can now call in and listen to the original voice message that was left for them, as shown in FIG. 2 ("To listen to the original call 84007P123").

For example:
   You aren't a SpinVox subscriber, but receive a spoken message from a friend
   Either the message is ambiguous, or it wasn't converted, but you've a public QuickLink at the end of the message (see picture below) to call in and listen to it.
   You select the link (or dial the full number) and the original voice message is played back for you.

Technical

Because the X-Link service has a list of numbers of both senders and recipients, it is able to match any caller's CLI (MSISDN) to a history list of numbers that are linked. Then, the unique identifier allows the service to match which exact CLI from this list the message you want to hear relates to.

QuickLinks and X-Links requests to the SpinVox service can be distinguished by:
   Different characters/commands being inserted into the start of the Unique identifier to denote which type of call this is
      Using an '*'
      Always starting with a 1
      Use of the 'p' command to mark the start of unique identifier
   Using different service numbers
      Calls to speak a message by text are on one service number range (e.g. 84004, 84007, 84009, etc. . . . )
      Calls to retrieve/listen to a message received as text are on a separate service number range (e.g. 94004, 94007, 94009)
   Using the same number, but then prompting the caller/speaker to select which option they want.
      E.g.: "Please select 1 if you want to hear this message, or 2 to speak the sender a reply"

Dedicated service numbers allow users to automatically retrieve, rather than call a number and enter a unique identifier manually. They are simply selecting a number to call from within the message.

X-Link Across Messaging Products

The above show how X-Links can be used within a given messaging product. However, if a user sets their preference, SpinVox or the service provider can actually send the converted message back in any message format/application the user desires.

For example
   James is not registered with SpinVox (or SpinVox service provider). He receives a spoken SMS from Adam who is registered with SpinVox.
   James receives a spoken SMS from Adam.
   James uses the X-Link to reply and speaks his message.
   SpinVox know that in fact Adam has opted to have spoken messages sent to him by email, not SMS. So, the system converts James' message into text and emails this to Adam.
   Adam sees James' reply in email, and uses the X-Link to speak him an SMS back.

This could work with any text based messaging application—SMS, MMS, Instant Messaging, email, etc. . . .

X-Links User Experience

As noted above, X-Links is a new product line for SpinVox designed to increase the value of every converted voice message sent by a SpinVox product. It achieves this through the inclusion of a billable reply path, which allows anyone to speak a reply to a message they receive.

For the first time, a spoken reply path will be available, creating opportunities. In addition to offering an enhanced subscriber experience, this unique integration provides a means of monetizing every message sent to or from a SpinVox customer. X-Links will provide a huge, sustainable incremental revenue for Carriers.

The solution will primarily consist of
SMS, MMS or email message with a highlighted reply path; either a phone number or HTML style link.
New capability to identify the calling party and link their number with a unique number that allows a spoken
Integration with a premium billing solution to monetize every message sent.

The following sections are covered in this document
General requirements—key features and benefits of the product
User experience—customer experience for calling and called party
Product requirements—end to end lifecycle experience General Requirements The product must meet the following criteria:

End User Benefit

Provide an ultra fast reply path, for situations where the customer can't or doesn't want to stop what they are doing or does not have the dexterity or technical savvy to use a keyboard.

Ease of Use

Must be obvious to user that the highlighted word or number can be 'clicked'. Should be simple way to activate and have a number automatically dialed. Ideally, only one click would be required to initiate the call to the IVR.

Simple, Fast, Intuitive

Figure 3:
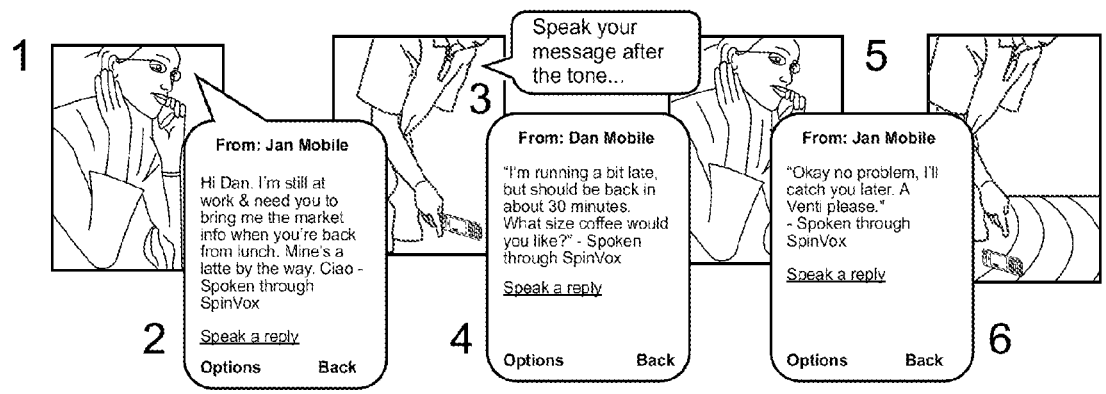
FIG. 3 shows a typical sequence of messages and the recurring use of the 'Speak a Reply' X-Link.

It must be obvious that clicking on the highlighted link will. Assumption is that MMS support is available on majority of targeted devices and that these devices support User Experience FIG. 3 illustrates a typical sequence of messages and the recurring use of the 'Speak a Reply' X-Link.
1. Jan calls Dan from her mobile phone.
2. Dan misses her call as he is out to lunch and he received a voicemail as text.
3. Dan doesn't have time to stop and type a message so he clicks on 'SPEAK A REPLY' He's then prompted to "SPEAK YOUR MESSAGE AFTER THE TONE".
4. The spoken message is delivered to Jan as a text message.
5. Jan clicks 'speak a reply', as she is busy and doesn't have time to type a reply
6. The spoken message is then delivered to Dan as a text message.

Demo Definitions

In order to rapidly demonstrate the capabilities and potential of X-Links, there will be 2 separate demo scenarios and milestones:

SMS Based Demo

The purpose of the canned demo is to show X-Links proof of concept.

SMS//MMS Field Trial

The purpose of the field trial version will be to demonstrate X-Links capabilities to customers, partner and key industry influencers. The field trial is a working version of the product.

1. User Interaction Considerations

Although the recipient of an X-Links message may be reading the message as an email on a PC or a high-end smartphone, the expectation is that most users will be using a more typical mobile phone. Therefore, interactions with an X-Links message should be designed with that user in mind. Access to the data that the user is requesting by clicking on a link should be immediate and require the smallest number of clicks to reach the desired information.

Calling Patty

The experience for the calling party would be consistent with current SpinVox voice to text products. Callers would hear an IVR greeting to leave a message with prompts that incorporate SpinVox branding.

Called Party

The called party would receive either an SMS message, MMS message or email of the converted voice message. When the message is displayed, a link at the bottom of the message would be highlighted and give the option to reply by clicking on a number or link.

One they have initiated the reply, callers would hear an IVR greeting to leave a message with prompts that incorporate SpinVox branding.

2. Implementation Considerations

There will be 2 types of X-Links service offerings—X-Links for SMS and X-Links for MMS and email.

SMS

While SMS has the broadest reach in terms of subscribers and device support, there are limitations on the number of available characters in each message. This limit impacts the number and type of link that can be incorporated in an SMS message. A second consideration is the ability for the device to automatically dial a phone number. If the link conforms to a common number +44207772222 some but not all devices will allow the link to be clicked and make a phone call.

The approach for SMS will be to include a phrase at the end of the message such as 'To Speak a reply call <+4420777222>'.

MMS and Email

MMS and email messages will provide a much richer X-Links experience for the end user in terms of message display and usability. Although usage is not as widespread when compared to SMS, MMS usage has recently experienced significant market growth.

For MMS, the X-Links message would contain a link at the end of the message which states:

'Click here to speak a reply'
spoken through SpinVox

When the link is selected a call to a number (hidden from the end-user) will be made. This could be a geographic or non-geographic fixed line number or Voice shortcode.

X-Links Product Requirements

1. Service Level

| Requirement |
| --- |
| The calling party should not have to sign up with SpinVox or the Carrier to use this service. |
| Customers can opt-out of the service by calling customer care or by sending an SMS message to a shortcode. |
| The service should meet the same availability requirement as the prevailing SpinVox service. |
| On initial launch the service must support the following languages: UK English |

| Requirement |
| --- |
| US English |
| Canadian English |
| Canadian French |
| German |
| French |
| Spanish |
| Australian English |
| South African English |
| The SpinVox SMS server must hold a profile for the Carrier DDI to determine whether to deliver the message to the Carrier SMSC or deliver to an aggregator to send to the customer |
| In that profile, there must be a reference to the injection and ejection validation rules for that carrier |

2. IVR

Once connected to the SpinVox IVR, the customer simply needs to record their message then hang up in order for the message to be sent. There will be no option to review the message, nor will there be any option to receive a copy of the message.

| Requirement |
| --- |
| The voice talent used to record any new voice prompts must be the same as currently used on the SpinVox IVR platform. |
| IVR prompts must be recorded in all languages supported by the SpinVox IVR |
| The destination party will be automatically known and no additional number entry is required. |
| The duration for a spoken reply will be set to 30 seconds |
| The option to re-record the message will be available by pressing * (the star key) at any time during recording. |
| The first (3) three times a customer initiates a call to reply by using an X-Link they will be prompted to confirm the charge for using the service. Subsequent times a customer connects to the IVR, they will not be prompted to confirm the cost. |
| X-Link Confirm prompt: (played first 3 times) |
| "Welcome. This service cost 25 pence per message. Please Press 1 to continue." |
| Pressing 1 will confirm the action and the customer will then hear the following prompt |
| X-Link normal prompt: |
| "Speak your reply Now!" |
| Once the message has been deposited a billing trigger will be activated and if appropriate the customer will be charged for the message. |

3. Delivery to Recipient

When a voice message is successfully converted to text, an SMS, MMS, will be sent to the intended recipient.

| Requirement |
| --- |
| The text message must be sent as from the original caller's phone number (i.e. the A party). |
| The body of the message must use the appropriate SpinVox SMS boilerplate, as defined in Message Classification. |
| This includes the definition of the branded signature and the use of quotation marks. |
| WILL DIFFER DEPENDING ON DELIVERY METHOD |
| The delivered message must automatically contain an X-Link, linking the sender (uniquely) with the recipient. |

4. X-Link

There are no pre-requisites to using an X-Link. It is not necessary to have a SpinVox account, in fact, many recipients will not know who or what SpinVox are, until they click on the link.

| Requirement |
| --- |
| It must be possible to link two people's numbers uniquely using a single geographic or non-geographic number that can be dialled directly from any handset. |

5. Reporting

| Requirement |
| --- |
| It must be possible to report on all messages on this service. |

Further X-Link Concepts

Original sender has a setting which can specify that the voice-to-text reply should go to more than one destination eg. to SMS and to distinct e-mail address (office), and to a further e-mail address (home). This setting can also be altered on a message-by-message basis. This setting could be handy as it could lead to an automatic "backup" of SMS messages received on a mobile phone to an e-mail account at the workplace, or to support staff at the workplace who can provide cover for a busy individual.

Each user has their own list of X-links, each X-link being associated with the unique MSISDN of a person that has sent a text to that user. Individual X-Links can be deleted, if desired.

Include option for spoken text message to be saved to an intermediary, for sending on later at a specific time. Eg. in union-dominated environments, might not want to send such a message outside of working hours. Hence select it to be sent at exactly 9 am, which could be the exact start time of the working day. Option could be called "Speak delayed text message", with the future time (and possibly date) at which it is to be sent inputted using the number keys.

Insertion of X-Link in the message is de-selectable using an option eg. if the recipient speaks with a strong accent or dialect that cannot be converted to text reliably using existing technology, and you do not want to waste time trying to decipher any such text message.

When text message is sent to a non-Spinvox customer, include a link so that the non-Spinvox customer can click it to sign up to Spinvox eg. using an internet page, or by speaking to an operator.

X-Link in a blog, or in a closed user group.

SECTION B: Content Based Links—S-Links™

Spoken Links (or Smart Links)

One of the most useful features of receiving a spoken message as text is that if the speaker gave specific data relating to a place, time, address, name or other keywords it's in text and as the user, you can quickly refer to that at any time when you next need it.

Parsing of phone numbers, email addresses and websites into hyperlinked objects is common in messaging applications (SMS, MMS, email, IM, etc. . . . ). In spoken messages, users often give reference to locations that aren't as obviously structured, but equally important to the recipient.

The concept of S-Links is to parse the text of a spoken message and use keywords to generate a set of useful, related links. The relevant links are inserted in the message and would take the user to a website or web resource that expands on the content linked.

Figure 4:
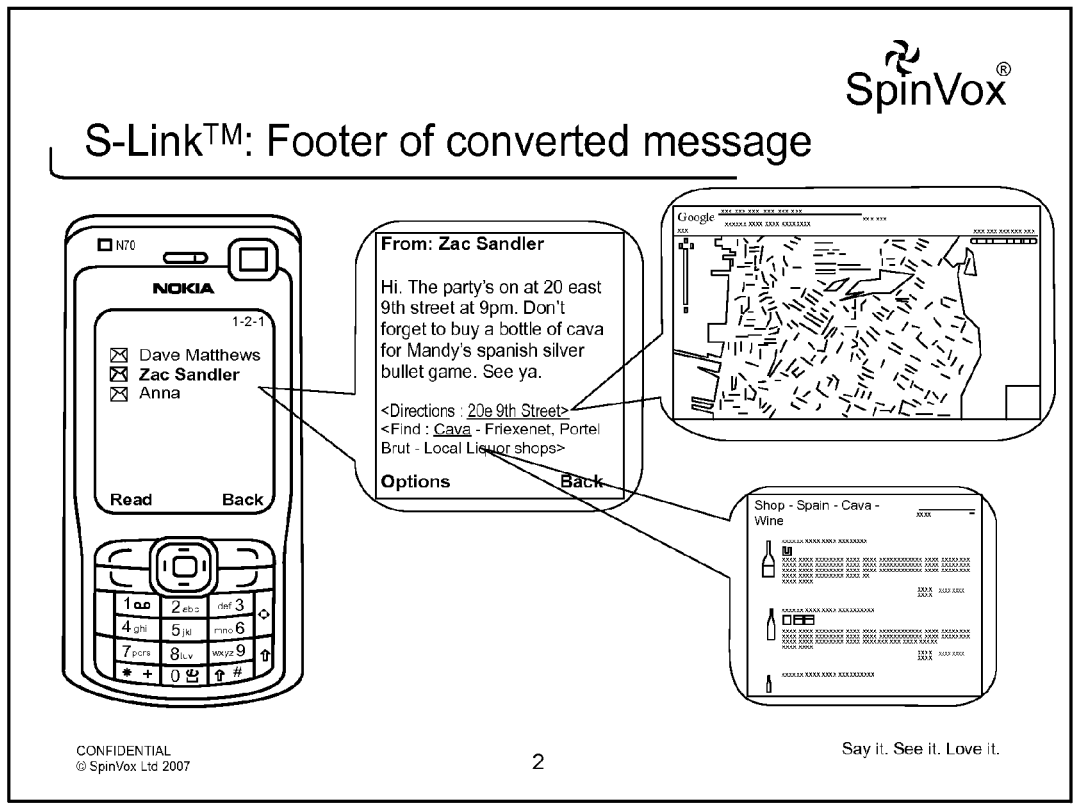
FIG. 4 shows that message sender Zac Sandler leaves a voice mail which has been automatically converted to text using the SpinVox voice conversion system.

For example, in FIG. 4, message sender Zac Sandler leaves a voice mail which has been automatically converted to text using the SpinVox voice conversion system (see WO 2004/095821 and WO 2007/091096, the contents of which are incorporated by reference). At the footer of the converted message are two separate links, one for directions and another for the drink 'cava'. Clicking on the Directions' link opens a map browser on the phone (in this Figure, a PC based Google Maps image is shown for clarity), showing the address mentioned in the voice message, now converted to SMS.

Figure 5:
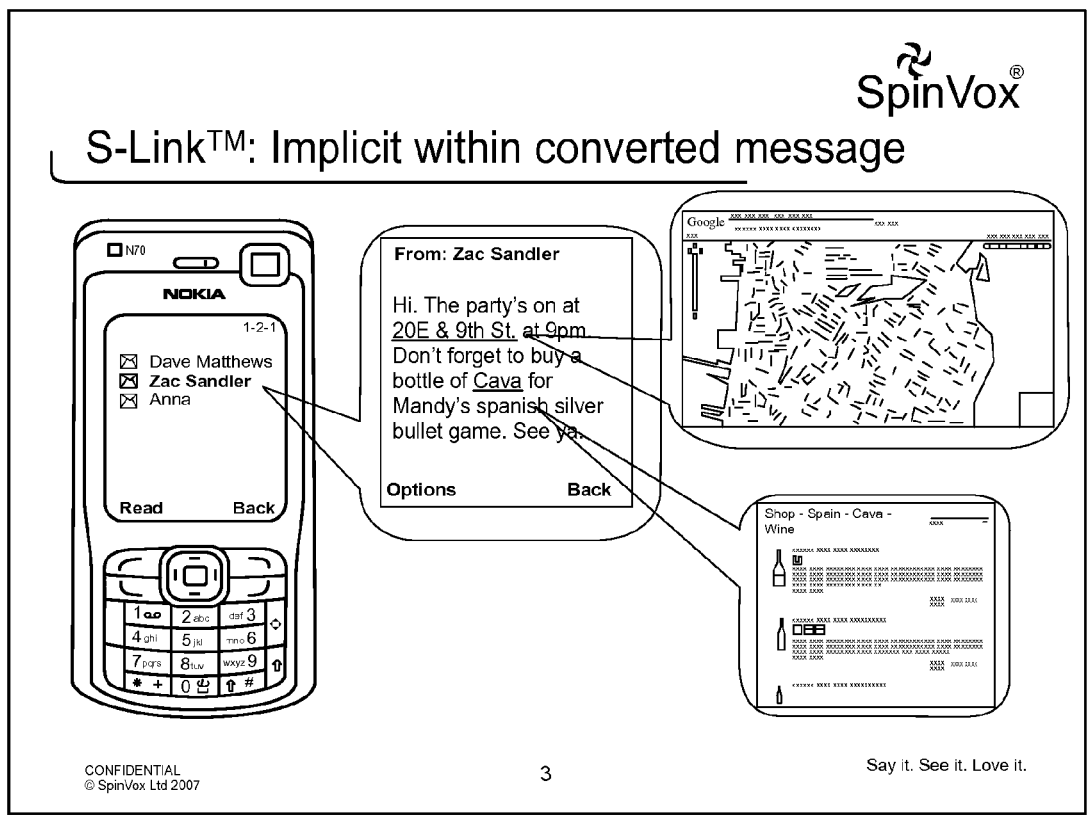
FIG. 5 shows another variant, in which the links are incorporated into the message, with the address '20E & 9$^{th}$ St' in the body of the message being selectable to call up the map browser, showing that address.

In another variant, shown in FIG. 5, the links are incorporated into the message, with the address '20E & 9$^{th}$ St' in the body of the message being selectable to call up the map browser, showing that address. Likewise, the word 'cava' in the body of the message is selectable, to call up a browser with places where this wine can be bought and which (optionally) are near the parsed destination address. In this example, the user can be presented with options for buying a bottle of Cava that are on the planned route, rather than anywhere in their locality, optimising the relevance and therefore value of the implicit search result. Further more, these can be added to the map presented to show where on route these items are.

So in this case, the message contained two clear opportunities from which to create a relevant link; an address and a product type.

The system first looks for key words or phrases that contain likely words for links. It then takes these and automatically looks up likely resources for each and then presents what it estimates is the best result.

The value of this is that relevant links are inserted which the user will accept as they are useful, relevant and generally unobtrusive. This is a very valuable way of marketing 'below the line' using User Generated Content to find and create valuable links for the recipient.

So S-Links increases the value of converted voice messages through the inclusion of relevant contextual elements. By incorporating links to external information, such as maps, directions, advertisements or offers, S-Link-enabled messages can deliver an enhanced experience—evolving from the current explicit search paradigm to the significantly more valuable implicit search, i.e. something that was actually said in conversation.

For the first time, the massive volume of P2P messaging in the mobile sector will be harmonized with search. In addition to offering an enhanced subscriber experience, this unique integration provides a highly targeted platform for mobile monetization. S-Links will provide a huge, sustainable incremental revenue for Carriers and service providers.

Technical

The way to create this links is by processing the converted text first, finding relevant key words, creating the links then adding them into the message, before sending to the recipient.

SpinVox's Voice Message Conversion System post-processes all messages and is capable of making a call to a routine to parse text and create any relevant S-Links. VMCS is defined in more detail in WO2007/091096, the contents of which are incorporated by reference. Alternatively, the message can be first sent to an intermediary who can perform this link creation stage.

Link Types

The links can either be the full URL where the application reading the text is unable to create fully aliased hyperlinks, or just the hyperlink itself from the key word.

E.g.
URL only: http://maps.google.com/
Hyperlinked: 20E 90$^{th}$ St

If the links are fully hyperlinked, they can be placed within the text of the message:

---
From: Zac Sandler

Hi. The party's on at 20 east 9th street at 9 pm. Don't forget to buy a bottle of cava for Mandy's Spanish silver bullet game. See ya.

---

Implicit Search with Intelligent-to-Me™

The system can be enhanced to provide truly smart links that are relevant not just to the message, but the user and their habits, history of use and preferences. The concept is that the S-Links service learns and uses other resources to make any links presented Intelligent to the specific user, or "Intelligent-to-Me™".

Issue

The issue of mobile search is today predicated on the fact that users will behave the same way and have the same needs when they're mobile as when they're at their PC. Three basic issues exist when translating search from PC to mobile:

1. When people get up and go somewhere, they nearly always know where they're going, why and key information about that trip, even if local, so their requirements for search are normally contextually constrained to the task at hand.

2. In the event that people want to search whilst mobile, it's well known that today's solutions require input on a small alpha-numeric keypad or even a touch screen that is not easy and requires the user to typically stop somewhere to perform the search.

3. Even if the person does achieve input of a search term, they still need to click through several pages and scroll to find the relevant outcome. This can equate to some 30-40 key press sequences including switching to their browser, typing in the search string or query (often more than once to find the right one), scrolling and then selecting pages/links to view.

Key Insight

The source of many of our searches is actually driven by messages we receive from others, such as names of something we didn't know about, locations, brands, etc. . . . On a PC, these sources are wide as they can come from more than just out community or colleagues. But fortunately, large keyboards, rich screens and connectivity make our task of explicitly transposing the idea to some key words, invoking our browser and typing in a couple of search queries and then browsing through many options, an acceptable task. This is 'Explicit' search, because the user has to consciously think about what they need to find, how and then filter down results to their target.

Messages we receive from our community or voice messages contain a high proportion of key task information for our daily lives—e.g. a time for a meeting, an address, items to bring/buy, things to do/see and even reminders.

SpinVox research into converted voicemail-to-text results shows a surprisingly high number of appointments; locations, tasks and items are received by voice messages, some 25%. And people use this to navigate and successfully work through their day.

What this means is that a significant part of anyone's trigger to undertake search comes from voice messages. Coupled with the fact that people often rely on text messages (SMS, MMS, email, etc. . . . ) once they're on their task or trip, to look up details en-route (e.g. check address, time or name of items to get), the solution becomes apparent.

By linking key words in any message the user has directly to the destination (search answer), the user's life becomes much simpler and effective. No need to explicitly think about searching and which way to do it, just click on the link and be taken straight to an answer. All the middle steps that explicit search relies on are removed. Used the highlighted word or reference in the message and get straight to the answer: Implicit Search.

Implicit Search

By first converting all voice messages into text, SpinVox has all the key words that could be used to perform an intelligent search. Further, it also has the ability to build up a history of user messages, who they were from, which source and the response to such links to continually optimise how they're presented in future and therefore fit with what the recipient/user actually needs. So the system learns what a user is likely to be searching for through its entire history of messages sent and received—not just the specific search.

Keys to optimising implied search include:
Calling/sending party (A-party)
Key words used and their relative meanings
Message type—voicemail, SMS, email, social network, broadcast/blast, etc. . . .
Location of both called party (B-party) and calling/sending party (A-party)
Location based services (LBS) to improve the context of key words (e.g. addresses, or locations for certain items en-route)
History of clicks and actions of recipient
History of response to messages to better know what was say ambiguous or likely to be done next in a typical sequence between these two parties
Time of day, date and place that actions were taken to optimise what things are relevant vs. not
Preferences for brand, place, method or mode based on purchase history or message history and link usage VMCS related patent filing WO 2007/091096 describes the system used to implement the indexing of keywords/terms needed to generate a full index that can form the basis of an advertising supported search system—i.e. that is sufficiently reliable, robust and scalable to provide advertisers that bid for a particular index term to be reliably and appropriately referenced or linked to in a message when that index term appears.

By looking at all a user's messages, whether they received them or sent them, a significant amount of personal context can be derived to learn and thereby better provide a user with intelligent options or links to delivering what they want. This constant learning helps provide a network-based service that is with you and is: Intelligent-to-Me™.

Many-to-One Widens Scope and Relevance

This also changes traditional search which is in essence a one-to-one relationship, namely that as a user it is only my input to say Google or Yahoo! that generates results and the only thing they know about me is my IP address, which changes as I move around. With S-Links, search input is widened to become from many-to-one. It is also reliably for one user, as your phone number rarely changes. Therefore, the search is far more relevant to the user as it's using a fuller set of key words that a user depends on, rather than the few that are remembered or transposed from one application to another. It can also be specific to the demographic of the user, because that information is either explicitly provided to the system by the user, or can be inferred by the system by looking (with the consent of the user) at the content and profile of messages.

We believe that a significant amount of mobile search will come from implicit search options embedded in messages and probably be larger than traditional explicit forms of search in mobile.

Permission Based

One of the key issues that this idea solves is that in mobile, there's a large resistance to any advertising that is explicit or clearly what is know as 'above the line' and effectively occupies parts of the user's screen. In mobile, screen real estate is at a premium.

By embedding the links as the words, it will immediately remove this problem and the service and any adverts associated with it will only appear when the user actively selects they want to use this option. This will likely transform user experience and acceptance of commercial services and advertising in mobile.

Gesture Based Search

Because the system is providing single click answers to typical search task, the user only needs undertake the simplest of actions, a click which is a common gesture and which takes the user straight to their destination, rather than work their keyboard and navigation keys through some 20-30 or more inputs (keystrokes and clicks) to achieve the same result. It's well known that every step loses some 30% of users and this is even more accentuated in mobile. S-Links minimise this to just 1 step.

Location Based Search

A simple feature is the option to not only display the Address someone has given you, but to then use intelligence in the network (typically Location Based Services) to give you:

The actual route to take to get you from wherever you are to the address given in the message
If you've other items to visit or collect (buy) on the way, the mapping function can now populate your route with options to find these items, rather than just in a uni-directional radius around you
Use your history to know which places, routes and features you prefer to improve the relevance of the results presented
Use A-party location to also optimise local references and instructions or information to improve relevance of results presented—e.g. 'meet me at my Starbucks' would be able to automatically map the nearest to the caller's phone that made the call.

Business Model Transformer

Using implied links will drive mobile users to online resources, many of which are paid for by online adverts that appear. Implicit search will do several key things for players in the value-chains that provide both the mobile service and web-based searches:

Increase traditional Advertising Search (online advertising) revenues such as those derived by Google, Yahoo!, MSN, etc. . . .
Increase mobile revenues from data traffic and data products purchased
Increase online transactions from mobile
Provide sources of revenue for the networks to subsidise the SpinVox service that enables this capacity. Users may no longer have to pay, but instead get a higher quality service instead.
Drive use of new messaging products or modes, such as MMS and WAP, both of which are under-utilised but very capable multi-media resources that networks are keen to see a return on.

|  | Business Upside | Business Rationale |
| --- | --- | --- |
| SpinVox | Incremental income from share of click revenue | Reinforce SpinVox position as an innovator and as the market leader |

| | Business Upside | Business Rationale |
|---|---|---|
| Carrier | Incremental income from data/WAP session | Drive new sales of data plans and uplift take-rate of compatible handsets |
| Search Engine | Incremental income from click-through | Monetize SMS - not previously possible due to routing and volume |

Figure 6:
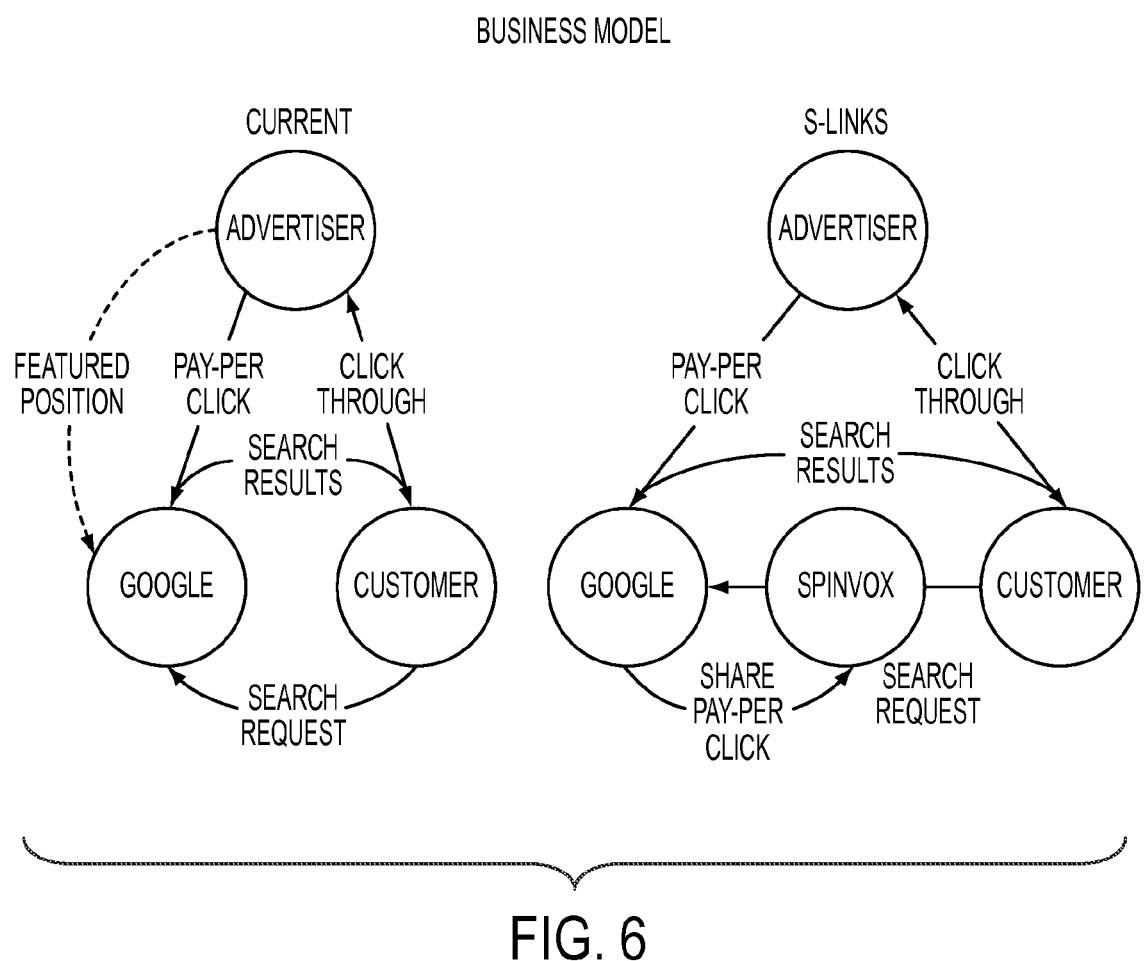
FIG. 6 schematically illustrates the business model transformation and how SpinVox positions itself as the intermediary between the customer and the search-engine based advertising aggregator, such as Google.

FIG. 6 schematically illustrates the business model transformation and how SpinVox positions itself as the intermediary between the customer and the search-engine based advertising aggregator, such as Google.

Single Search Result Premiums

Due to the nature of the single link and its design to take you straight to the right outcome (destination), this service will further heighten the value of these search results to advertisers and commercial service providers as there will only be one or a couple other search results shown, rather than the pages of results provided in PC based explicit search which tends to dilute the value of the slot bought.

This will offset the industry's concerns about mobile advertising in general being less valuable as web content and resources are generally less available to mobile users.

Summary of S-Link Features

Now voice is in text, it can be massively indexed

Voicemail is the 2nd largest form of mail after email

Voice messages have rich personal context—key task information

Search can be very targeted and relevant

Permission based: Intelligent-to-Me™

Smart-links: learns from history and use from all messages to me from my communities, not just my individual searches (e.g. Google)

Implicit vs. Explicit search

Current search is PC-centric—Explicit search

Requires user to think of search term, switch apps, type in via fiddly keypad, surf to find results=20-30 click exercise (30% loss at every step)

Naturally limited market—in mobile!

S-Links provide result in context (message)—Implicit Search

Voicemail (and SMS) contains over 70% of key info for day's tasks—addresses, times, names, sequences, products, ideas, etc. . . . —I.e. keywords that drive typical search Take you straight to destination, not the long ride—1 gesture=result!

Implicit recurring behaviour—voice messages are received every day

Link is discreetly in message and takes you straight to the result

Links are smart—they can give local context to ensure results shown is right for the user first time—e.g. providing local options for maps, products, places and services.

Implicit navigation—it knows where you are and where you are going. It uses network LBS (location based services) to find you and then map services to provide you with a route to where you are going. It dynamically updates depending on where and when you clink on a link.

1 click simple to reach destination—the link is persistent and is there in the message after you close and then re-open the message many days alter; there is no need to re-type anything.

Preferences enable different commercial resources to be displayed

Drives much higher value single search result.

S-Links User Experience

This document details the user experience and highlights specific requirements and considerations for SpinVox S-Links. The solution will primarily consist of:

1. SMS, MMS or email message with highlighted keywords
2. New capability to identify and highlight keywords in voice to text processing
3. Integration with $3^{rd}$ party ad and content servers to support business model The following sections are covered in this document 1. General requirements—key features and benefits of the product
2. User experience—customer experience for calling and called party
3. Product requirements—end to end lifecycle experience General Requirements The product must meet the following criteria:

End User Benefit

Highlighted words must be relevant to message content and have perceived value for the user. Consensus that 2 or 3 links per message is the maximum threshold.

Ease of Use

Must be obvious to user that highlighted words can be 'clicked'. Should be simple way to activate links to render associated results. Ideally, only one click would be required to retrieve and display the requested information.

Simple, Fast Display Results

Clicking on highlighted words should require the smallest possible number of additional clicks to display results. Assumption is that WAP support is available on majority of targeted devices Performance Turn around time (TAT) for message delivery should not be impacted. The message TAT should remain within the current SLA parameters.

Figure 7:
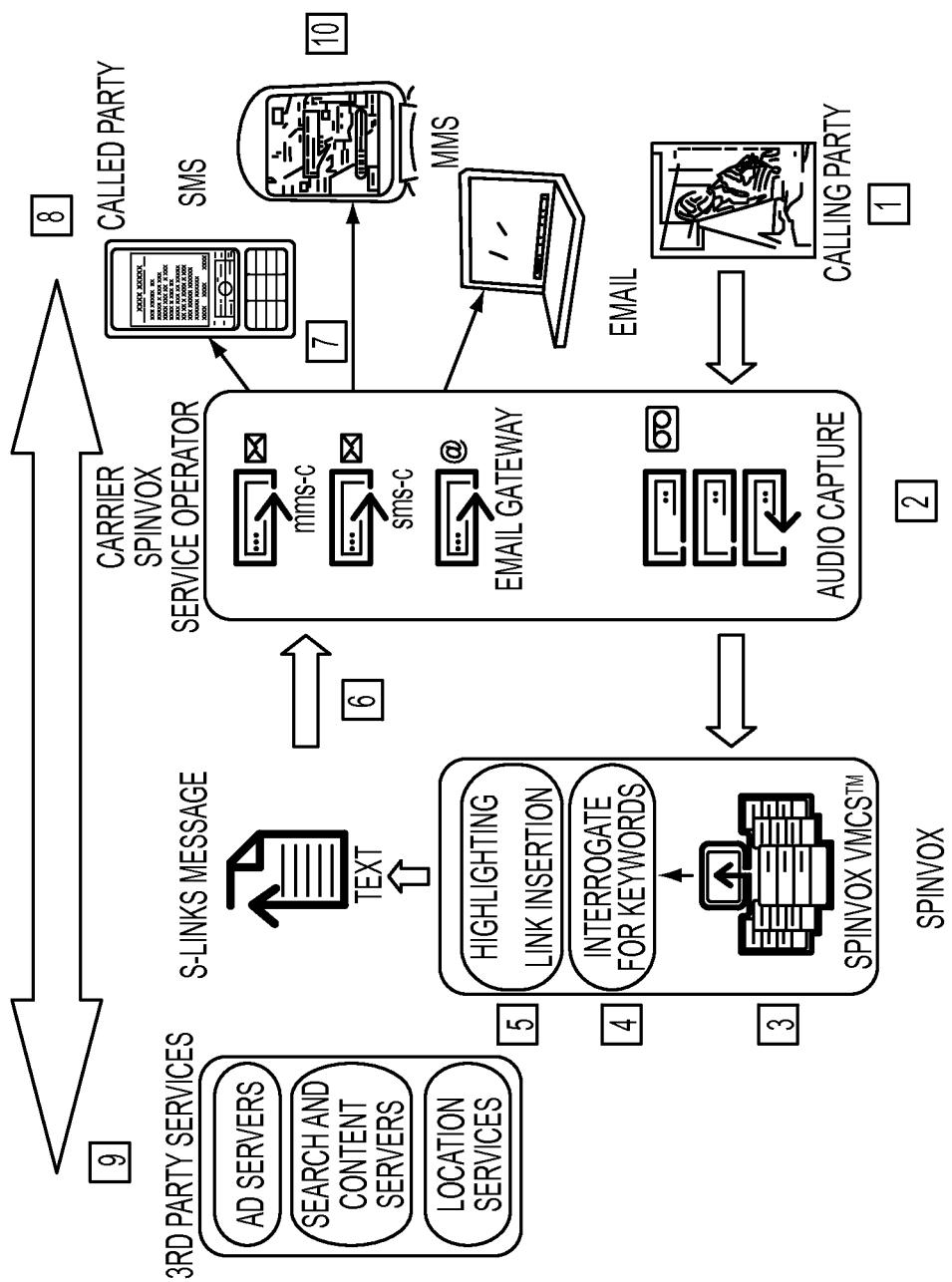
FIG. 7 shows the end-to-end experience from when a calling party leaves a message and to how the recipient (called party) views the message.

FIG. 7 shows the end-to-end experience from when a calling party leaves a message and to how the recipient (called party) views the message. The message content, display and interaction will differ depending on message sent and display type.

1. Calling party initiates call to a called party. Alternatively the caller could be replying to an email, creating a memo, preparing a blog or social network posting or responding to an instant message. Calling party is prompted to speak their message using normal product IVR prompts.
2. The voice message is recorded in the audio capture system within a carrier, service operator or SpinVox. The WAV file is then sent to VMCS for conversion.
3. SpinVox VMCS converts voice WAV file into text message.
4. SpinVox interrogates message to determine if any relevant keywords are present.
5. SpinVox highlights relevant keywords and inserts one or more of the following associated links:
   a. Ad click
   b. Map
   c. Ad tag in message
   d. Ad tag at bottom of the message
6. Message goes back to carrier for deliver to called party destination via SMS-C, MMS-C, or email gateway 7. Called party receives message on device. Message display and linking capabilities will be dependant on message type sent (SMS, MMS).
8. Called party clicks on highlighted words with embedded links to display more information.
9. Link goes to $3^{rd}$ party service providers for maps, ads or search results.
10. Link results are displayed to the user. Display results and speed we be dependant on the WAP/web capabilities of the called party's device.

Demo Definitions

In order to rapidly demonstrate the capabilities and potential of S-Links, there will be 2 separate demo scenarios and milestones:

Canned Demo

The purpose of the canned demo is to show S-Links proof of concept. The demo will be limited to a predefined set of keywords and display results.

Field Trial

The purpose of the field trial version will be to demonstrate S-Links capabilities to customers, partner and key industry influencers. The field trial is a working version of the product though there will likely still be limitations on available keywords and search results.

1. User Interaction Considerations

Although the recipient of an S-Links message may be reading the message as an email on a PC or a high-end smartphone, the expectation is that most users will be using a more typical mobile phone. Therefore, interactions with an S-Links message should be designed with that user in mind. Access to the data that the user is requesting by clicking on a link should be immediate and require the smallest number of clicks to reach the desired information.

Calling Party

The experience for the calling party would be consistent with current SpinVox voice to text products. Callers would hear an IVR greeting to leave a message with prompts that incorporate SpinVox branding.

Called Party

The called party would receive either an SMS message, MMS message or email of the converted voice message. When the message is displayed, certain keywords would be highlighted, ideally those that are most relevant to the message content. Message should contain a minimum of 1 and maximum of 2 or 3 keyword links. The type of content displayed and the user interaction with that content will vary depending on the message type and the device capabilities. (see Implementation Considerations section below)

For capable devices, selecting a highlighted keyword will initiate a WAP or web session and display ad, map or search results associated with the keywords.

|  | Canned Demo | Field Trial |
| --- | --- | --- |
| Keyword strategy | Minimal pre defined list of keywords | List developed in conjunction with ad server or search partner. |
| Link Type<br>a. Ad click<br>b. Map<br>c. Ad tag in message<br>d. Ad tag at bottom of the message | Keywords link directly to set of pre-defined results<br>a. Hotel -> WAP site<br>b. Map - > static map<br>c. Audio clip<br>d. Movie clip | Based on keyword selected and related links. |
| Device adaptation | N/A | $3^{rd}$ party for adaptation/ transcoding for mobile devices |
| Location based services | N/A | Simple user profiles for containing most frequent locations |
| Opt-in/Out | N/A | Default is opt out |

2. Implementation Considerations

There will be 2 types of S-Links service offerings—S-Links for SMS and S-Links for MMS and email.

SMS

While SMS has the broadest reach in terms of subscribers and device support, there are limitations on the number of available characters in each message. This limit impacts the number and type of link that can be incorporated in an SMS message. A second consideration is the ability for the device to render the link. If the link conforms to common URL form http://www.anysite.com some but not all devices will allow the link to be clicked and launch a WAP browser.

The approach for SMS will be to embed a single link or advertising tagline in the message. The link should be relevant to at least one of the words in the message. Alternatively there could also be a response option e.g. —Reply M for more info—that could be sponsored. Another approach will be to auction specific keywords to the highest bidder—e.g. Hotels=Hilton, Coffee=Starbucks. This approach will not be taken initially since keywords will have low value until the ad inventory increases as more ad-supported messages are implemented.

|  | Canned Demo | Field Trial |
| --- | --- | --- |
| Keyword | Coffee | List developed in conjunction with ad server or search partner. |
| Display results | Taglines<br>Option 1:<br>"To find a local Starbucks, go to http://mobile.starbucks.com"<br>Option 2:<br>"Looking for Starbucks? Reply S to find the closest one to you" | TBD based on partner list |

MMS and Email

MMS and email messages will provide a much richer S-Links experience for the end user in terms of message display and usability. Although usage is not as widespread when compared to SMS, MMS usage has recently experienced significant market growth. MMS has the ability to support rich data types such as images, audio and video, and does not have the same character limitations as SMS. Handsets that support MMS are also more likely to have some type of web access built into the device. Additionally S-Links can be a major driver for increasing traffic of higher priced MMS messaging services for carriers.

For MMS, the S-Links message would contain between 1 and 3 highlighted keywords. When a keyword is selected, a WAP or web browser will open and the relevant information will be displayed. If the information is an address, the browser should open up a map with the address highlighted and standard options, for receiving directions if possible. If a like word "coffee" or "Starbucks" is highlighted, clicking the link would bring up list of coffee shops or Starbucks that are local to that users. These may or may not be relevant at the time the user is viewing the message. Clicking on a highlighted item could also bring up an ad, either separately or as part of the other results. A future option would also be to consider integrating an ad as part of the actual message.

Email and IM messages would function similarly to MMS.

Product Requirements

1. Customer Interaction with IVR

There will be no change to the calling party experience.

2. Delivery to Recipient

When a voice message is successfully converted to text, an SMS, MMS, email or will be sent to the intended recipient.

SMS/MMS B Party

The text message must be sent as from the original caller's phone number (i.e. the A party).
Message body The body of the message must use the appropriate SpinVox SMS boilerplate, as defined in Message Classification.
This includes the definition of the branded signature and the use of quotation marks. WILL DIFFER DEPENDING ON DELIVERY METHOD
Message Delivery Canned demo - 3$^{rd}$ party aggregator
Field Trial - Carrier MMSC 3. S-Link Highlighted Keywords A minimum of 1 and a maximum of 3 keywords will be highlighted in the body of the message.
User actions when clicking - see table below for demo and trial requirements
Impact on message loads (see 2.2)
Choice of words
1. Carrier specific
2. Auction
3. Ad-search partner defined
Inclusion of location click through?

|  | Canned Demo | Field Trial |
|---|---|---|
| Keyword strategy | Minimal pre defined list of keywords | List developed in conjunction with ad server or search partner. |
| Display results<br>a. Ad click<br>b. Map<br>c. Ad tag in message<br>d. Ad tag at bottom of the message | Keywords link directly to set of pre-defined results<br>a. Hotel -> Hilton WAP site<br>b. Map -> static map<br>c. Audio -> Foo Fighters - flash page<br>d. Movie -> "I Am Legend" flash page | Based on keyword selected and related links.<br>Eg.<br>a. Hotel -> Hilton - show list of Hilton Hotels, preferably those that are relevant to user location<br>b. Map -> Dynamic map (like Google Maps) showing local business and options for directions<br>c. TBD based on partner<br>d. TBD based on partner |
| Content Sources | SpinVox built demo site | 3$^{rd}$ party serviced content |

4. Service Level—Trial Only

Sign-up requirements

The calling party should not have to sign up with SpinVox or the Carrier to use this service.
Customers can opt-out of the service Service Level The service should meet the same availability requirement as the prevailing SpinVox service.
VMCS Language support On initial launch the service must support the following languages:
UK English
US English
Canadian English
Canadian French
German
French
Spanish
Australian English
South African English
Carrier Profile The SpinVox SMS server must hold a profile for the Carrier DDI to determine whether to deliver the message to the Carrier SMSC or deliver to an aggregator to send to the customer
In that profile, there must be a reference to the injection and ejection validation rules for that carrier 7. Reporting—Trial Only It will be necessary to report on the activity on for S-Links. The audience for all reporting will be both internal and external, Carrier facing and for advertisers or ad networks.

Reporting requirements

It must be possible to report on all messages on this service
Reporting requirements It must be possible to report on the following product metrics.
Usage
Traffic
Reporting requirements Word impressions per day/week/month
Click through on each word per day/week/month
Links clicked vs. links displayed on each work per day/week/month.
Filter by Carrier, service provider etc SECTION C: WEB 2.0
Mobile Blogging—MoBlo™

Blogs have become a very popular method of people sharing thoughts, facts, photographs, images and other information freely across the internet. Blogs are largely based around the concept that you're sharing something with a community to whom your blog is relevant, often highly personal.

Blogs now exist for sharing information on films, concerts/gigs, shows and all sorts of entertainment, and more recently, a large rise in their use for Citizen Journalism where any member of the public can post news or information about a current issue. The BBC has recently introduced such services along with other leading news providers.

The issue is that often people want to post something to a blog site when they're not at their computer (PC), but actually as it's happening or when it's relevant. For instance, having just left a cinema you'd be more likely to want to post a comment up about the film you just saw than waiting till later when you're back home. Likewise, if you've seen or heard a news story that suddenly affects your or you have an interest, you want to post an entry then and there. In many cases, you'll be out an about, not necessarily at your PC.

Current solutions are to use the micro-browsers available on high-end mobile phones to log in and use either the alphanumeric keypads or micro keyboards to type in your entry. That's fine if you're patient, technically competent and dexterous enough to type more than a sentence or two. For the rest of us, it's still highly impractical.

SpinVox Mobile Blogging is simple. Just call the blog site phone number, speak your blog message and it's converted to text and posted up as an entry.

Imagine seeing a film on new release you love and being the first to blog about it: "I saw the new X-Men film last night and MoBlo'd it to your site with a five star rating!". Or being able to blog a news item: "Just seen a major crash on the M4 at junction 10 involving a petrol tanker. Avoid this route. Police are on their way."

How it Works
- The owner of a blog site decides either they want to enable spoken blog entries on their blog site
- They contact SpinVox and sign up for an account and provide standard information, including their blog site host
- They register the location (URL) and email address
- SpinVox gives the blog owner a phone number (DDI)
- SpinVox will convert any voice messages left on their DDI into text and either
  - Email to the blog site email address
  - Post it via HTTP or similar IP protocol directly to their blog site
- If the owner then decides to publish this number, for instance by putting up on their blog site or emailing it to select people, anyone can use this number to speak them a blog entry. They can simply save this phone number in their contacts/address book so that speaking this blog and entry is always to hand.

Registering Your Name or Handle

When people blog, they often want to say who they are. SpinVox Mobile Blogging gives users the following options:
1. When you call the blogs phone number for the first time, the SpinVox service will prompt you to speak your name or your handle.
   For example:
   a. "Welcome to SpinVox mobile blog. Please first speak your name or handle as you want it to appear each time you speak a blog, or press # to remain anonymous"
   b. User either speaks their name or handle ("Fred Flinstone"), or hits #
   c. "Thank you. Please speak your blog message after the tone. This will be converted to text and posted on this blog site".
2. You can go to a SpinVox website and register that when you call a given blog site (e.g. blog URL: www.filmmaxblog.com) from a phone number you provide (e.g. your mobile: 07812101742), it should display your name (e.g. Fred Flinstone) or enter a default, such as 'Anonymous'.
3. You can optionally chose to display any other details with your entries such as:
   a. Your email address
   b. Your Instant Message ID
   c. Your VoIP ID (e.g. Skype name)
   d. Your phone number
   e. A web address
   f. Etc. . . .

Technical Solution

The major blog site providers (e.g. blogspot, blogger.com, Yahoo!, Google, etc. . . . ) provide an interface so that blog sites they host can receive an email which is then automatically posted to the intended blog site. They also provide standard HTTP post interfaces which allow applications to post entries via the internet.

SpinVox determines which of the blog providers a user is on, and then automatically provisions the right type of interface to use to be able to post the text on to a blog hosted with the provider, either via email or an HTTP post method.

The converted text is then formatted and relevant fields populated to ensure the text posted is displayed correctly on the blog site and has the right information showing. E.g.:
- Time and date
- Text is optionally in quotes (e.g. "Just seen Madonna's confessions and it stank!")
- User name displayed
  - Blog spoken by: <user name or handle> (e.g. Fred Flinstone)
  - Anonymous blog entry
- Any other chosen data the user registered and chose to display
  - E.g. email address, IM ID, phone number, VoIP ID, web address, etc. . . .

X-Links in Blog

Blog providers are able to automatically alert users when a new item has been added, including via email, SMS or IM.

By simple adding in the blog's spoken message phone number (SpinVox Mobile Blog phone number) to the text message or email, all recipients can chose to respond to this entry by calling this number (clicking on it in the SMS).

In addition, SpinVox helps direct people's to respond to a particular blog entry by putting an X-Link into the text message so that it is posted with a particular reference.
For example:
- Albert speaks a blog entry via SpinVox by calling the blogs SpinVox number
- SpinVox posts his entry with an X-Link in (e.g. 02079652000p101)
- The blog site automatically alerts signed-up readers with a message that contains this X-Link
- Readers who call this X-Link will have their reply associated with Albert's original entry and thereby create a thread under his entry.

Mobile Photo Messaging—MoPho™

The market for taking pictures on a mobile device that's connected to the Internet, typically a mobile phone with a camera, is evolving from trying to send other phone users a picture message (typically MMS) or download the picture from the device to a computer and then save it, email it or burn it to CD.

A new genre of mobile photography has emerged whereby a photograph taken on your mobile device can be automatically uploaded to a website for private or shared use. It solves several problems with copying or moving photographs off the device, sharing them and on larger screens where the quality of the photograph can be best appreciated.

However, users often want to post a comment with their photograph as it is being uploaded onto a website for them. Much of the impact (fun or seriousness) of a photograph is best expressed at the moment it was taken, not hours, days or weeks later when you're next at a PC to view and add comments. Using the device's small alpha-numeric keypads to do this when mobile is fiddly at best.

SpinVox enables today's standard mobile photography services (e.g. Cognima's Shozu) with a simple means of also adding a comment as it happens. The user simply now speaks their comment which is converted to text and automatically posted along with the photograph.

Example

Max takes a photograph on his mobile phone whilst on holiday of two friends in front of a famous building
They decide to add a comment to the photograph before posting it "Just bumped into Bill and Ben in front of yes, you guessed it, Big Ben!"

Their message is converted and posted along with their photograph on their photograph sharing website Max's two young children are at home in Scotland. They see that a new photograph has just been added to their father's photograph sharing website.

They laugh and call their father to see if can take another photograph of Bill and Ben with Sherlock Holmes.

The mobile photography service provider would update their application to provision the user with a phone number that is automatically called when they select 'Speak a Photo Comment'. This number is mapped to SpinVox's conversion service which then converts their message and sends it back to a designated location for posting with the user's photograph.

Figure 8:
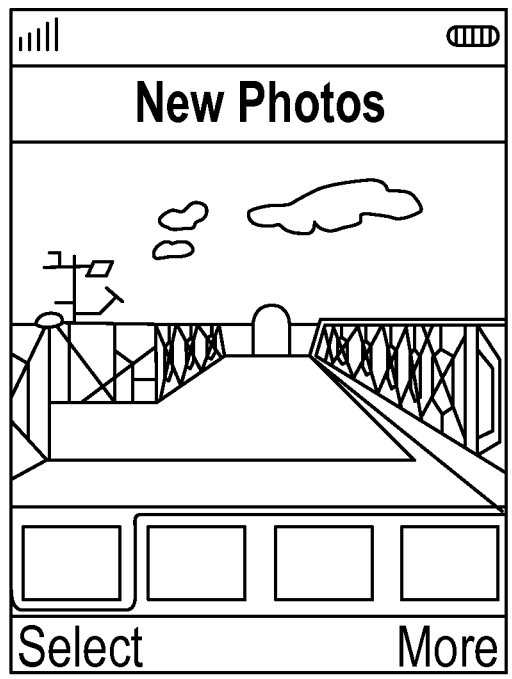
FIG. 8 shows a photograph taken on a camera phone.
Figure 9:
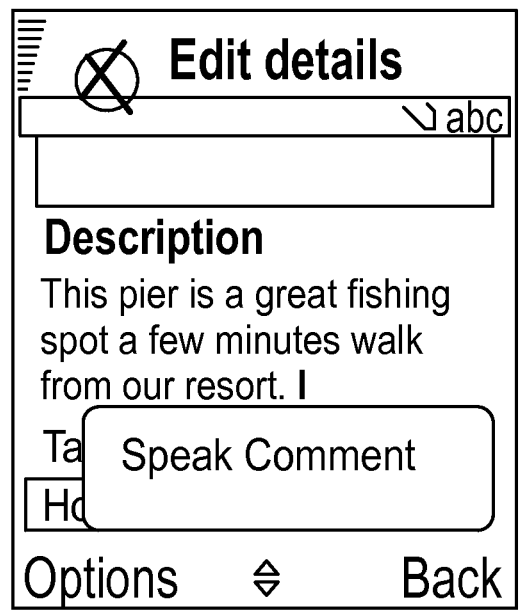
FIG. 9 shows the Speak a Comment option from the Options menu, which may be used to annotate the photograph in FIG. 8.

1. Photograph taken on camera phone—FIG. 8
2. User then selects from Options menu: Speak a Comment—FIG. 9
3. Application connects to a SpinVox service, sends over a unique identifier to link the speaker, photograph and message.
4. User then prompted to speak their message: "please speak your photo comment after the tone"
5. Converted message is sent to mobile photography service provider's system which adds the comment to the photograph Spoken Mobile Messaging in an Online Community SpinVox has launched several products in the SpinX family which includes users being able to speak a message and have it converted and automatically posted to a blog site, or speak a message and have it converted and sent to multiple recipients as either an SMS, email, MMS, IM or other messaging format.

Twitter

SpinVox is launching a service whereby users of the increasingly popular Twitter service (www.twitter.com) can simply use their phone to call a local number, speak their message and have it automatically posted to their Twitter account for them as a text. Naturally, users no longer have to be at a PC and online to use Twitter.

Echo Message—Live Post Confirm

And every time they post, they'll get an SMS reply (or an echo) confirming their posting went live, or not to allow them to retry. This idea applies to all types of web based service you'd post to as you need to know that you're entry/post was successfully converted and posted live to the web, simply because you're not online, but on a phone instead. Echos can be returned as email or IM or other form of messaging and shared wider to keep a group informed too.

This echo behaviour complements the service that Twitter has whereby users can elect to receive an SMS every time someone in their group posts an entry. So with SpinVox, all users can truly stay in touch with their Twitter community by phone wherever they are. If one of the group posts by SpinVox, the rest will automatically get an SMS with what they said, and naturally the option to call in a reply or update. So there's no longer a dependency that anyone is actually online for the group to stay in touch.

This is a significant step forward in removing the existing dependency of Twitter and in fact all other web (PC based) messaging service providers.

Social Network Messaging

In fact, any social network, community forum or other type of online community can benefit from SpinVox providing them with a simple means of staying in touch with their community just by calling in their message, letting SpinVox convert it and post it to their account and then leveraging existing messaging services to let others see your new post. They may be mobile too.

X-Links open up the ability for these communities to use SpinVox without complex sign-ups and decisions. Once they get a converted message, they may also be offered a link which will allow them to speak a reply and have it also posted online, thereby enabling the whole group to stay in touch wherever they are just by a simple phone call.

For example, Yahoo! offers messenger services to its users and as groups, they can now broadcast messages via Yahoo! online to each other, but only when online and they're all logged in. With SpinVox, they'll be able to 'shout out' a message to members of their group and know it'll reach them all whether they're online or not.

Voice Blast

The idea is a 'Voice blast' that reaches users either online or off-line as a text message of one form or another (SMS, email, IM, etc. . . . ). A form of group broadcasting via voice to text where the group is defined by their online connections, but messaged anywhere, particularly mobile.

Dial-Tone=Web-Tone

In short, this expands upon the idea that with SpinVox as a network service, anyone can now use phone networks of any type to speak a message that will appear as text online in an account or place of their choice.

What this also means is that no user, in fact the whole group, actually needs to be logged into their online service/account (e.g. Twitter, Yahoo!, etc. . . . ) to stay in touch with each other. This means these services can be used by the whole group fully off-line and via a simple phone call.

Reducing the Username/PIN Barrier to a Phone Call

What this also means is that a user's phone number (i.e. their CLI or MSISDN in mobile networks) becomes their identity for posting to online services. The elegance of this is that to post to an account or blog or other online service, you don't have to remember URLs, user names or passwords—just make a phone call and you're in!

Twitter Micro-Blog Implementation

This section covers the requirements for launching a new product specifically for use with www.Twitter.com. Twitter is a micro-blogging environment, where users (tweeters) sign-up and then post in short updates (tweets) about what they're doing, using IM, SMS or web.

These bulletins appear on www.twitter.com in their personal page and are sent out to their friends as web updates or by SMS. Tweets are limited to 140 characters. Twitter provide an API which lets 3rd party developers integrate applications and services.

There are two strands to the product strategy. First is the demo: A user can try out the SpinVox Twitter demo by calling a country-local DDI, and seeing the resulting conversion on the SpinVox demo twitter account. This doesn't require any sign-up: just call the number and check the web site. It's analogous to the Spin-my-Blog demo on our web site. The other strand is a more typical Spin-my-Tweet style service: Users sign up for a Spin-my-Tweet style account. They can then call a country local DDI to leave a short message, which is converted and sent to Twitter.

Product Overview

Demo

Customer can try the demo out on www.spinvox.com by calling the country local "SpinVox for twitter" demo number. Their tweets will show up on the SpinVox for twitter page within www.spinvox.com and on the SpinVox demo page within twitter.com. No account created.

SMS delivered back on successful/unconvertible conversion

No SMS sent for hangups.

Entries will be moderated, but this will be after submission to Twitter.

Live

Customer opens SpinVox for Twitter account on www.spinvox.com and enters their Twitter username and password. User is encouraged to sign up with, and use, a mobile number.

User is sent initial PIN via SMS and asked to login to create account.

On login, customer is sent 2nd SMS welcoming them to SpinVox and asking them to save DDI to phone-in their Tweets.

Customer calls country-local SpinVox for Twitter number and leaves message

If deposit is converted, the text is sent to Twitter.

Optional notification SMS on converted and unconvertible.

For hangups, no notification SMS will be sent.

All SpinVox for Twitter accounts are automatically added to friends list of SpinVox Corporate on www.twitter.com (through API)

Twitter Implementation Requirements

1. Service Level 1.1 The end-user will sign-up at www.spinvox.com to use the full SpinVox for Twitter service.

1.2 The service should meet the same availability requirement as the Spin-my-Vmail service.

1.3 Recordings should be limited to 30 seconds.

This will be reviewed periodically after launch, to decide whether the limit should be lowered (e.g. to 20 or 15 seconds).

1.4 All SMS deliveries should be limited to a single SMS.

There should be a configuration parameter to specify the number of characters, which will initially be set to 160.

1.5 TAT should be 98% of messages within 10 minutes, measured across a calendar month, where the daily average is 18 seconds or less. I.e. should meet the same TAT requirements as Spin-my-Vmail 1.8 On initial launch the service (demo and live) must support the following languages:

UK English
US English
Canadian English
Canadian French
German
French
Spanish
Australian English
South African English 1.9 On initial launch country-local DDIs must be provisioned for the following countries for both demo and live (i.e. two DDIs for each entry in the list below).

UK (language: en-GB)
US (language: en-US)
US (language: es-ES initially es-US when available)
Canada (language: en-CA)
Canada (language: fr-CA)
Germany (language: de-DE)
France (language: fr-FR)
Spain (language: es-ES)
Australia (language: en-AU)
South Africa (language: en-ZA)

1.10 Country-local DDIs need to be "golden" memorable numbers e.g. in US—415 TWITTER or similar. Priority should be given to live numbers over demo numbers, and to the US and UK numbers.

1.11 After initial launch, the LIVE service numbers need to be capable of handling high volumes of concurrent calls 2. Customer Interaction with IVR It is envisaged there will be minimal interaction between a customer depositing a message and the IVR system.

Live Service CLI Withheld 2.1 For the live service, if the caller has withheld their CLI, the caller should be told to turn off number withholding and call back.

Language Selection 2.2 LIVE service—If the caller has a SpinVox account, and the account's language is one of those listed in requirement 1.9, then we should use that language. Otherwise the language should be whatever is associated with the number dialed. Note for the DEMO service—customer does not need a SpinVox or Twitter account to call the Demo DDI's. If the caller does have a SpinVox account though, we should take their language preference, rather than using the language associated with the country-local DDI.

Use from Unregistered Phone 2.3 If the caller's number does not have a SpinVox for Twitter account associated with it, the caller should be directed to the SpinVox website.

Demo Greeting 2.4 When a user calls a SpinVox for Twitter demo DDI, they should hear the greeting "Welcome to SpinVox for Twitter, please speak your message and it will appear on screen at web address-tbc" If the caller has withheld their CLI, they should also be told:

"You will not receive any confirmation SMS, as you withheld your number".

Live Service Greeting 2.5 When a customer calls a regular Twitter DDI, (s)he will hear the following message: "Please speak your Twitter message after the tone." Voice to be used for all IVR will be female and the same as other current SpinVox products.

2.6 When recording the voice message, the caller should be able to hit the # key to re-record the message. The caller should be informed of this feature, the first three (3) times they use the service. In this case the prompt from requirement 2.5 should become:

"Please speak your Twitter message after the tone. To re-record your message press the hash key (#) at any time"

2.7 If a customer goes over the recording limit specified in requirement 1.3, they will be prompted to re-record the message or leave the message as is. This mirrors current behaviour of other SpinVox products.

2.8 There will be no DPA prompt.

3. Provisioning/Account Management

Sign-Up Information 3.1 To create a SpinVox for Twitter account on www.spinvox.com, a user has to enter:

mobile phone number
Twitter username and password
email address
language preference
country If the country is the US, then the user should also have to provide state A DDI should not be assigned to the user, but rather they are told which of the country-local DDIs (see requirement 1.9) they should use. Use of the SpinVox Twitter demo does not require an account to be set up.

SpinVox Tweet-Out 3.2 By default, when a user signs up for a SpinVox for Twitter account, a tweet should be posted to their Twitter account:

I've just signed up for SpinVox for Twitter at www.spinvox.com/twitter

The sign-up page should have a checkbox which controls whether this announcement is posted. It should be on by default.

Twitter Account Validation 3.3 When a user is registering for a SpinVox for Twitter account, we should validate whether the Twitter account details are valid. If the account isn't valid, then the user should be given a link to the account creation page at www.twitter.com.

PIN Notification by SMS 3.4 When an account is created as per 3.1, an SMS should be sent to the user with an initial PIN, which they need to log in to the web site.

Welcome SMS 3.5 Welcome SMS is sent to customer as they successfully log-in for the first time only. Welcome SMS copy TBC.

SMS Notification 3.6 Customer can control whether they get SMS notification for the two cases:
    message converted and sent to Twitter
    message was unconvertible These can be controlled independently via self-care, so a user can turn off the converted notification, but leave on notification of unconvertibles, for example. For new accounts, SMS notification should be turned off for successful conversions, and turned on for unconvertible. These options should not be given on the sign-up page.

Friends of SpinVox 3.7 By default all new SpinVox for Twitter accounts should be added to the friends list of the SpinVox Corporate Twitter page (Marketing owned page). A user should be able to opt out of this via a control in self-care. This control should not be provided on sign-up. This must be covered in the T&C's, which will linked on the sign-up page and in self-care.

Self-Care 3.8 The customer can change the following via self-care:
    Twitter username
    Twitter password The user will be able to change all other fields given during signup as part of regular self-care usage.

Access Control Via PIN 3.9 Customer can enable PIN access to deposit message on their account. If enabled, then the caller should be asked for the account's PIN before getting the regular prompt (requirement 2.5).

4. SMS Message to Caller

When a voice message is successfully or unsuccessfully converted to text, an SMS will be sent to the caller if they have selected this option (see req. 3.6 above).

4.1 For the demo service, if the caller's CLI was withheld, no attempt should be made to send any confirmation SMS's.

4.2 The text message will come from the called number— either the DEMO or the LIVE country local DDI.

4.3 On successful conversion the body of the message shall be shown in Quotation marks e.g.

DEMO=From: <SV Twitter Demo DDI>
Your tweet "<tweet extract>" is posted on www.spinvox.com/twitter (tbc)
LIVE=From: <SV Twitter Local DDI>
Your tweet "<tweet extract>" was posted to Twitter—powered by SpinVox The full SMS text must not exceed the limit specified in req. 1.4. If the full tweet cannot be included, then the extract should finished with " . . . " (ellipsis).

4.4 If unsuccessful, the mobile caller will be sent an SMS as below:—

Sorry, the "tweet" you left could not be converted to text. Please call <dinned-number> and try again. Thank you— www.spinvox.com 4.5 There will be no QuickLink™ at the end of the message.

4.6 No confirmation SMS should be sent to the caller when a call is a hang-up.

5. Conversion

If the message is successfully converted the tweet shall be sent to the customer's twitter page. The message should be tagged with the SpinVox hyperlink.

5.1 LIVE=Converted messages should be sent to the customer's twitter page with the SpinVox source link sending users to www.spinvox.com/twitter product page.

Moderation of Demo Tweets 5.2 All tweets to the SpinVox Twitter demo can be removed by a moderator after posting to Twitter.

5.3 Twitter messages to begin with the word says and followed by the conversion in double quotation marks to indicate spoken message i.e. says "hi I am here speaking to twitter"

The total post must not exceed 140 characters. If the converted text is too long, it should be truncated, and the extract should be ended with " . . . " (ellipsis).

6. Reporting

It will be necessary to report on the activity on the SpinVox for Twitter service. The audience for all reporting is internal to SpinVox, there is no external reporting.

6.1 It must be possible to report on all messages on this service
    Split by language
    Conversion breakdown by product and by customer (conversions, unconverted and hang-ups)
    No. of daily sign-ups and successfully created accounts (sign ups=not logged into website to open account)
    Daily active users
    Average message duration
    Conversion length (in characters)
    Avg. no of msgs/user per period (hr/day/week)
    Traffic profile by time of day/week/month 7. Future Requirements
    Option to bill for this service in future using C/card.
    Option to switch terminating number to rated number to generate call time revenue from deposit calls.
    Ability to track call durations for per minute/second billing
    Review private messages/commands and how use
    Ability to block callers from calling certain number ranges/rates.

8. Web Experience

Customers arrive at www.spinvox.com home page and see Twitter-branded logo or button on home page. They can also access the SpinVox for Twitter page through the products link on home page.

When customers click through they see a SpinVox for Twitter page—containing: —

1) A Twitter logo
2) Instructions about the product and how it works with Twitter
3) Instructions about how to set-up Twitter to work with SpinVox and how to tell their friends to get SMS updates.
4) FAQ's button about SpinVox for Twitter (tweets posted using existing privacy settings etc)
5) A SpinVox for Twitter demo and demo button (showing page www.Twitter.com/Spinvox OR www.spinvox.com/twitter) No account created during demo process as all entries posted as SpinVox
6) Click here button to invite them to set-up an account 7) User needs to input twitter username and password, along with mobile number and email. Encourage user to input mobile phone no. as primary choice
8) Ability to manage the service within My Account.

Section D: Missed Call Messenger

Missed Call Messenger™

Missed Call Messenger (MCM) solves the problem that faces many callers and carriers—namely, in markets where voicemail isn't enabled, callers now have the option of speaking the person they tried to call a text message of some form and so stay in touch.

Many markets see less than 50% voicemail penetration, such as southern Europe (Spain, Italy, Greece, etc. . . . ). The reasons are mainly two-fold:
1. Voicemail is a chargeable service and in high pre-paid mobile phone markets, users tend to turn it off to save on costs as calls to deposit and retrieve a voice message are in the cent per event range.
2. Culturally, voicemail is perceived as too formal and business-like and often seen as a rude way for daily messaging.

Insight

The insight here is that what callers do in this scenario is to not leave a voice message—where voicemail exists, or hit a dead-end (e.g. ring out, busy, off) where none exists—but instead hang-up and in some 30% of cases type a text message to the person they tried to call. So actually, in these cases their chosen form of messaging is to send a text when they can't reach the person they're calling.

For carriers, missed calls (non-completed) of this type account for several billion events per year. In Spain, the second largest network (Vodafone) has some 2.3bn missed calls a year.

MCM solves this neatly for all parties. It is a network based service, so no handset dependency at all and works as follows:

When a call is being placed to a subscriber/customer who hasn't got voicemail services, the network knows to catch the call before it fails—hits busy tone, rings out, phone is off or unavailable/out of range.

The network then picks up the call and plays back an IVR recording to the caller of the form: "If you would like to speak a text message to the person you are calling, press 1".

If the user selects this option (e.g. 1), then they're simply offered a prompt to speak their message—e.g. "speak your text message after the tone".

The system then records the audio, sends it to the SpinVox VMCS for conversion, and the converted text then sent on to the called party and sent as if the message had originated from the calling party, not a system number or name. Typically this is done by using the callers CLI and putting it in the 'from' field of the sent message.

Today, this is being rolled out with SMS, but MMS, email, WAP/HTML pages and any other form of text messaging can be used depending on the network's capability and user requirements.

The benefits are simple, but very large:

Callers get through first time when they need to

Recipients see immediately who needs them and can read the actual message

The role of message choice and charging is reversed. Typically, voicemail is a B-party service (recipient) because they pay and opt to have it. With MCM, it's actually an A-party (caller/sender) service as they opt-in every time they use it (no subscription) and they can also be billed for the use of the service.

Carriers can generate new revenue from missed calls as now the caller (A-party) can be charged for the option of speaking a text either by call termination charges, premium rate SMS or inter-network charging models—all of which exist today.

Likewise, a more classic B-party charging model is possible two, just like voicemail is today.

Call continuity (the number of additional calls or text messages or data traffic generated as a consequence) rises. This is expected to be more than existing missed call alert products which are known to be some 2-3%, and SpinVox MCM is expected to be more similar to SpinVox Voicemail-to-Text which has an impressive 7% voice uplift and 17% text uplift.

This service serves callers from any network, not just those on the home network. E.g. Callers may call from network x to a person on network y. Network y has enabled MCM and can offer this service to callers from network x and generate additional revenues from any missed call, not just on-net. Likewise; this can be reversed so that callers from the host network (network y) may be offered this service when unable to reach users on other networks (network x). These combinations provide the ability for the host network for MCM to capture all missed calls relating to their subscribers/customers regardless whether they're the A or B party. See table below.

Some networks can deploy this as a recipient (B-party) service instead and bill them for use of service, much as voicemail is today, so MCM can fit existing business models.

Figure 10:
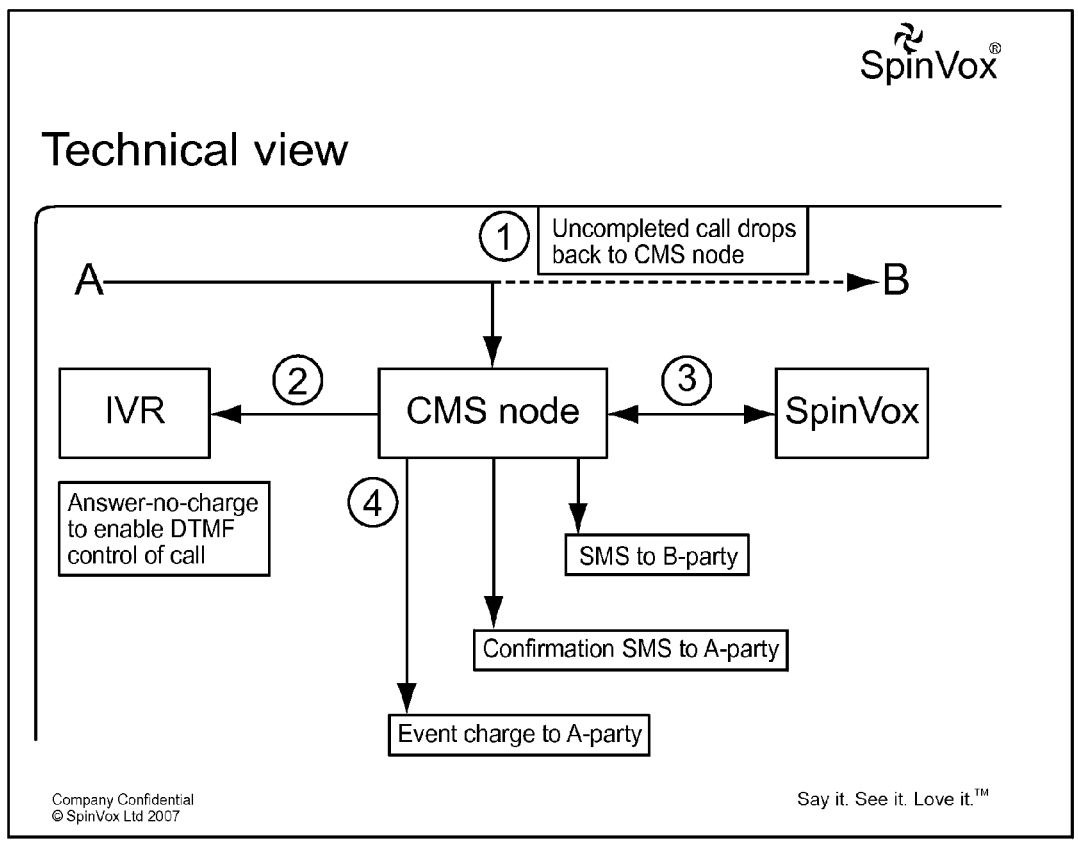
FIG. 10 shows MCM with SpinVox Voicemail to Text also deployed.

How MCM is being Deployed:

FIG. 10 shows MCM with SpinVox Voicemail to Text also deployed.

MCM allows the host network to serve A party callers regardless of whether they are on the home (host) network or not, providing 100% reach for serving missed calls relating to their subscribers/customers:

| A party (caller) | B party (recipient) | MCM available |
| --- | --- | --- |
| On net | On net | Yes |
| On net | Off net | Yes |
| Off net | On net | Yes |
| Off net | Off net | No |

Clearly, missed calls that occur between other networks are beyond reach.

Billing Options

Where required, MCM can be charged for in different ways:

Call termination charges to the A-party (caller) based on minimum and/or per second/per minute charges. This is similar to the way voicemail deposit's are charged.

Premium rate confirmation SMS sent to the A-party to charge them for each time the opt to use MCM Cross net charges for the service, so networks x & y would agree that they'd charge each other and therefore their users a certain amount for each event which would appear on their bill. The difference here is that this could be done via premium product billing API's or protocols to put the product/service into a different billing class, not standard voice call charge.

Free—the call-continuity and call completion impacts can be highly favourable and offset any need to generate revenue explicitly from each event.

Again, this can be reversed so that it's a B-party service and they pay for it as shown in any of these methods, or it is a standard feature as voicemail currently is today.

Product Options

Given that not all networks can manage calls as shown in the above designs, there are other ways of providing MCM:

Option 1: Call back for message
Call is attempted to B-party, fails and clears
A-party is called from network and offered service
If accepted, message recorded and processed
A-party is charged only if message is converted
If not converted, B-party receives standard missed call alert Option 2: Text back for message
Similar to Option 1, but service offered via SMS
A-party responds to SMS if they wish to invoke service
A-party calls IVR via embedded link in SMS (free call)—see X-Links above
Charged for service only if message successfully converted
If not converted, B-party receives a standard missed call alert (MCA)

Retrieval Options

In all the above options for MCM, the B-party (recipient) may want to hear the voice message. In this case they can be offered a number to call and have that message played back to them.

This is either as an extension to SpinVox's existing QuickLink™ technology whereby the converted text message for the B-party contains a link that either places a call to a network service (typically IVR) that then automatically plays back this message. The link itself can either be a real phone number and then a set of digits that when the user types them in tells the system which exact message to play back.

Alternatively, this can be a virtual number that the network can create which means that in one call the network knows both the type of call and which exact message this relates to.

Attached or Embedded Audio

Alternatively, the audio is hosted on a web site and streamed back over a data channel, or it's sent as an attachment/embedded file which is possible with MMS, email and other multimedia capable forms of messaging.

Naturally, retrieving the audio can create new incremental revenue for the carrier which didn't exist before.

Section E: Overview of Spinvox Products

The preceding Section D described a specific innovation, Missed Call Messenger. This Section E provides an overview of the array of SpinVox products.

Figure 11:
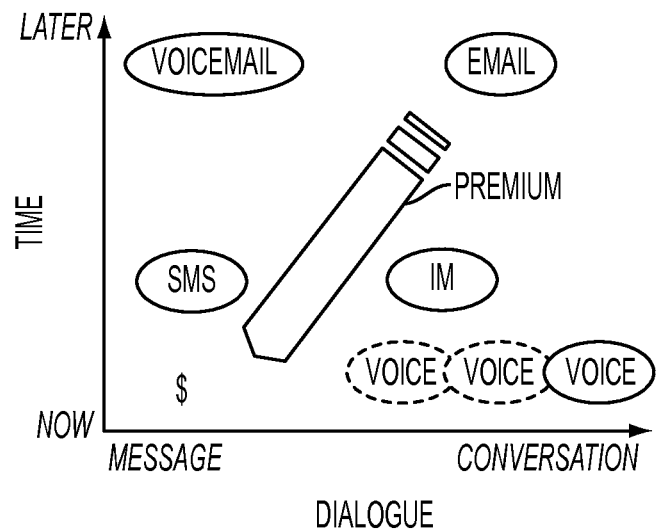
FIG. 11 shows how various conventional messaging products (voicemail, email, SMS, IM and voice) are distributed on a Time v Dialogue axes.
Figure 12:
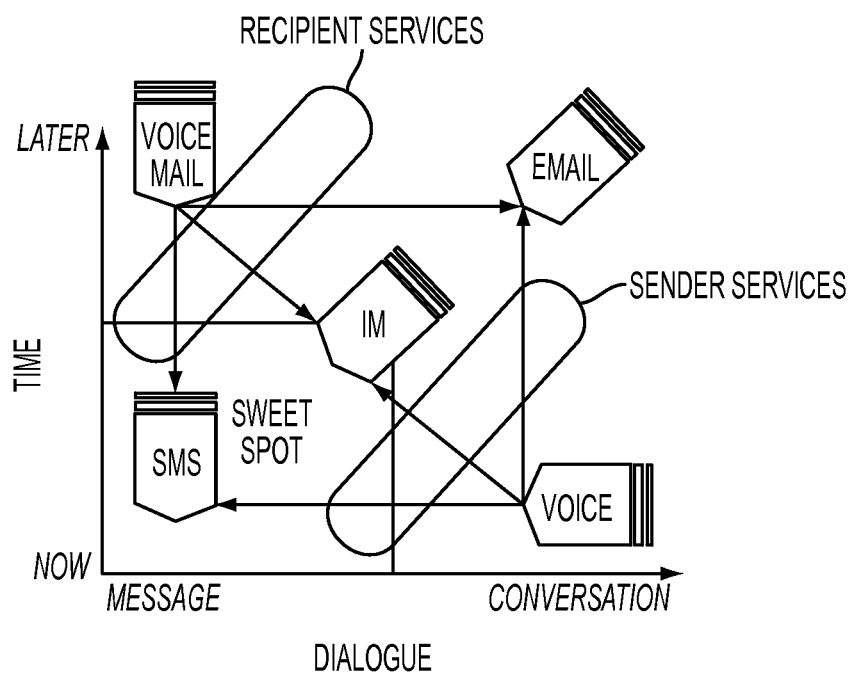
FIG. 12 shows how various SpinVox products alter the landscape of FIG. 11.

Two generic types of product are available:
Sender: where you choose to speak a text message
Recipient: where you choose that people speak you a text message All of these share the ability of one person to speak another a text message of some format. FIG. 11 shows how various conventional messaging products (voicemail, email, SMS, IM and voice) are distributed on a Time v Dialogue axes. FIG. 12 shows how various SpinVox products alter this landscape.

Recipient products extend a dialogue; reduce inherent delays in receiving message; give real-time voicemail (push); use a seamless interface; are ubiquitous, and work on any device, any technology, any network.

Sender products initiate new dialogues; use a simpler interface to make mobile messaging more intuitive; allow ordinary users to Say it, Not Thumb Type It!; require nothing new to learn; allow existing applications to be enhanced; generate new modes for messaging to provide real 'mobility'—such as safe and fast use even whilst driving, walking, etc.; allow new revenues from existing products.

We will now look at each category in more depth.

Recipient Products

These are all products where you actively decide to enable others to message you by speaking you a text message.

E.1 Voicemail-to-Text™

When people leave a user a voicemail message, it is converted and sent to the user as an SMS message.

QuickLink™ allows users to listen to the original message the text relates to.

E.2 Voicemail-to-Email™

When people leave a user a voicemail message, it is converted and sent to the user as an email.

When the message was not converted, they can optionally be sent the original audio message as an email attachment.

QuickLink™ allows users to listen to the original message the text relates to.

E.3 Call-to-Mail™

Designed for call centres, direct marketing response and other customer facing functions, callers can either:
opt out of the queue in favour of speaking a message that's converted and sent as email
always be asked to speak a message that will be converted and sent as email E.4 No Answer—Speak a Text—(Missed Call Messenger—See Also Section D)

Designed for users who don't have voicemail, or want voicemail, typically high amongst the prepaid mobile phone market, or non-associated voicemail box market.

This is a network based service that manages unanswered calls and offers callers the option of speaking a text to the person they were trying to call. This applies to calls that are unanswered, busy or rejected (send busy tone).

A network operator simply deploys this to all accounts where there user has no voicemail or equivalent voice messaging service.

1. When a subscriber doesn't answer their call, the caller is offered a new option: "I'm sorry, this person is unavailable. To speak them a text, press 1 now."
   a. Optionally, the caller is billed either by time on the line, or per event, e.g. "Calls cost 50 p per minute, minimum charge 20 p"
2. Caller now records their message.
3. Subscriber who missed the call gets a text message from the caller with what they said as text.
   a. Optionally, subscriber given a number to call in to listen to the original message.

What's unique about this is that subscribers won't have to sign-up or pay for the benefit. Callers are given this choice as it might be important to get a message to the person they're trying to reach.

Subscribers can choose how they want messages delivered to them: SMS/MMS, email, etc. . . .

Sender Products—Network Based

These are all products where you decide to speak someone a message that is then converted and sent to them as text.

E.5 Call Return—by Speak a Text

Service providers have been offering subscribers a way of returning a call within voicemail—call back—which the subscriber initiates by selecting an option before or after message play-back. This adds a new option to return the call, but instead by speaking them a text message reply:

1. User calls into listen to voicemail messages. At the beginning or end of every message played back, they are offered the option to speak the caller a text back. "To speak this person a text, press 1 now"
2. They press 1, then speak their message; it's converted and sent straight to the caller's number.

a. The voicemail system has both the caller's CLI and the subscribers, so can correctly form a converted message that is sent as if directly from the subscriber, directly to the original caller. The recipient (original caller) is offered a link to listen to original message.

E.6 IVR—Speak a Text (See Also Appendix I)

On any IVR system, an option can be offered to any caller whereby they can speak anyone a message and have it converted and sent as text.

1. User calls either a dedicated number, or calls their voicemail and is offered this option to speak someone a text:
"To speak someone a text, press 1"
2. User then prompted to enter the phone number of the recipient. They either enter the numbers on their phone keypad and the system detects the DTMF or equivalent signalling tones, or they select them from an address book.
3. System checks phone number is valid.
4. User then prompted to speak their message:
"Please speak your message after the tone"
5. They speak their message, it's converted and sent straight to the caller's number.
   a. The voicemail system has both the caller's CLI and the subscribers, so can correctly form a converted message that is sent as if directly from the subscriber, directly to the original caller.

E.7 Network Service—Speak a Text

This is typically for landline networks where people are still accustomed to dialing phone numbers, but is technically possible on any network type—fixed, mobile, wireless, VoIP.

If you want to speak someone a message, simply put a call 'modifier' (prefix or suffix) with the number of the person you want to message. Then the user hears "Welcome to Speak-a-Text. Speak your message after the tone." The user speaks the message and hangs up. The message is converted and then sent to the correct recipient. The recipient is offered a link to listen to the original message.

Sender Products—Handset Based

This applies for users who want to speak someone a text message rather than call them, much like opting to send someone an email or an SMS. More details on this are given in Section E.10 below.

E.8 Spoken SMS

Four options to Speak-a-Text on a handset:
1. Application on 'home' screen
2. Menu option in Address Book/Contacts
3. Menu option in Messaging apps
4. Menu option in Call/Missed call list
   a. Natural extension of existing native applications
   b. New option: 'SpeakTxt'

Note: Although Spoken SMS is shown, the concept is the same for speaking an MMS, an email, an Instant Message or any other messaging product type.

E.9 Spoken Mail

An application on the handset allows a user to select who they want to email, SMS or MMS. They are then offered a Speak mail function. The user is connected to a SpinVox spoken message service where they are prompted to record their message. The application sends through who the mail is for—the destination email addresses or list of addresses, subject, and any other message parameters.

Figure 13:
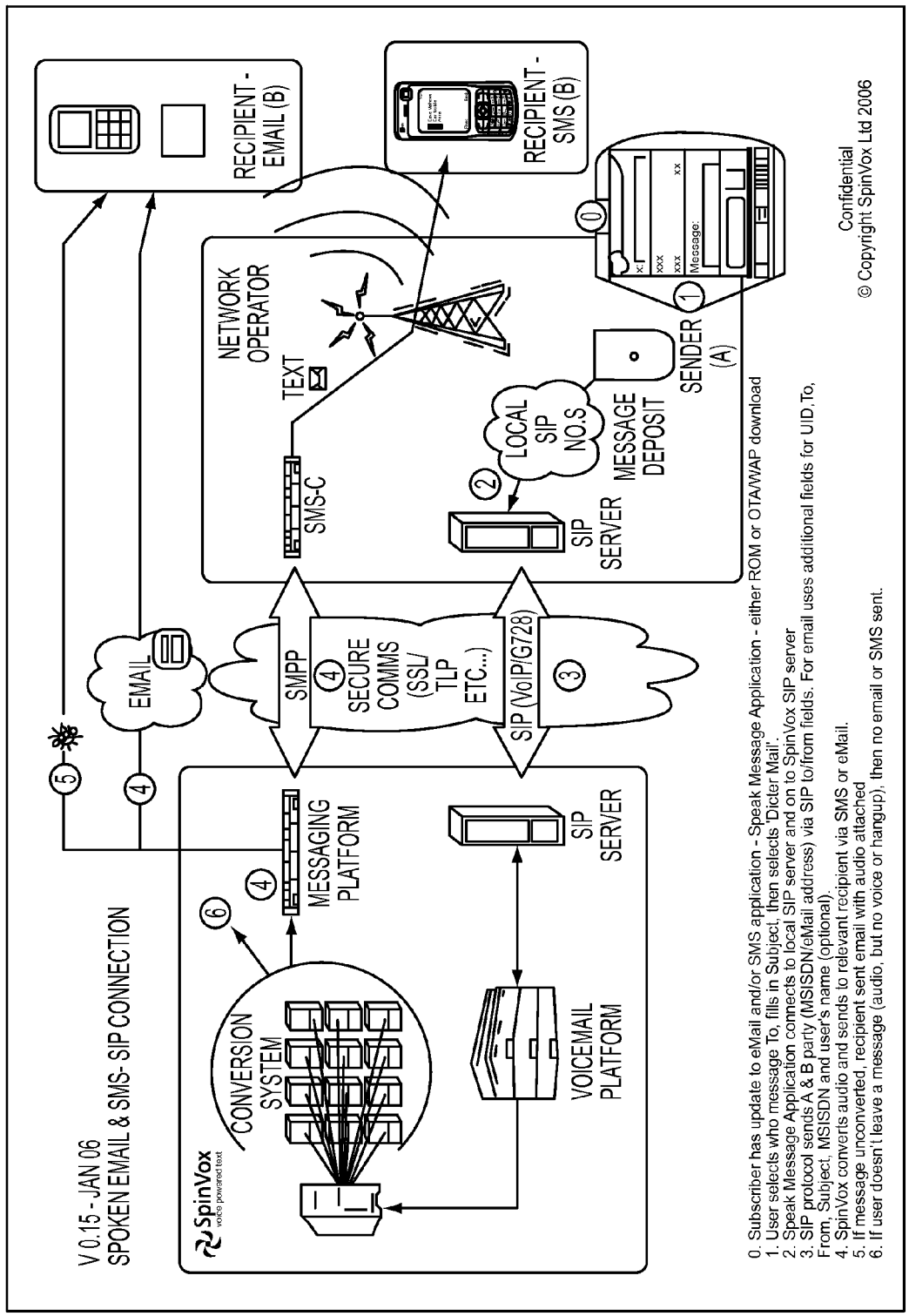
FIG. 13 shows an example of a deployment of Spoken email and Spoken SMS/MMS with a mobile service provider—SIP telephony connectivity.

FIG. 13 shows an example of a deployment of Spoken email and Spoken SMS/MMS with a mobile service provider—SIP telephony connectivity.

Figure 14:
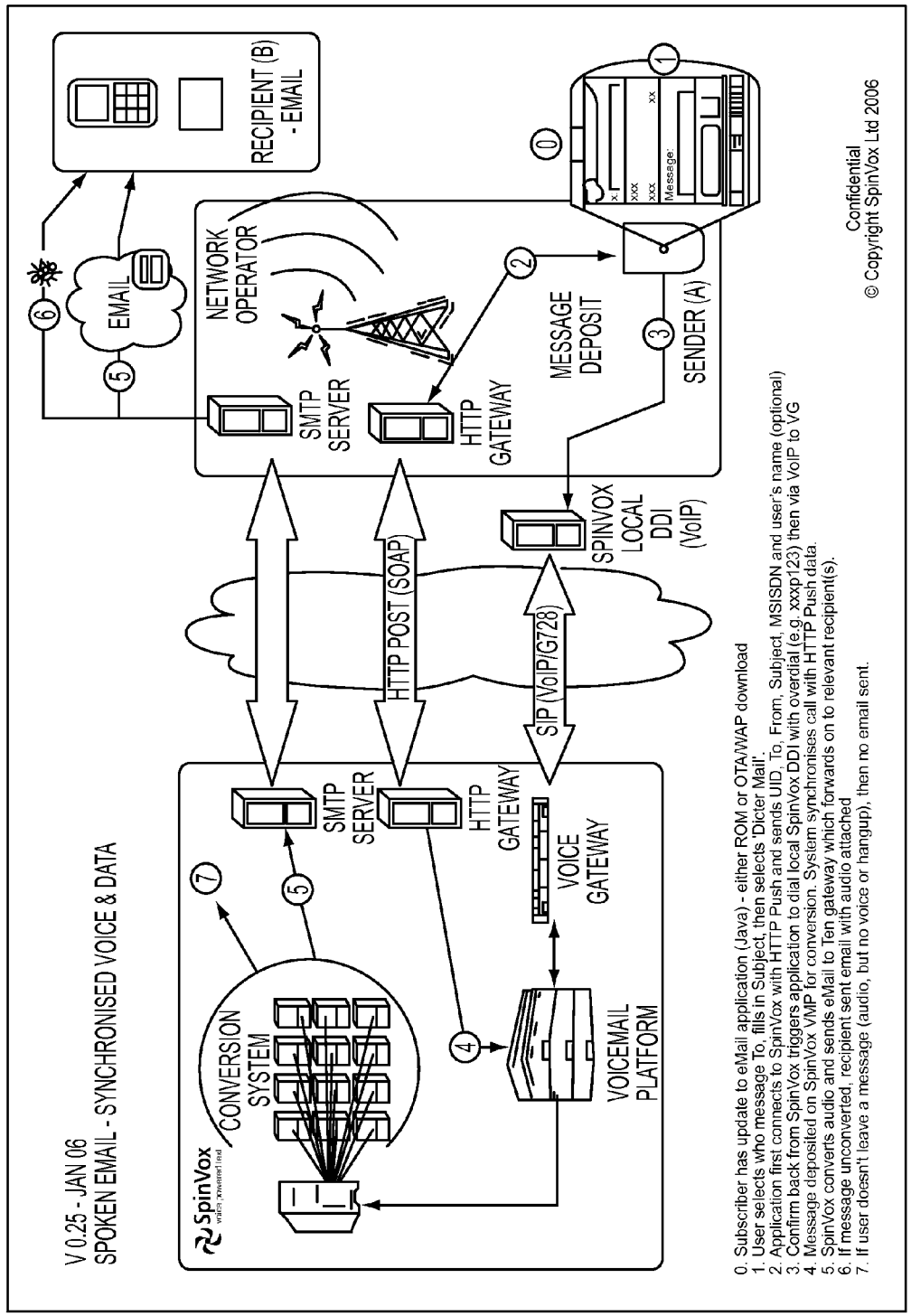
FIG. 14 shows an example of a deployment of Spoken email with a French mobile service provider—standard telephony and synchronised data.

FIG. 14 shows an example of a deployment of Spoken email with a French mobile service provider—standard telephony and synchronised data.

Fire & Forget Principle

In any of the methods shown, there is a simple principle that makes the user experience unique:
minimum effort—just speak your message
nothing to learn—just like leaving a voice message on standard voicemail
reliable—few steps as possible to avoid confusion or technical failures
robust—only if the message isn't converted do you need to do anything, otherwise you know it's been done The following section will focus on handset based sender products.

E.10 Speaking a Message from a Mobile Device

Speaking a Message

SpinVox has created a software application; Speak-a-message (also called SpinMyText), which when loaded onto a device, such as a Nokia mobile phone, allows a user to speak a message, which is then delivered to the recipient as text.

The purpose of this service is to give a user the ability to speak a message rather than type it out on their phone keypad. This will make it more convenient, easier and faster than typing it on their phone keypad.

Messages can be sent in the form of an email, SMS or MMS message, depending upon the details stored in the Address Book of the device, for the recipient. Multiple recipients can be sent the same message by using the 'broadcast' facility of the application and messages can also be delivered to customers Blogs or other web-based applications.

Embedded Menu Items

Additional functionality is brought to the device, by adding new menu items into the standard menu tree. The menu option "Speak-a-Message" is added to the following applications:
Text Messaging Application
MMS Messaging Application
Email Application
Instant Messaging (IM) Application
Address Book
Call Logs
Home screen, using a soft key The functionality that the menu option gives, changes dynamically, depending upon which application the user is in, as detailed below.

Text Messaging Application
Selecting the Speak-a-message option allows the user to:
Create a new message using the contacts Mobile number as the destination
Reply to a previous message using the number provided
Applies to any of SMS, MMS, IM or other messaging application on the device Email Application
Selecting the Speak-a-message option allows the user to:
Create a new message using the contacts email address as the destination
Create a new message to multiple recipients using their email addresses as the destination
Reply to a previous message using the contacts email addresses as the destination Below are the generic actions a user will take in either the text messaging or email application to send a message.
1. Caller selects Messaging/SMS application and selects 'Speak a message' option from menu and is directed to Contacts.
2. When the Contact has been selected a connection to the SpinVox platform is established
3. An announcement requesting the user to speak their text message will then be played
4. The caller will leave an audio message.

5. The B Party information is passed to SpinVox (Selected in Step 2).
6. The SpinVox platform will convert the audio to a text message for onward delivery.
7. The message is then sent from the A Party to the B Party as if they had typed it.
8. The B Party receives the message and it appears to have come from the A Party. No special system numbers are used or substituted.

Figure 15:
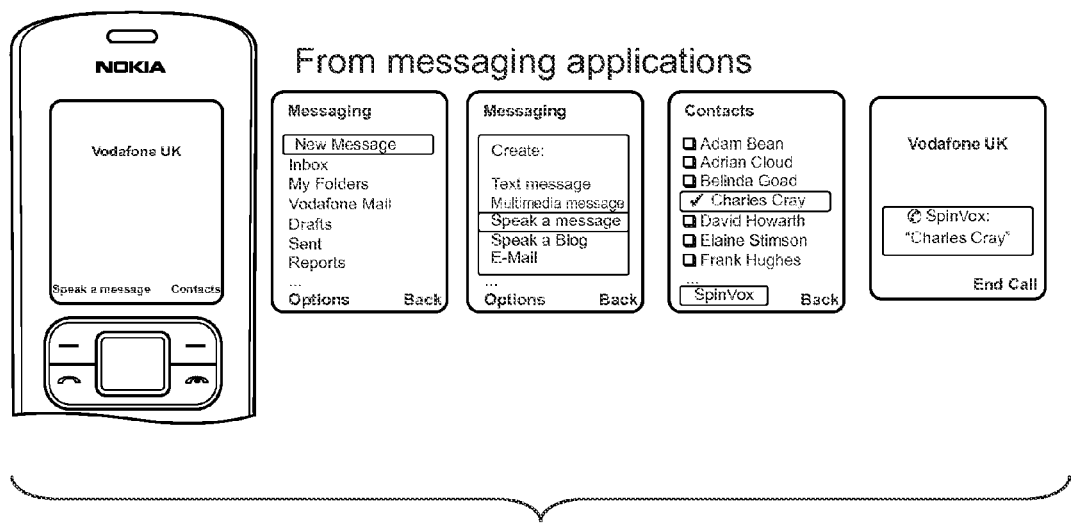
FIG. 15 shows the typical user experience of speaking a message from within the Text Messaging or Email Application.

FIG. 15 shows the typical user experience of speaking a message from within the Text Messaging or Email Application Address Book Selecting the Speak-a-message option allows the user to:
Create a new message (Intelligent addressing decides the message path). Below are the steps taken by a user accessing Speak a message from within the address book application:
1. Caller selects a contact from the Address Book.
2. Caller is presented with a menu option to Speak a message
3. When the Speak a message option has been selected the intelligent addressing function looks at the available methods for delivering a message and then makes a connection to the SpinVox platform
4. An announcement requesting the user to speak their text message will then be played
5. The caller will speak a message.
6. The B Party email address or phone number is passed to SpinVox service (Selected in Step 1)
7. The SpinVox platform will convert the audio to a text message for onward delivery.
8. The message is then sent from the A Party to the B Party as if they had typed it.
9. The B Party receives the message and it appears to have come from the A Party. No special system numbers are used or substituted.

Figure 16:
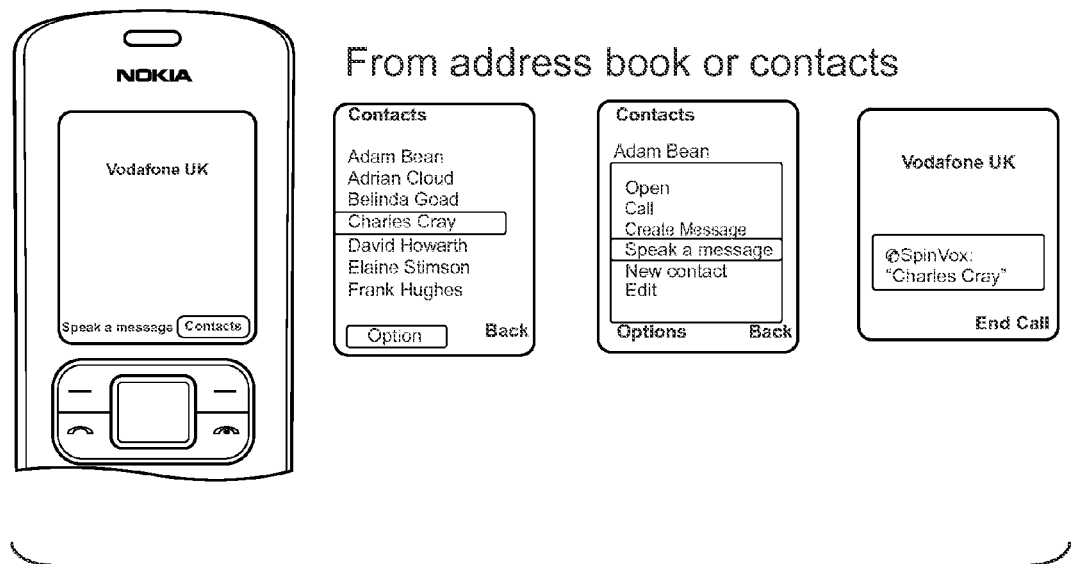
FIG. 16 shows a typical user experience of speaking a message from within the Address Book.

FIG. 16 shows a typical user experience of speaking a message from within the Address Book Call Logs Selecting the Speak-a-message option allows the user to:
Create a message for numbers listed in the Missed Call log using SMS as the reply path
Create a message for numbers listed in the Outgoing Call log using SMS as the reply path
Create a message for numbers listed in the Incoming Call log using SMS as the reply path The above methods are easily accessed using the main navigation buttons on the device, such as Call, or Menu. There is no need to use lesser accessible alphanumeric keyboard to type in information.

The steps below are the generic actions a user will take to reply to someone whose phone call they missed, or to whom they have recently spoken.
1. Caller selects a contact from the Call Log
2. Caller is presented with a menu option to Speak a message
3. When the Speak a message option has been selected a connection is made to the SpinVox platform
4. An announcement requesting the user to speak their text message will then be played
5. The caller will leave an audio message
6. The B Party number is passed to the SpinVox platform (Selected in Step 1)
7. The SpinVox platform will convert the audio to a text message for onward delivery
8. The message is then sent from the A Party to the B Party as if they had typed it
9. The B Party receives the message and it appears to have come from the A Party. No special system numbers are used or substituted.

Figure 17:
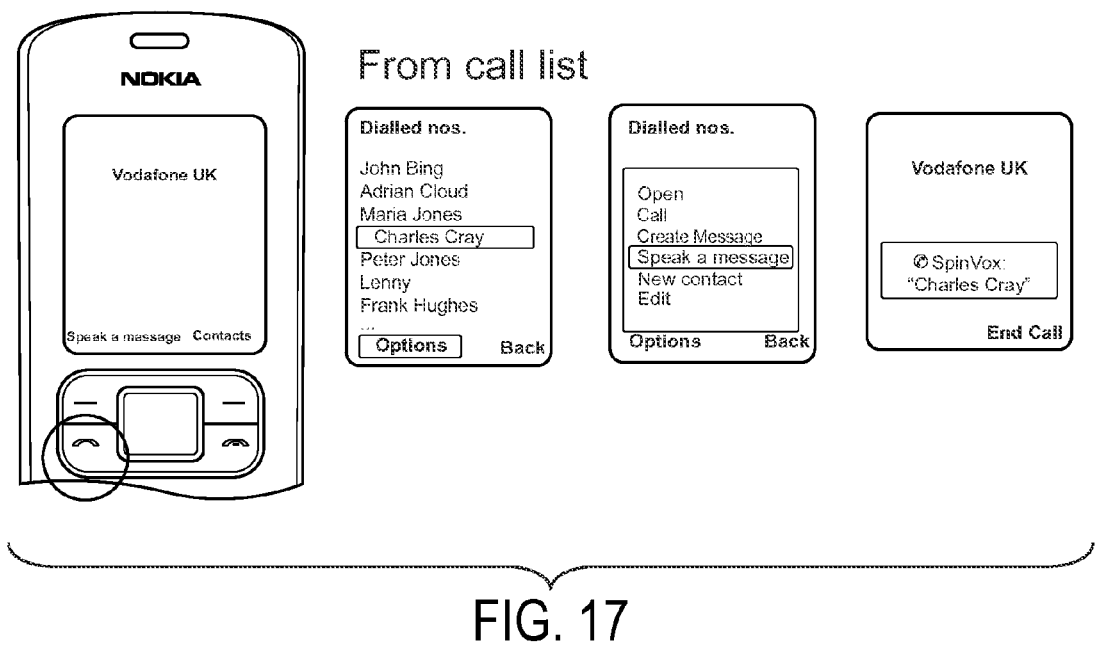
FIG. 17 shows the typical user experience of speaking a message using the Call Log.

FIG. 17 shows the typical user experience of speaking a message using the Call Log.

Soft Key Access

It is possible to activate the Speak a message application from the Home Screen of a mobile phone, by using one of the soft key shortcuts, rather than having to navigate to a particular application, such as the Address Book, first.

Caller Access—Soft Key

Below are the steps a user will take to speak a message from the Home Screen of a device.
1. Caller selects the Speak a message soft key and is directed to a list of Contacts they can speak a message to where they then choose a contact.
2. When the Speak a message option has been selected a connection to the SpinVox platform is established
3. An announcement requesting the user to speak their text message will then be played
4. The caller will leave an audio message.
5. The B Party number should be passed to SpinVox (Selected in Step 1)
6. The SpinVox platform will convert the audio to a text message for onward delivery
7. The message is then sent from the A Party to the B Party as if they had typed it.
8. The B Party receives the message and it appears to have come from the A Party. No special system numbers are used or substituted.

Figure 18:
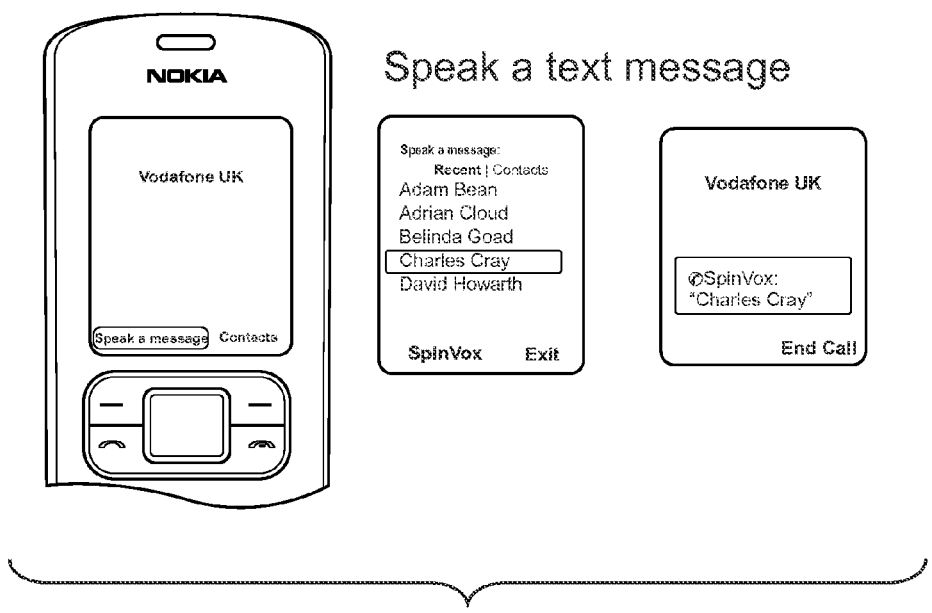
FIG. 18 shows a typical user experience of speaking a message from within Speak a Message application.

FIG. 18 shows a typical user experience of speaking a message from within Speak a Message application Extendable Application The Speak a message application can be easily extended to offer additional functionality for many different types of Spoken Messaging. Additional message types include Social Networking applications such as Blogging and peer to peer communication, such as Instant Messaging.

Figure 19:
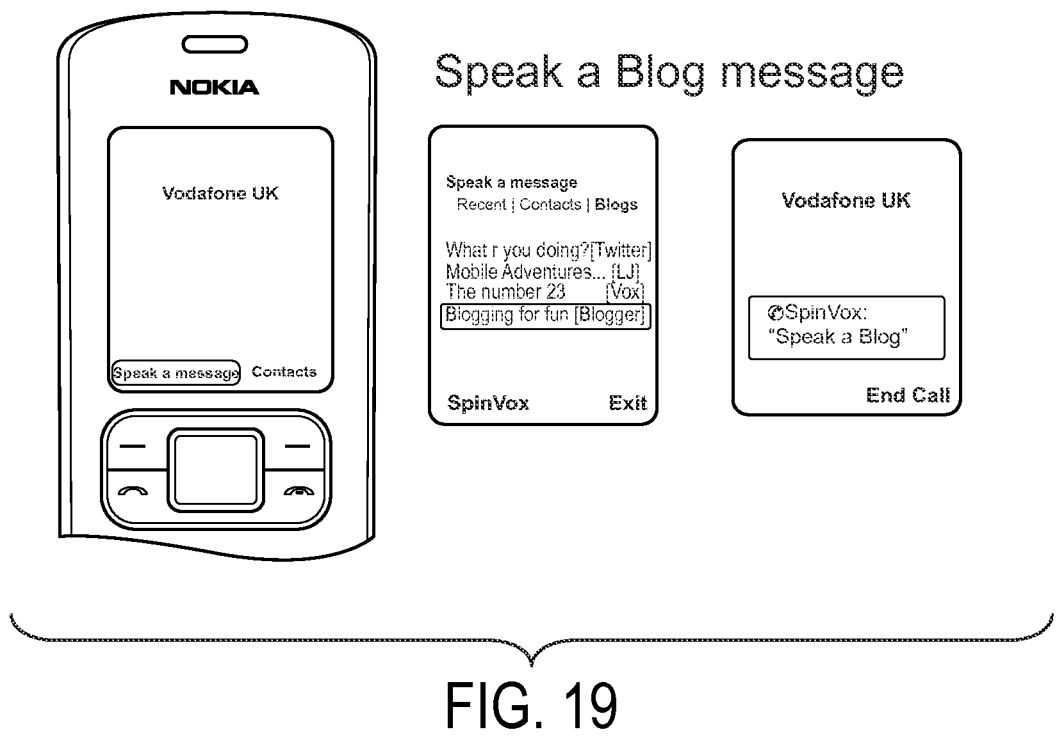
FIG. 19 shows a typical user experience for Speaking a Blog.

FIG. 19 shows a typical user experience for Speaking a Blog

Figure 20:
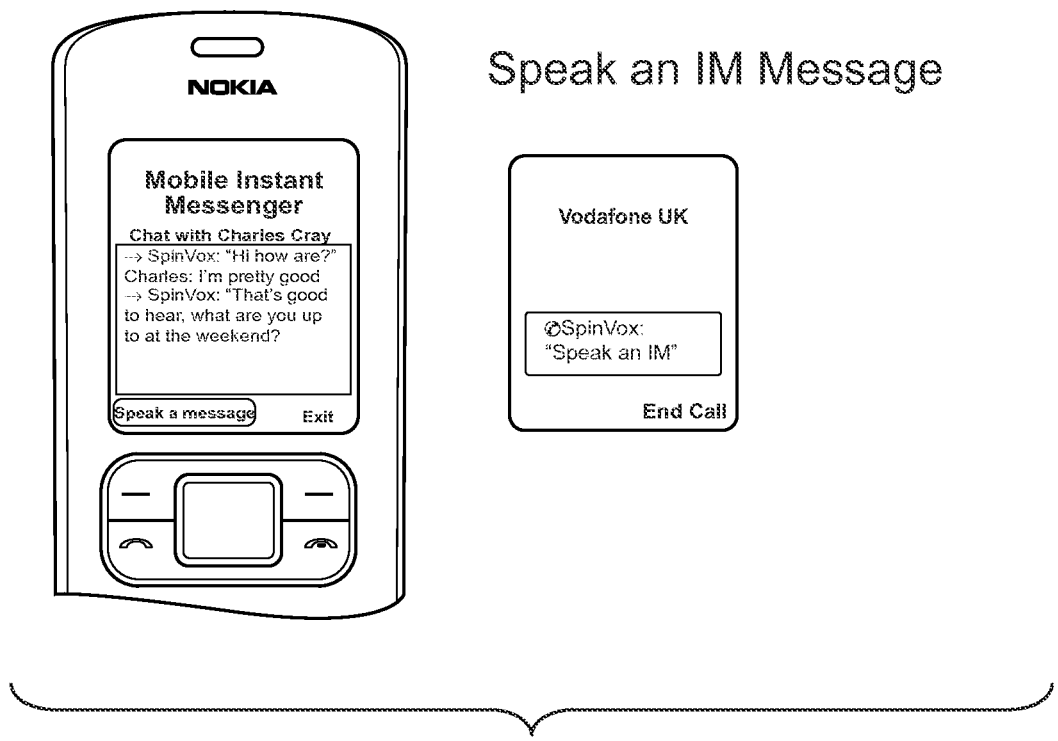
FIG. 20 shows a typical user experience of speaking a reply in a Mobile IM client.

FIG. 20 shows a typical user experience of speaking a reply in a Mobile IM client.

User Experience

'Fire & Forget' in 3 Clicks

Figure 21:
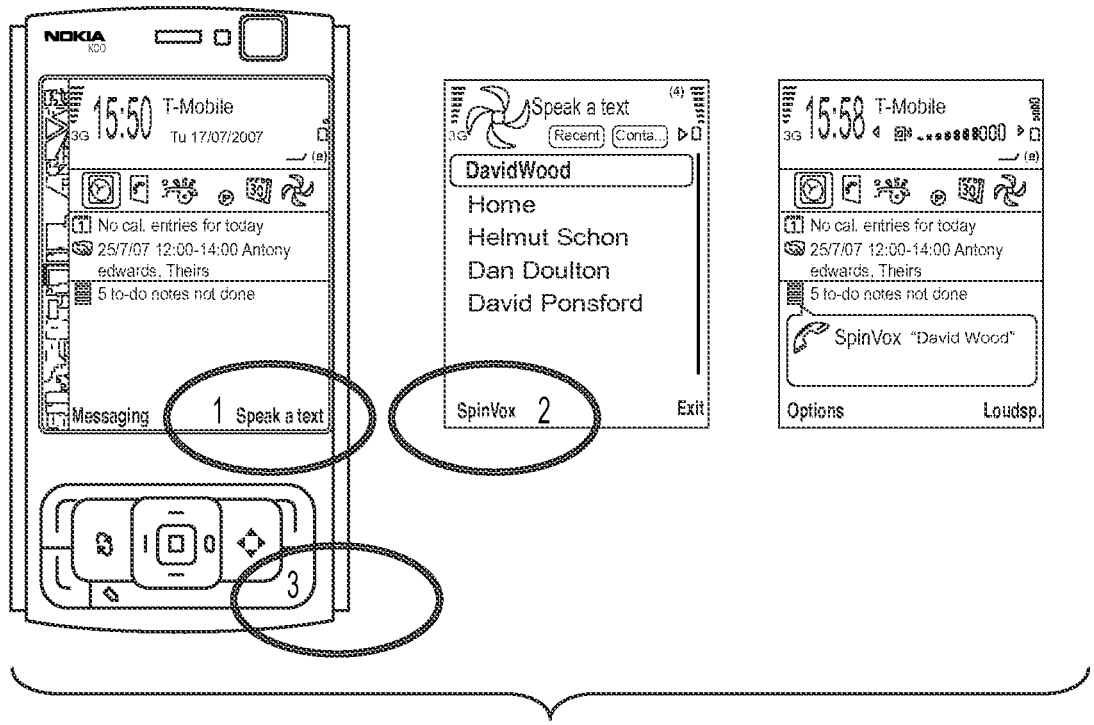
FIG. 21 shows the '3 clicks' user experience.

The Speak a message application uses a unique 'Fire & Forget' system for creating and delivering messages. This differs from other systems that require the user to speak, review (on screen) and confirm before finally sending the message. Fire & Forget means:

minimum effort—just speak your message
nothing to learn—just like leaving a voice message on standard voicemail
reliable—few steps as possible to avoid confusion or technical failures
robust—only if the message isn't converted do you need to do anything, otherwise you know it's been done The Speak a message application takes control of the mobile device, providing a means of always being able to speak a message within 3 clicks. Typically these 3 clicks are translated into the following actions:
1. Select 'speak a text'
2. Choose whom to send a message to . . . speak a message
3. Hang-up FIG. 21 Shows the '3 Clicks' User Experience The Fire and Forget system combined with the 'no more than 3 clicks' approach means that the user can send messages in situations where other systems could not be used, such as walking along a street, or in a situation where it's not possible to look at the screen for any length of time.

The Speak-a-message application is also designed for one-handed use, with all the functions easily accessible using a single key click and the menu navigation device of the handset.

Figure 22:
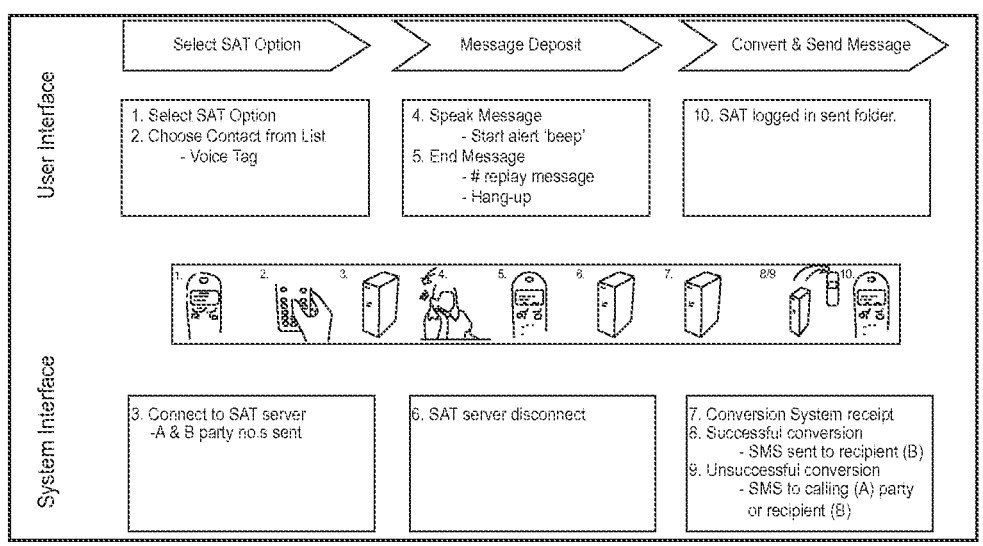
FIG. 22 shows the 'Fire & Forget' system employed by Speak a Message.

FIG. 22 shows the 'Fire & Forget' system employed by Speak a Message.

Intelligent Message Addressing and Delivery

When a user elects to speak a message to someone from his or her Address Book, the type of message that is to be sent is decided by the contact details available in the address book.

- If only an email address is available the message is sent via email.
- If only a mobile phone number is available, the message is sent via SMS or MMS
- If an online account name is present for IM or other, the message is sent here
- If multiple are available, the message can be sent to a selection of destinations, however by default the message will be delivered to the mobile number Fast Address List The fast address list is an intelligently compiled list of recent contacts, which is produced by understanding the users previous behaviour.

The algorithm builds a list of the most recent people the user has been in contact with, taking into consideration the following:

- The communicating type (email, text message, phone call, or spoken text)
- The frequency of communication with that contact
- How recent the last communication was
- Alphabetical order This is then presented in a single, easy to read list; which still offers easy access to any contact in the customers Address Book. This differs from the existing 'Call Lists', such as the SMS Sent folder, as there is significant intelligence applied in creating the Fast Address list.

Figure 23:
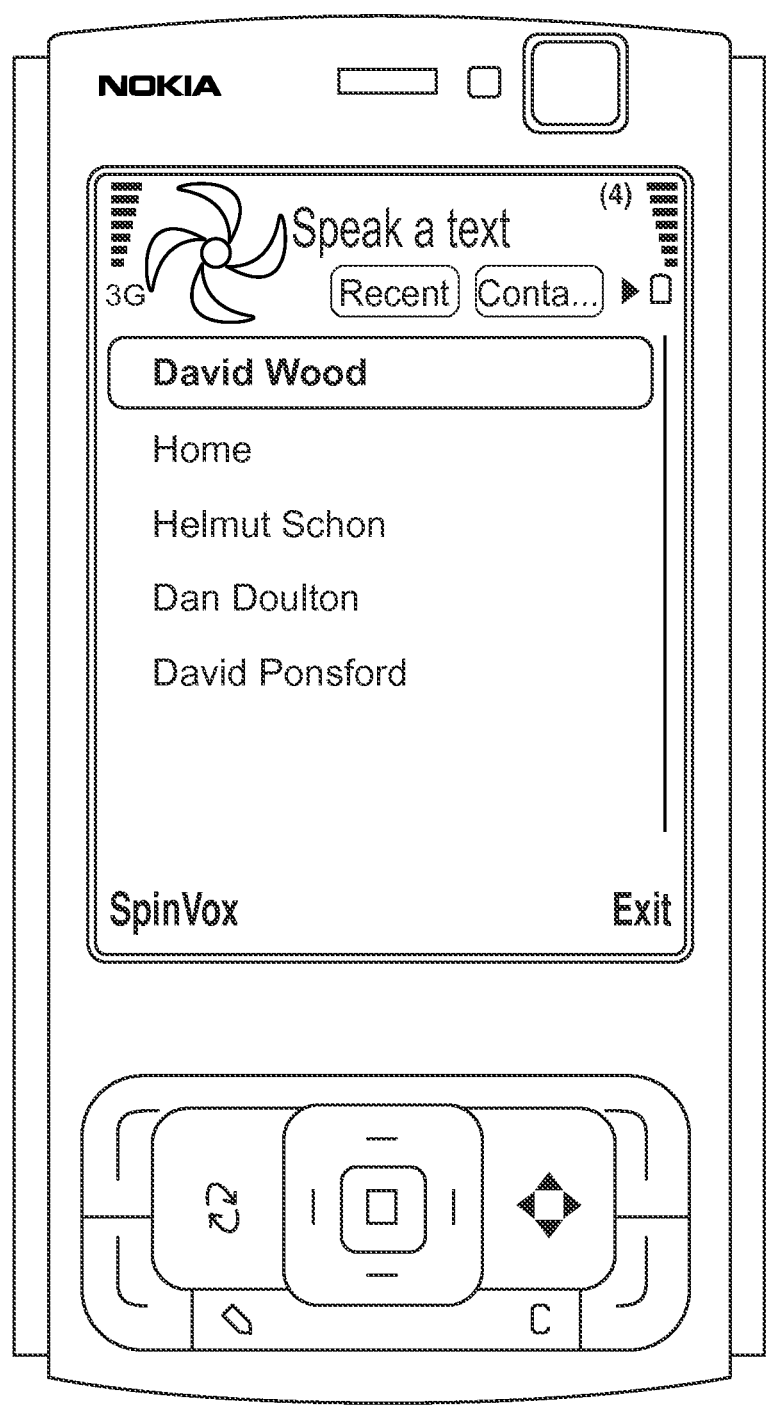
FIG. 23 shows the Fast Address List—showing recent contacts that have Called, been Called, Texted (SMS or MMS) or Emailed (or any other messaging/communications process used).

FIG. 23 shows the Fast Address List—showing recent contacts that have Called, been Called, Texted (SMS or MMS) or Emailed (or any other messaging/communications process used). Because the Fast Address List is comprehensive, it becomes the central resource for all unified communications tasks the user needs to perform.

Unified messaging breaks down the barriers between various forms of communication, such as voice, email, and voice mail.

The Speak a message application effectively provides the user with a single origination point for all these types of messages, thereby providing the user with a unified message centre on their mobile device.

Having the capability to respond to voice messages using text or text messages using voice may seem trivial, however, it is a means for end users to enhance or even improve upon their productivity, especially if it saves them time in communicating with one another.

For mobile users, access to and use of the phone is essential, especially while they are in transit. With the Speak a message application offering a unified messaging experience, mobile users can receive and respond to voice messages, e-mail messages, and fax messages, by speaking a reply, and can maintain a higher level of productivity while they are out of the office.

Automated Message Transport Selection

Messages are sent to the SpinVox platform using the most appropriate transport method available. For example, a spoken email will be captured on the device, typically as a WAV file, but can be any form of audio file, and forwarded to the VMCS as an email, using a 3G or GPRS data channel, if it is available. Once conversion of the message is complete the result will be emailed to the recipient.

The routing of messages from the mobile device to the SpinVox platform is carried out on an intelligent basis depending upon the available transport methods. The choice is made from the following list:

- GPRS data connection
- 3G data connection
- SMTP interface
- HTTP interface
- IVR (fixed line)
- MMS If the optimum method of transport is unavailable, the application automatically checks for the availability of the next most appropriate method and uses it.

Asymmetric Messaging

This software creates a unique new set of options for the user and recipient to continue in contact using a range of connected messaging options.

Outgoing Call Becomes a Text Message

What makes this service unique is that the original message starts life as a spoken message and when it is finally delivered to the end customer's device it not only appears in their Inbox, but it has been transposed into an email or SMS.

Incoming Call Replied to by an Email or Text Message

By creating this service SpinVox allows the recipient of the original voice message (or missed call) to choose to reply by speaking a text message or email, rather than by traditionally having to call the sender of the message using the telephone or type a message using the keypad of the device. This is unique in that once the recipient replies to the original message via an email or text the end-to-end communication method has moved from being voice driven to text driven and once the reply is sent to the originator they too can then reply via a text message, email or by speaking a message.

Product Requirements for SpinMyText (SMT)

The key to the success of this application is in its' simplicity of activation. It must be possible to invoke it through a single key press, which is available on any handset, and complete the process from start to finish in no more than 3 key presses. The SMT product offering will ideally be positioned at Mobile Operators and Enterprise Customers, enabling a user to select an option on their handset that allows them to speak a text message (The same functionality can also be applied to speaking an email message). This audio file is captured by the SpinVox platform and converted to a text message for delivery.

The product must meet the following criteria:

One hand, one thumb accessible—The application must be so simple to start and use that it almost feels like it could be a 'handsfree' application. The Acid test for the success of this application is whether it can be used in the fast lane of the motorway safely and legally.

Nothing new to learn—it must be as simple as making a voice call, with no more than 3 key strokes to initiate, use and complete the service.

Fire & forget—it must be as trustworthy as any other service e.g. voice-mail or text messaging, there should be no need to check the contents of the message.

Customer Touch points—must be a simple single click to initiate SMT addressing. Familiar interaction & metaphors employed by the current UI must be used.

Called Party ('B') information automatically sent—No additional interaction, e.g. speaking or typing in a number, should be required by the customer to use the service.

Simple Deployment—An application to enable the new functionality must be available to download using a simple URL, WAP link or short-range wireless connection e.g. Bluetooth. The application should also be updateable by the same method.

Upgradeable—It must be possible to upgrade the product to add new features, with minimal customer intervention and without having to terminate the application manually Non-Intrusive—The application should not prevent another application on the handset from running and consideration should be given to events that may impact the application e.g. how does the application react to an incoming call during SMT call set up.

Customer Insight

There are many situations when someone would choose to speak a text message, as opposed to typing one or making a voice call. The common theme is that the user needs a fast, simple way of getting some information to someone and they either can't or don't want to stop what they are doing. The key insight here is that accessing the functionality and simplifying the addressing of the message is as important (if not more important) than the voice to text element (which should be taken for granted).

NB. The customer experience needs to be one button press to start the process (across any device) one click to select the addressee and the final click should be to end the phone call/recording process.

The user experience should also exploit the fact that the mobile users' text messaging and caller log eco-system are typically limited to a handful of numbers.

Contact Number Storage

The format of how mobile phone numbers are stored on a mobile handset is key to delivering a text message successfully from the SpinVox system.

Certain assumptions must be made in order to determine the destination Country of a text message, if the number submitted to SpinVox is in non-International format.

The following behaviours shape the assumptions that must be made, in order to resolve the destination delivery Country of a text message.

The International Business Traveler

Anyone that travels Internationally regularly is likely to have at least 80% of their contact list populated with International format numbers.

The remaining 20% are likely to be stored in the local format of the country the traveler resides in. It is very unlikely they will have a number stored in local format for a country they are not a resident of.

The Infrequent Business Traveler

Is likely to have a mixture of International and non-international format numbers Any non-international format numbers stored on the handset will be from the country of residence.

The Non-Traveler

The non-travelers contact list will be populated with numbers in local format from the country they reside.

There may be the odd number that is stored in international format, which has been updated when going abroad on holiday, in case they need to call home.

From this we can conclude that when a customer uses SMT and the 'B party' number arrives, as a local number the most likely country of origin is the users home Country.

The development team faces similar issues today, with our current products, and the above assumption is used for pre-fixing the outgoing SMS.

It is therefore essential that the 'Home Country' of the user is captured somehow and associated with their MSISDN.

SMT Application

The SMT application sits in the background of the handset, waiting to be activated by a single 'special' button click. In order to keep the user experience the same across any device or platform the same button must be available on any device, on any mobile platform.

Clearly this limits the choice of keys available to the following:

Numeric (0-9)
Special keys (* #)
Call keys (start & terminate)

This limit is actually something SpinVox can exploit; with a specific key e.g. SpeedDial #2 becoming the 'SpinVox key', much in the same way that SpeedDial #1 is the Voicemail key.

An application working in this manner requires far less integration into each handsets functionality and for the customer it means no thinking, no searching, no fumbling.

For prototyping purposes reprogramming the right hand 'soft key' often used by carriers to access the WAP Portals, should be reprogrammed to give one button access to the SMT application.

User Interface

Using a single key to get access to the functionality of SMT has the effect of simplifying the user experience and vastly reducing the amount integration into numerous menu options, in each of the possible places that someone might want to send a message from.

A user could still interact with their handset to initiate a SMT message in the following scenarios, however, the single button approach means they would be moved into the SMT app.

Call Logs
Contacts
Messaging/SMS Application
Through an SMT on-screen Icon
Navigation It should be possible to start a SMT message by pressing a single button For each of the above scenarios the user must know where in the application they are and what options are available to them The user should be able to use the application through recognisable controls on the handset Entering Information The user should not have to physically enter a recipient's number as part of the IVR process; it should be automatically sent from the handset to the IVR platform.

Information Presentation

Text used in menus should be familiar to the user

Consideration should be given to the icon used for the SMT application (if one is required).

Consideration should be given to colour or sound requirements that may affect the handset Consideration should be given to the possible error conditions and how these will be displayed or announced e.g. audio not captured, conversion not possible, text message not sent.

Caller Access—Contacts

1. Caller selects a contact from the contacts menu
2. Caller is presented with a menu option to SMT
3. When the SMT option has been selected a connection to a voicemail platform needs to be established
4. An announcement requesting the user to speak their text message will then be played
5. The caller will leave an audio message.
6. The B Party number should be passed to SpinVox (Selected in Step 1)

7. The SpinVox platform will convert the audio to a text message for onward delivery.

Figure 24:
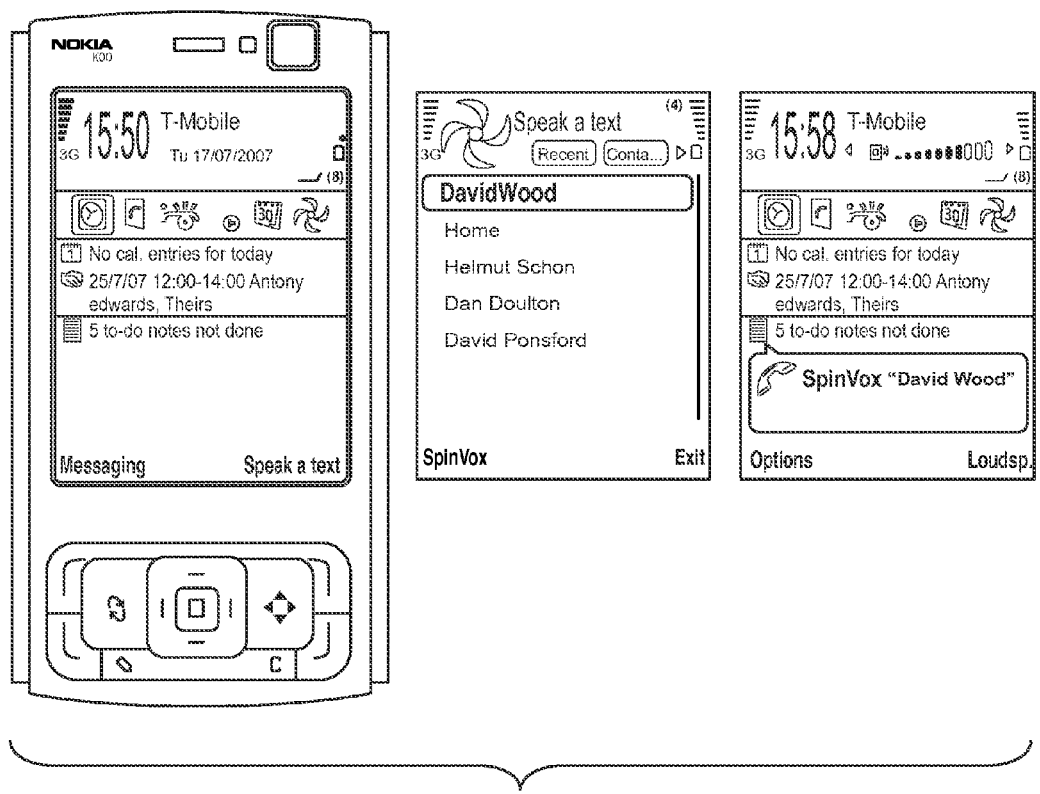
FIG. 24 shows screen shots which demonstrate the ideal user experience: the Fast Address list of recent contacts (people that have called, been called, texted, emailed etc) is selected, the one individual (David Wood) is selected to automatically initiate a connection to the SpinVox voice conversion system so that the user can speak a message.

Caller Access—Call Log
1. Caller selects a contact from the Call Log.
2. Caller is presented with a menu option to SMT
3. When the SMT option has been selected a connection to a voicemail platform needs to be established
4. An announcement requesting the user to speak their text message will then be played
5. The caller will leave an audio message.
6. The B Party number should be passed to SpinVox (Selected in Step 1)
7. The SpinVox platform will convert the audio to a text message for onward delivery Caller Access—Soft Key
1. Caller selects a SMT soft key and is directed to Contacts where a contact is selected.
2. Caller is presented with a menu option to SMT
3. When the SMT option has been selected a connection to a voicemail platform needs to be established
4. An announcement requesting the user to speak their text message will then be played
5. The caller will leave an audio message.
6. The B Party number should be passed to SpinVox (Selected in Step 1)
7. The SpinVox platform will convert the audio to a text message for onward delivery Caller Access—Messaging Application
1. Caller selects Messaging/SMS application and selects SMT option from menu and is directed to Contacts.
2. When the Contact has been selected a connection to a voicemail platform needs to be established
3. An announcement requesting the user to speak their text message will then be played
4. The caller will leave an audio message.
5. The B Party number should be passed to SpinVox (Selected in Step 2)
6. The SpinVox platform will convert the audio to a text message for onward delivery Handset User Experience The FIG. 24 screen shots demonstrate the ideal user experience: the Fast Address list of recent contacts (people that have called, been called, texted, emailed etc) is selected, the one individual (David Wood) is selected to automatically initiate a connection to the SpinVox voice conversion system so that the user can speak a message. This is easy to replicate across all chosen devices, to provide a consistent user experience.

End-to-End User Experience

Figure 25:
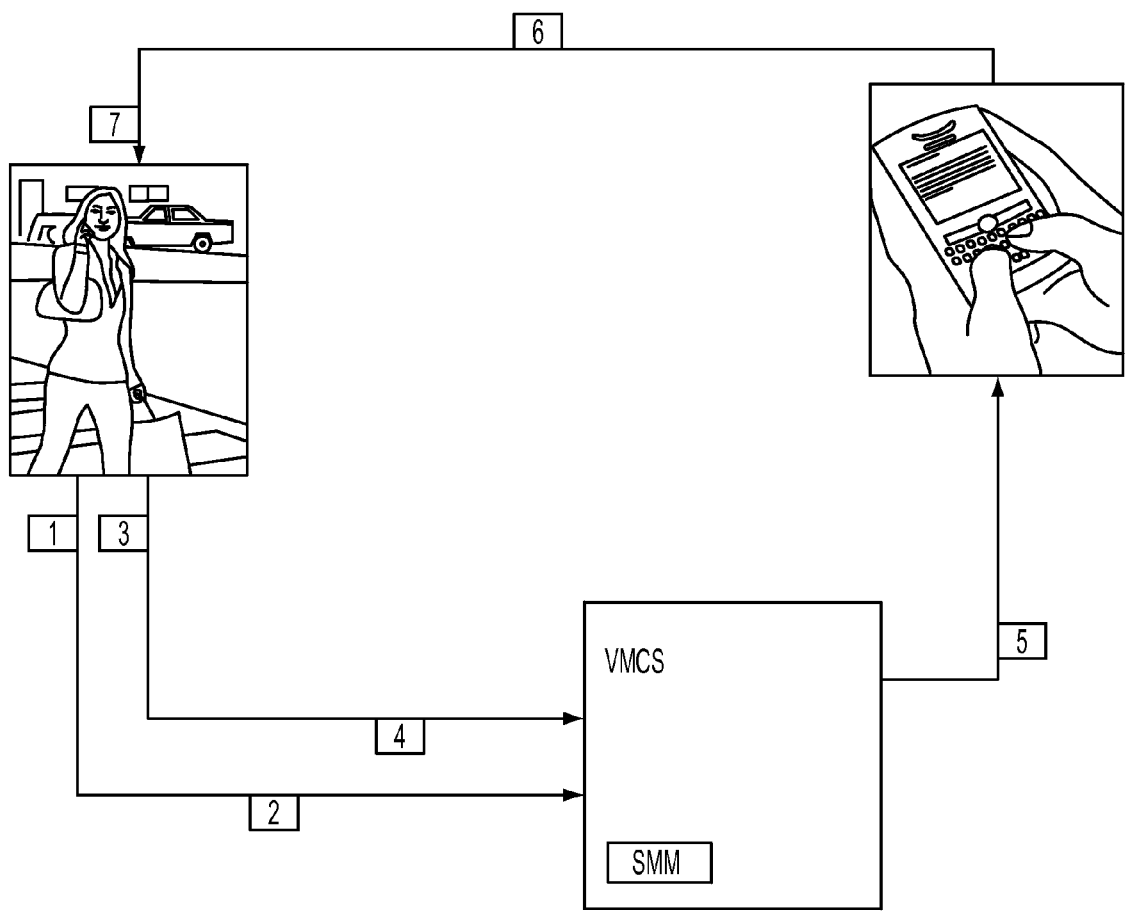
FIG. 25 shows the end-to-end experience from the A & B party perspective.

The FIG. 25 diagram below shows the end-to-end experience from the A & B party perspective.
1. Suzy holds down the SMM soft-key on her handset and is presented with the last 5 contacts that she contacted, either by text message, email, MMS or voice, in her 'Recent' list. She also has the option to select any other 'Contact if the person she wants to contact is not presented in the list.
2. She selects the contact she wants to send a message to and a message on the screen of her device tells her that the SmT service is being contacted and to listen for an audio prompt.
3 The SpinVox Service is contacted and A party information is sent to the SMM service.
4. B party info is converted for transfer to the SpinVox Service.
5. Once the connection is established with the SMM service the DTMF B party info is sent.
6. The voice to text conversion takes place and the B party receives the text message.
7. The B party replies to the original message.
8. The A party can choose to speak another reply or use a keyboard based method to reply.

Handset Support/Target Platforms

The following platforms will be supported in subsequent versions.
  Windows Mobile 5
  Windows Mobile 6
  RIM OS 4.1 and above (Reference: Blackberry device models and OS versions)
  Symbian Series 60 ($2^{nd}$ Edition)
  Symbian Series 60 ($3^{rd}$ Edition)
  Java MIDP 2.0 capable devices Application Provisioning The option to pre-provision handsets with the application prior to issue/despatch is possible, as is a simple mechanism for downloading the application for users with existing handsets, options include:
  Bluetooth
  WAP link
  Memory Card Consideration should also be given for removal of the application from the handset.

The FIGS. 26 to 31 screenshots demonstrate only a small part of the Speak-a-Message application. It shows the functionality of a customer choosing to speak a text message to an individual. It does not cover, sending to more than one person, or sending messages directly to a web application, such as, a blog.

All the screenshots below are taken from a Nokia N95 mobile phone, however the service is not restricted to any particular device.

Figure 26:
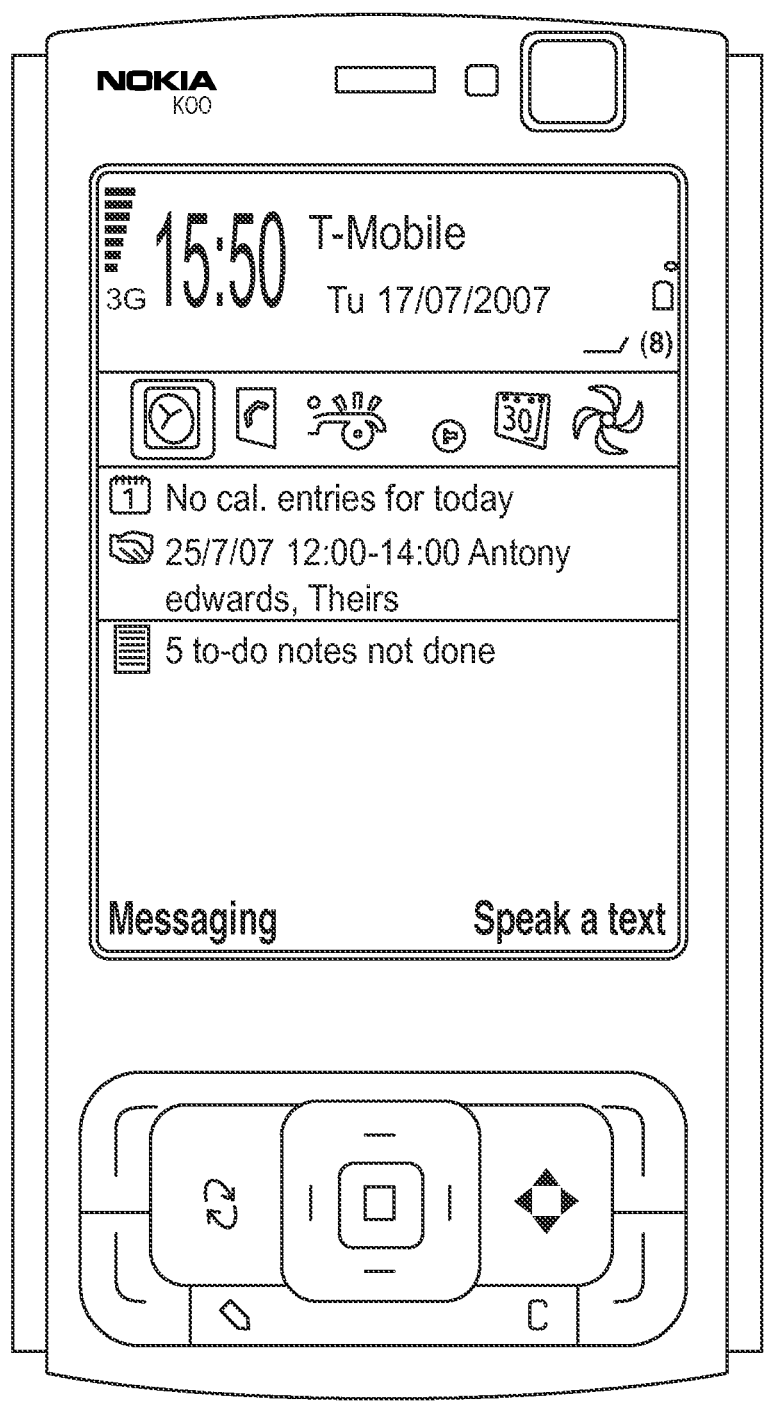
FIG. 26 shows the typical behaviour of the Speak-a-Message application in the home screen of the phone.
Figure 27:
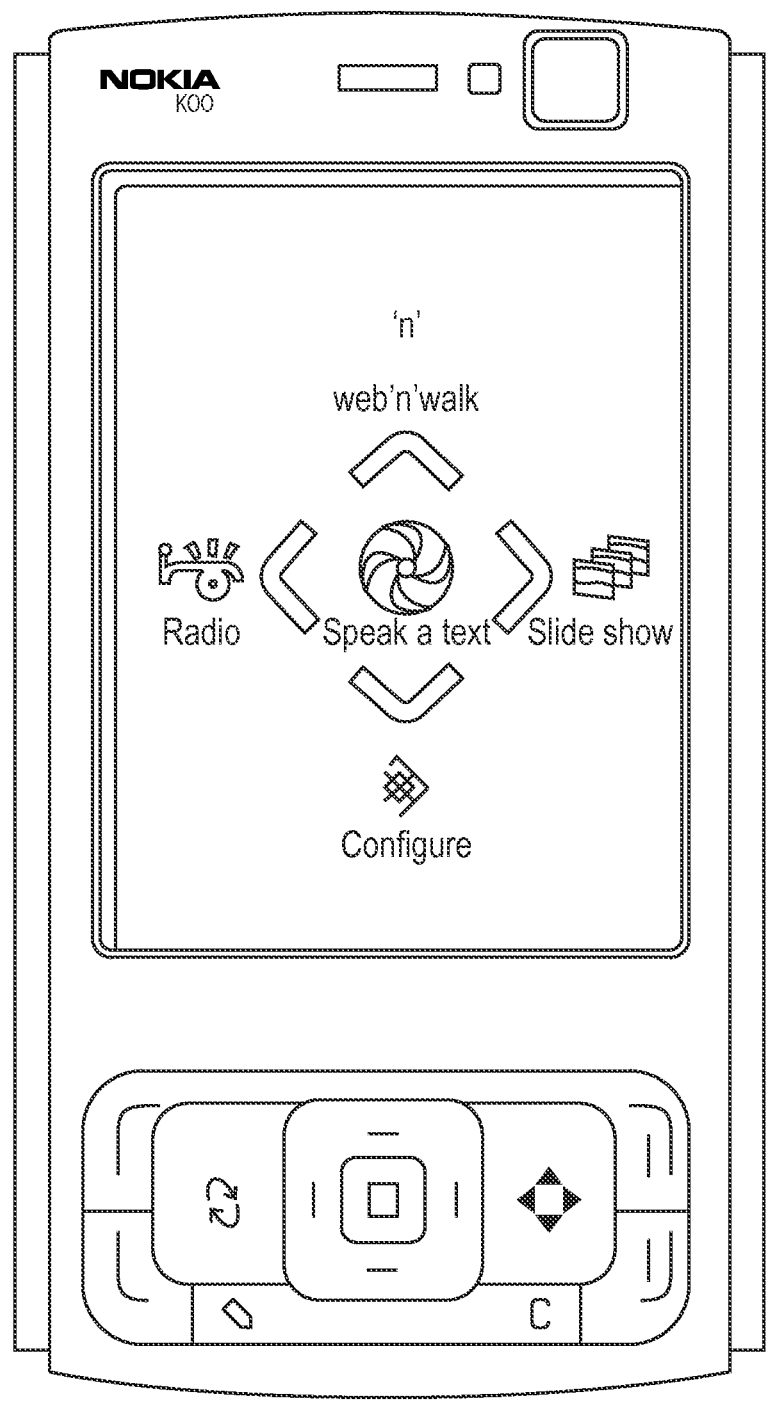
FIG. 27 shows the application being accessed using a short cut displayed as the SpinVox logo, after pressing the 'Multimedia Key' on a Nokia N95.

FIG. 26 shows the typical behaviour of the application in the home screen of the phone. The application automatically takes control of a soft button in the Home screen ("Speak a Text" on the screen bottom right), allowing one button access to the Speak-a-Message functionality.

The application can also be programmed to present itself using other short cut keys; if they are available on the device. For example in FIG. 27, the application is accessed using a short cut displayed as the SpinVox logo, after pressing the 'Multimedia Key' on a Nokia N95.

Figure 28:
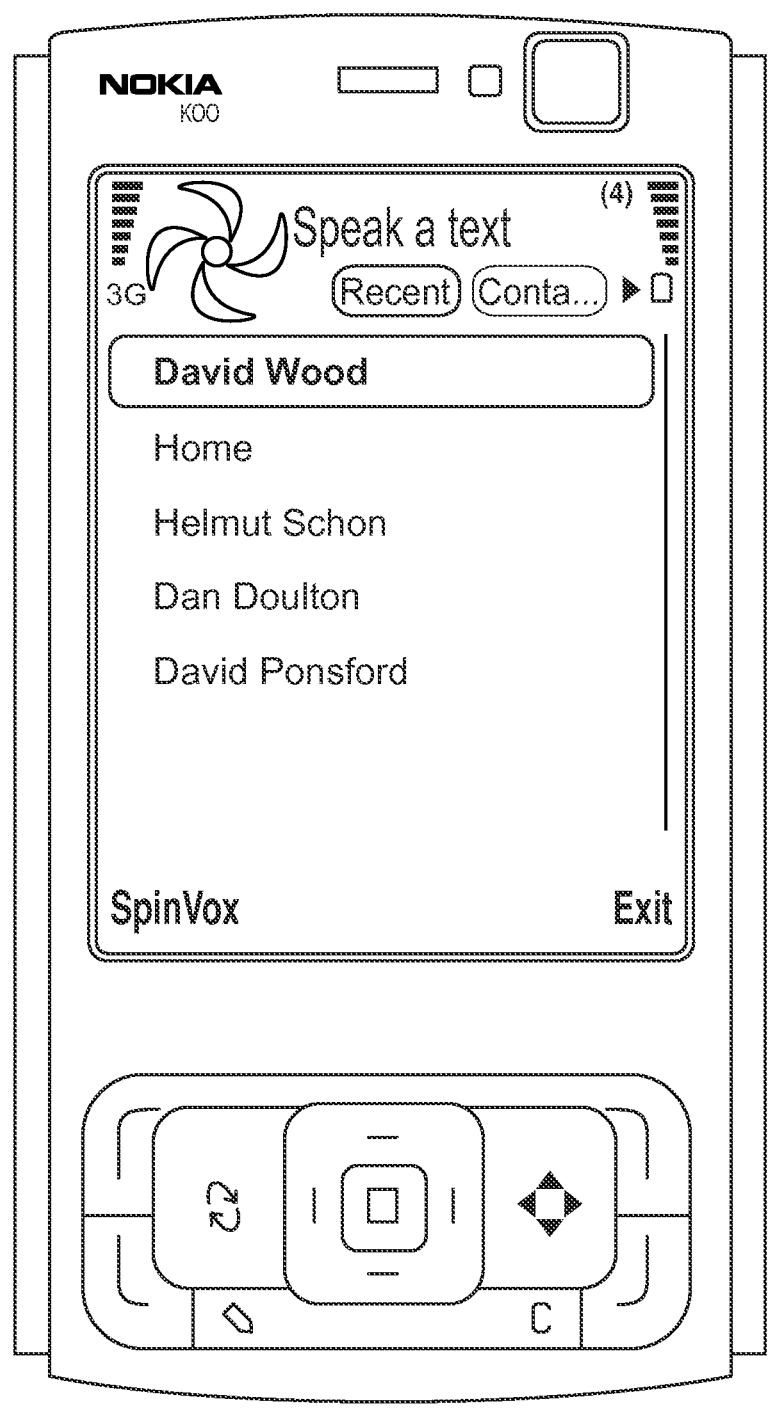

FIG. 28 shows the Fast Address list, which on an N95 device is limited to the last 5 people which you spoke to, emailed, sent or received a text from or spoke a message to. These are presented in using chronological then alphabetical order.

Figure 29:
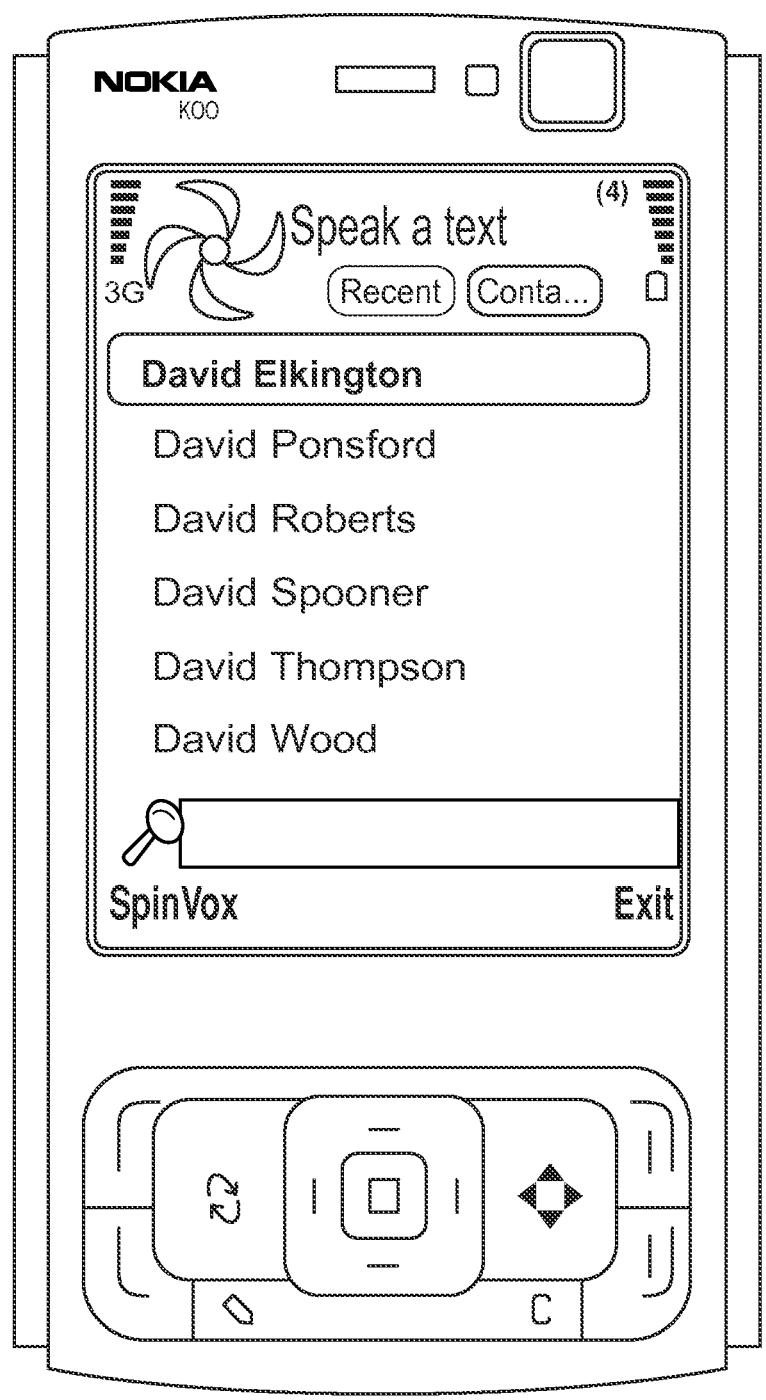
FIG. 29 shows that any contact can have a message spoken to them by moving from the 'Recent' view to the 'Contacts' view.

Speaking a message is not confined to this group of five people, any contact can have a message spoken to them by moving from the 'Recent' view to the 'Contacts' view as seen in FIG. 29.

Figure 30:
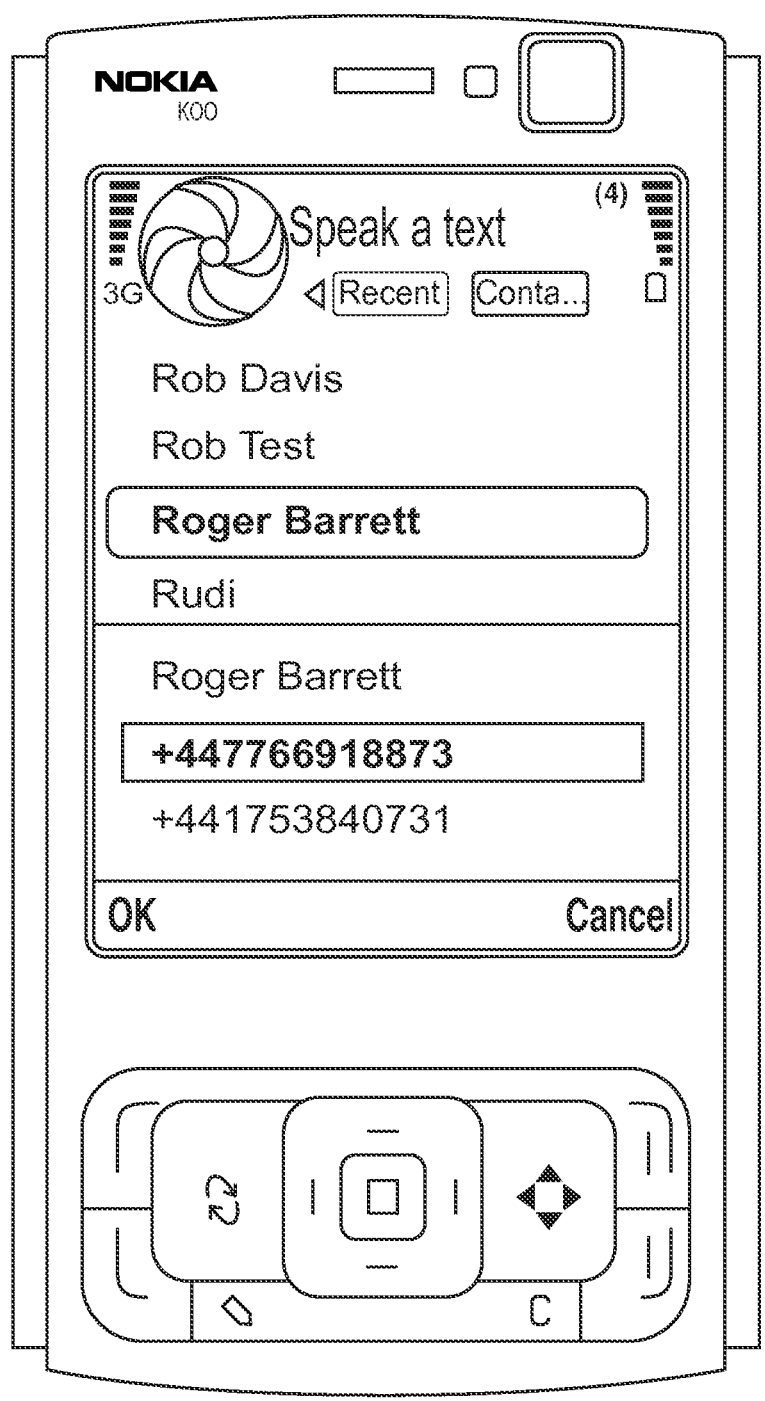
FIG. 30 shows that if a contact is selected in the 'Contacts' view that contains more than one phone number, then both numbers are shown and the user is given a choice of using either.

If a contact is selected in the 'Contacts' view that contains more than one phone dumber, then both numbers are shown and the user is given a choice of using either, as shown in FIG. 30.

Once the number has been selected the SpinVox service is contacted and the customer prompted to leave a message. The destination information is automatically sent to the SpinVox Service and when the user hangs up the message is sent to the recipient.

Figure 31:
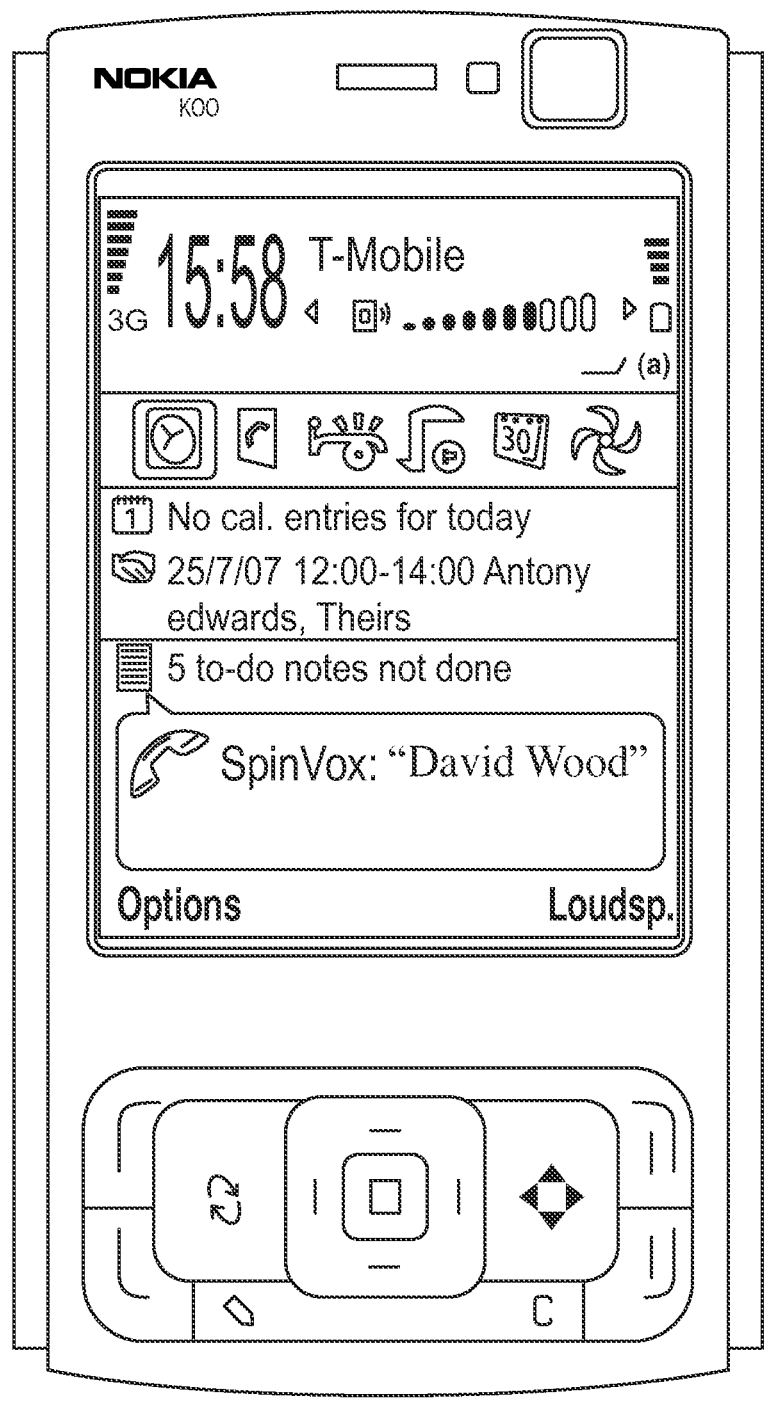
FIG. 31 shows when the customer connects to the SpinVox service the name of the contact being sent the text is displayed.

FIG. 31 shows when the customer connects to the SpinVox service the name of the contact being sent the text is displayed.

Figure 32:
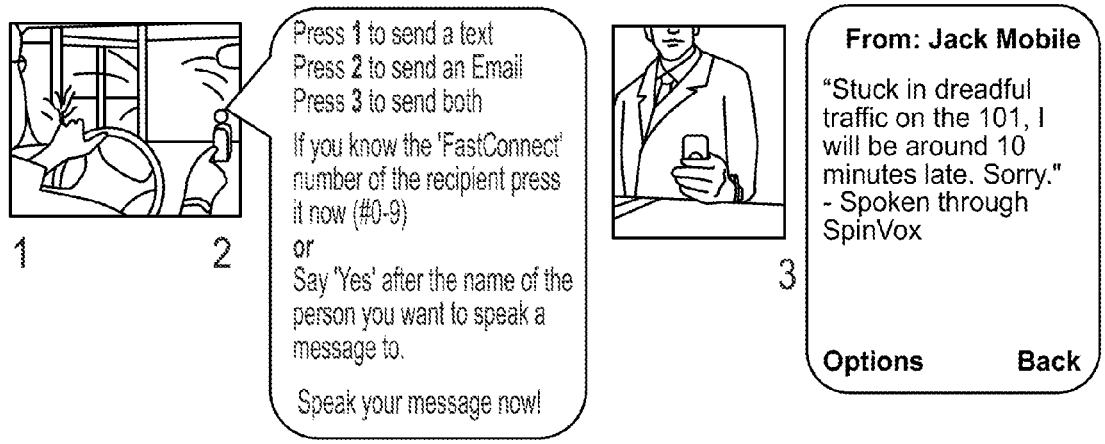
FIG. 32 shows the User Experience schematically for the Speak-a-Text product.

FIG. 32 shows the User Experience schematically for the Speak-a-Text product.

1. Jack is in his car on the way to a meeting, he's running late and wants to get a message through to Dan, but not interrupt him.
2. Jack calls Spinvox Text and is prompted to enter one of his 'FAST CONNECT' contact numbers or to listen to the names of the people in his list and choose one of them (TEXT TO VOICE).
3. Dan receives the message as both a text message on his mobile phone and as an email on his PC.

APPENDIX I

Speak a Text (IVR Based)

Key features:
   Messaging you can use when you can't or don't want to stop what you are doing.
   No special application is needed on the handset.
   No need to remember someone's number.
   It is so intuitive to use, it requires no explanation.
   You can send both email and SMS messages to recipients.
   You can easily update the numbers of the people you want to contact.
Introduction
   This appendix details the user experience and highlights specific requirement for the Speak-a-Text product. The solution will consist of:
   A dedicated phone number, voice shortcode or network access code
   A Voice recognition system, connected to the IVR platform
   This solution provides the ability to:
   Speak a Message & have it delivered as Text (SMS or Email).
   Listen to previously saved Voicemail messages.
   The User Experience is shown schematically in FIG. 32
Product Requirements
1. Service Level
   In order to use the Speak a text (IVR) product the customer must have signed up for an account with SpinVox.

| Requirement |
|---|
| The end-user will already have a Voicemail account. |
| The service will have an availability the same as that of SpinVox Voicemail. |
| Only the first 30 seconds of any message will be converted. |
| TAT - must be the same as that defined for SpinVox Voicemail or SpinVox Blast. |
| Language support. On the initial launch the service must support the following languages: |
| UK English |
| US English |
| Canadian English |
| Canadian French |
| German |
| French |
| Spanish |
| Australian English |
| South African English |
| On initial launch the service will be limited to retail customers only. |

2. IVR
   An access number, voice shortcode or network access code will connect the caller directly to the SpinVox IVR.
   The IVR tree will be changed in order to include an option to speak a message to someone. It will also contain options to have previously received voicemail 'read out' to the customer, using a text to Voice system.

The caller can then access their list of already registered contacts. This list will be limited to 10 people.

| Requirement |
|---|
| The voice talent used to record any new voice prompts must be the same as currently used on the SpinVox IVR platform. |
| The languages the IVR is recorded in must mirror the languages available for current products. |
| Access to the service will be by determined by recognising the CLI of the incoming caller. |
| If the customers CLI is withheld they will hear the following voice prompt: |
| "I'm sorry your phone number was withheld, please call back without withholding it". |
| The call will then be terminated. |
| The IVR system must be capable of receiving Voice based commands, as well as DTMF commands. |
| The IVR system must be able to concatenate commands and names, in order to create a simple voice based user interface. |
| E.g. [Email] [Dan Doulton] |
| Where [Email] is the desired delivery method and [Dan Doulton] is the recipient. |
| The following Voice Commands must be recognised for creating and sending messages: |
| Email |
| Mail |
| Text |
| SMS |
| The following Voice Commands must be recognised for listening to already saved messages: |
| Play |
| Listen |
| The following Voice Commands must be recognised for managing messages that are already saved: |
| Play |
| Listen |
| Delete |
| Save |

3. Billing
   The Speak a text service is billed per event Meaning that each time a message is sent the customer will have their account decremented and either a billing event will be triggered resulting in a Premium SMS being sent to them or in the case of Credit Card billing one credit will be deducted from their bundle.

| Requirement |
|---|
| It must be possible to bill customers per conversion event using whichever payment system their account uses. |
| It must be possible to exclude customers who are defined as UFTAs from being billed. |
| It must be possible to exclude customers who have been placed onto No conversion status, due to bad debt. |

4. Provisioning
   In order to use the speak a text (IVR) service it is necessary to sign up and register the details of the people you wish to be able to contact.
   This will be done using a web browser on a PC or Mac, it will not be possible to do this from a Mobile device.
   A maximum of ten people can be registered at any one time. It will be possible to add or amend any of the Contacts that are stored in the customer's profile.

| Requirement |
|---|
| The provisioning system must work with all popular browsers, such as; Internet Explorer, Firefox, Safari and Netscape (PC & Mac versions). |
| It must be possible to add up to ten peoples contact details. |

| Requirement |
|---|
| The following information is mandatory when adding a contact:<br>First Name<br>Last Name<br>Mobile Phone number<br>Email Address<br>It must be possible to choose and provision a payment plan from the web interface.<br>Payment plan options must include credit card and Premium SMS payment types. |

5. Voice Recognition

Once connected to the SpinVox IVR it must be possible top navigate the menu system in a 'handsfree' mode, where it is not necessary to press a key in order to select the recipient or the type of message being sent.

| Requirement |
|---|
| The voice recognition system must integrate seamlessly with the SpinVox IVR platform.<br>It will be possible to concatenate names and commands, such as; "Email David Ponsford" and have them understood by the Voice Recognition system, without having to leave unnatural pauses.<br>The voice recognition system must be able to recognise the names (First name and Last name) when spoken using the IVR platform. |

6. Reporting

| Requirement |
|---|
| It must be possible to report on all messages generated by this product. |

APPENDIX II

Voicemail to Email Contact Plugin

Mobile Plug-in: Voicemail to Email Contact Resolution
Voicemail Converted to Email The SpinVox Spin-my-Vmail service replaces a customer's voicemail service, by using call forwarding to a new voicemail system hosted by SpinVox. SpinVox converts the incoming spoken voicemail messages into text and then sends that text to the recipient as either an SMS text message of as an email message.

In addition to this SpinVox has created software, which when loaded onto a mobile device, such as a RIM BlackBerry, recognises the incoming email message from the SpinVox system and performs a number of actions on it prior to the email being replaced in the inbox of the customer's device.

The senders phone number is included in the email that is sent and the SpinVox software, on the device, reads this number and then searches the Address Book on the recipient's device for a match of that number. It not only checks for an exact match, it also checks fort a match against the number stored in a local format.

For example, the number +442079232854 sent by the SpinVox system will be matched on the recipients device to a real name and their contact details as found in the recipient's address book (contacts) by the following numbers:
+442079232854—An exact match
+44 (0) 20 79232854—The same number in another International format
020 7923 2854—The 'local' portion of the number The number matching is independent of the type of phone number the sender is using. Matched numbers can include mobile numbers (07x), fixed line geographic numbers (01x, 02x) and non-fixed line geographic numbers (05x), often used with Voice over IP (VioIP) services, such as Skype. In fact, any allowed type of phone number passed to the service can be matched.

If a match is found in the recipients Address book the following actions occur.

1. The email will be marked with a special icon, or the standard icon will be modified to signal to the recipient that this is a different type of email—voicemail converted into email. This is very important in sorting and managing a busy email inbox and being able to find key messages by type as well as content.

2. The Name of the contact in the address book is noted and displayed in the From: field of the email. This way the user knows who it's from and the name is displayed in the format that they're familiar with and have recorded in their address book.

e.g. call from +447812101742 would be resolved to Daniel Doulton with the associated email address being DANIEL.DOULTON@SPINVOX.COM 3. The from Field of the email now contains the caller's actual email address too enabling the recipient to also reply by email, not just a phone call or SMS (if the senders mobile number is also stored in the Address Book).

In the body of the email the phrase 'You have just received a new voicemail from' is appended with the name of the contact, enabling the recipient to reply by a call or SMS (if the senders mobile number is stored in the Address Book).

4. Whether the phone number is resolved or not against a contact in the Address Book, the subject line is replaced with the first 30 characters of the converted message, prefixed with SpinVox:"

e.g. SpinVox: "Hi Dave. We're on for 7.30 at . . . ."

5. A QuickLink (see GB2420942B, the contents of which is incorporated by reference) is inserted at the end of the body of the email, which will enable a simple, one click method for the recipient to listen to just that voicemail message. The link calls the SpinVox voicemail service, then uniquely finds that specific message and immediately plays it back.

For Example. "Click here to listen" is shown. The user selects this within the message and they are taken to the SpinVox voicemail service and that precise message is played back, without the user having to do anything else.

Embedded Menu Items

Additional functionality is brought to the device, by adding new menu items into the standard menu tree.

'Listen'; offers the ability to hear the original voicemail message, simply by clicking on the menu item, when reading a converted voicemail message.

'Call Support'; will instantly connect the customer to the SpinVox Customer Care team, allowing them to discuss their account status These menu items are embedded dynamically. They become available when a customer is viewing a converted voicemail. This is to ensure they are only available when it makes sense for a customer to use them and not when it might cause confusion.

Asymmetric Messaging

This plug-in creates a unique new set of options for the user and recipient to continue in contact using a range of connected messaging options:

Incoming Call Ends in an Email.

What makes this service unique is that the original message originally started life as a spoken message and when it is finally delivered to the end customer's device it not only appears in the Inbox of their devices message application, it has been transposed into an email and it contains a valid From: field, which, depending upon the contents of the recipients Address Book, will provide a reply path via email.

Incoming Call Replied to by an Email

By creating this service SpinVox allows the recipient of the original voice message to choose to reply by email, rather than by traditionally having to call the sender of the message using the telephone. This is unique in that once the recipient replies to the original message via an email the end-to-end communication method has moved from being voice driven to email driven and once the reply is sent to the originator they too can then reply via an email.

Summary of Key Features

Conversion of an incoming phone call to an email.

Resolution of senders telephone number against contact name and email address stored on recipient's mobile device.

Email Reply path available to originally spoken message.

Listen to specific voicemail messages using a single button press.

New functionality embedded in the standard menu tree.

Communication moved from voice to email.

Voicemail-to-Email Business Requirements

Introduction

This section presents the business requirements that will enable users of email centric devices, such as RIM's BlackBerry with a simple variation of the standard Voicemail-to-Text service. The BlackBerry is primarily used as an Enterprise business tool for PIM synchronisation and reading and responding to emails, this will be reflected in the business requirements detailed in this document.

An Enterprise customer can deploy the BlackBerry solution through any one of the following deployment models:

BlackBerry Enterprise Solution—on premise implementation of a BES (BlackBerry Enterprise Server)

BlackBerry Internet Solution—internet based service offering can be used with web-based email providers such as Gmail, Yahoo as well as providing access to the corporate email.

Hosted BlackBerry Solution—where a hosted service provider has deployed the BlackBerry platform in a data centre environment. An enterprise would purchase this solution on d per user per month basis.

This product enhancement will enable SpinVox to target both BlackBerry and mobile phone users within the Enterprise driving increased user activations as a result of more text or email messages being generated, as opposed to voice. It further enhances SpinVox positioning as a device independent service provider.

This service will also enable SpinVox to 'switch off' text delivery, by default, to Blackberry users, so that duel messages are not received on the device, making significant savings to the business.

---

The service will enable an Enterprise to have all voice message conversions delivered as emails only (default setting) for it's BlackBerry or other email centric device users. The user will be given the option to enable SMS delivery if required.

Converted Messages

A converted voice message will be issued as an email with NO WAV file attached. The option to use the message Quick-Link to locate and listen to the voicemail will also be available..

-continued

Unconverted Messages

A user will be notified via email when a voice message cannot be converted. The option to use the message Quick-Link to locate and listen to the voicemail will also be available.

The service will be available across both GSM and CDMA networks and to Enterprises located in the US, Europe and Australia For email delivery it is required that the sender CLI be resolved against the Local Address Book (LAB), so that the From: field is populated with the Senders real name as stored in the device's address book.

It is also required that in the email body the first line would read 'You received a new voicemail from John Smith'; where John Smith is the real name of the contact The user will have the capability to click on the caller's name to email a response, send a text or initiate a call.

If the number is not able to resolved against the contents of the LAB, the CLI of the incoming number should be shown The subject line of the email will be contain the first 32 characters of the converted message prefixed with 'SpinVox:

The service will be tested against the following deployment models with:

BlackBerry Enterprise Solution (BES Ver 4.0)

BlackBerry Internet Solution

Hosted BlackBerry Solution

The service will be tested against the following devices as a minimum:

Pearl 8100

BlackBerry 8700

BlackBerry 7130

BlackBerry 8707

The application must be compatible with RIM OS version 4.1 and above.

Modifications will be required to the following business support systems:

SpinVox Website - A user should be given the option to identify themselves as a user of an email centric device, such as a BlackBerry and should then be provisioned against a specific service profile i.e. Email only delivery as default, Converted messages sent without audio attachment, Unconverted messages sent with audio file attached A link to a downloadable application will be available from the SpinVox.com website.

Customer Care Interface - Modified to include a BlackBerry service profile

Enterprise Web Self Service Tool - Will be modified to capture device type as BlackBerry and provisioning against a BlackBerry service profile.

Screen Shots

The following screenshots show how the service will actually work, once a voicemail has been left for a customer and the message converted to text and the email sent to them.

All the screenshots below are taken from a BlackBerry device, however the service is not restricted to any particular device type.

Figure 33:
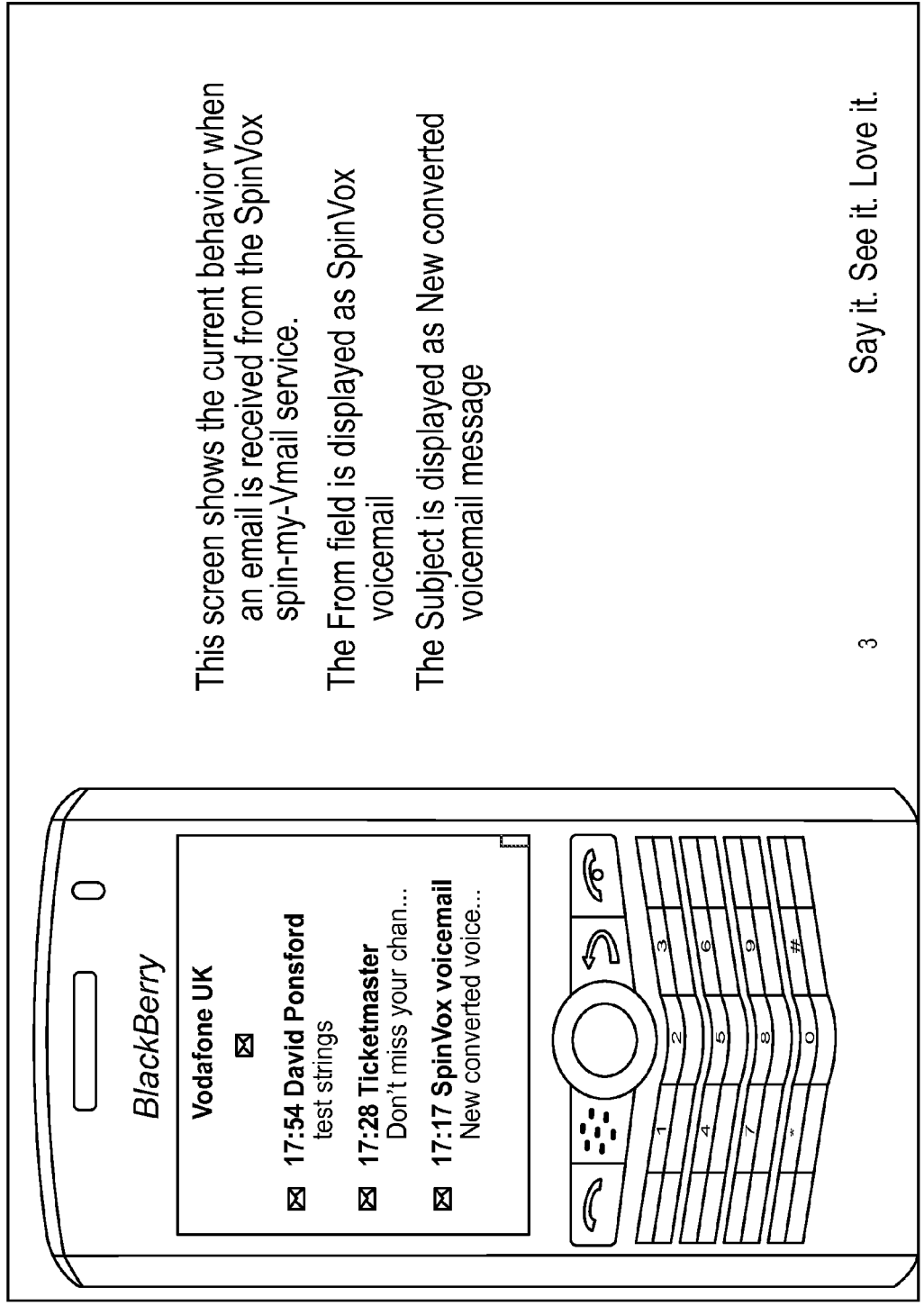
FIG. 33 shows the typical behaviour of an email centric device prior to the SpinVox plug-in software being installed.

FIG. 33 shows the typical behaviour of an email centric device prior to the SpinVox plug-in software being installed. The From Field and Subject give no indication of wither who the message is from or what the message is about. It is also impossible to distinguish between a standard email and a converted voicemail message, as the message indicator icons are identical.

Figure 34:
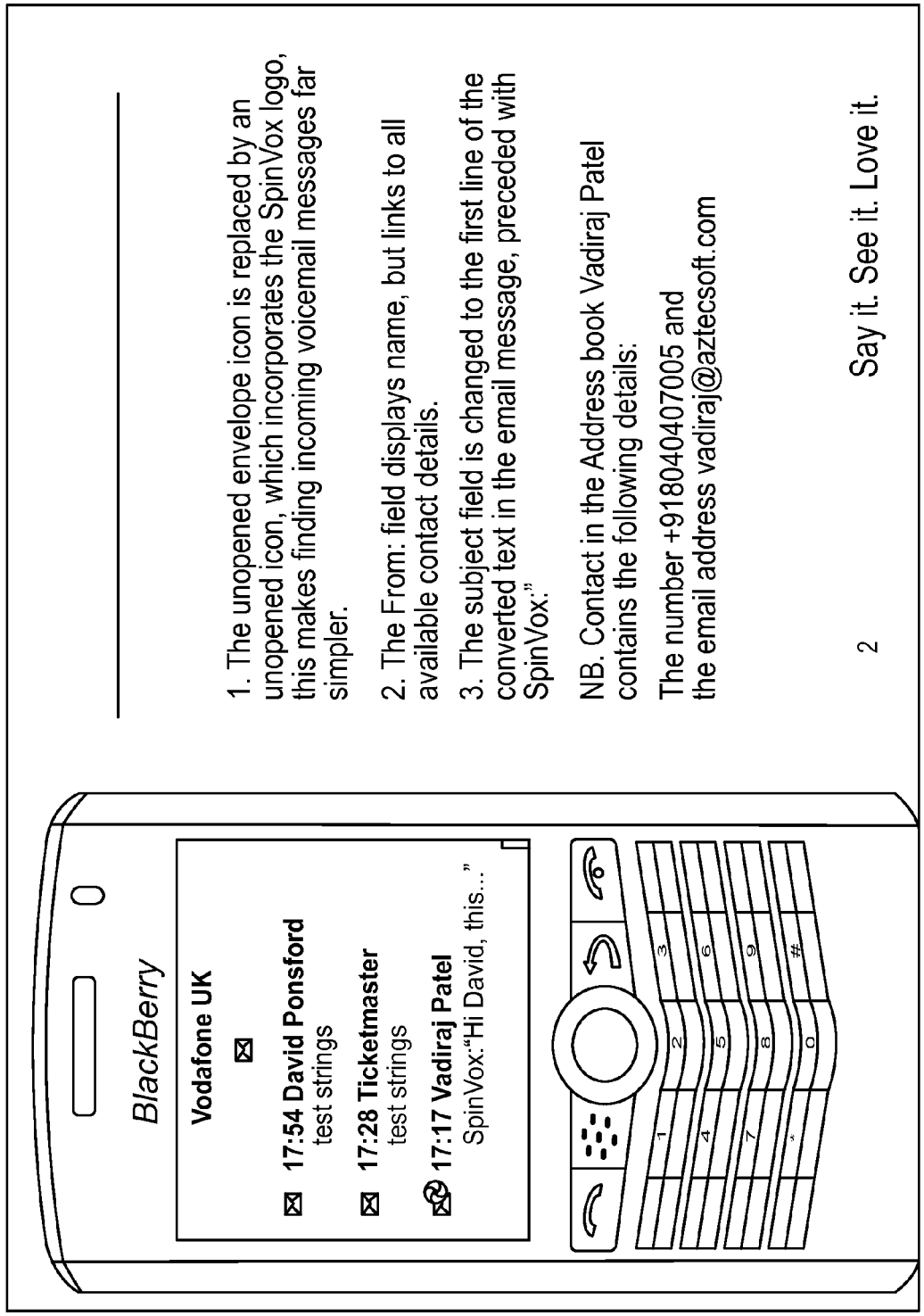
FIG. 34 shows how the Inbox looks after the SpinVox plug-in has been installed.

FIG. 34 shows how the Inbox looks after the SpinVox plug-in has been installed: The default email icon has been replaced by a special icon, which shows that the message is a SpinVox voicemail message. The From: field has been replaced by the real name of the sender, as stored in the recipients Address Book on the device and the subject line has been changed to include the first part of the converted voicemail message, prefixed with SpinVox:" which enables the message to be sorted and grouped with other SpinVox email messages.

Figure 35:
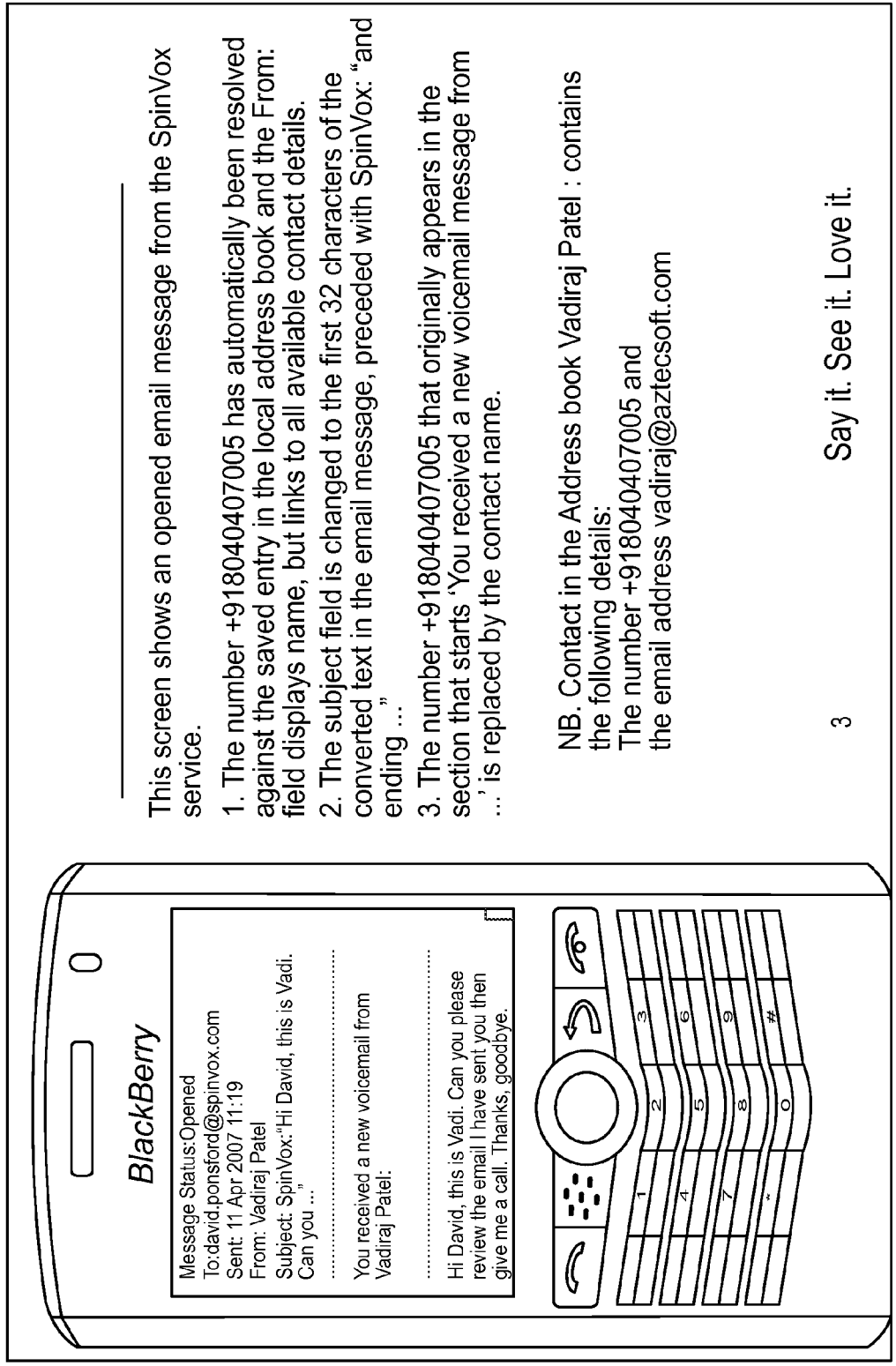
FIG. 35 shows how a SpinVox voicemail message will look once the recipient has opened it.

FIG. 35 displays how a SpinVox voicemail message will look once the recipient has opened it. The Sender's phone number has been compared with all the numbers stored in the recipients Address Book and, as a match has been found the real name of the sender is displayed in the From field. In the example below the real name is Vadiraj Patel.

The subject line has been changed to display the first part of the converted message prefixed with SpinVox:"

Figure 36:
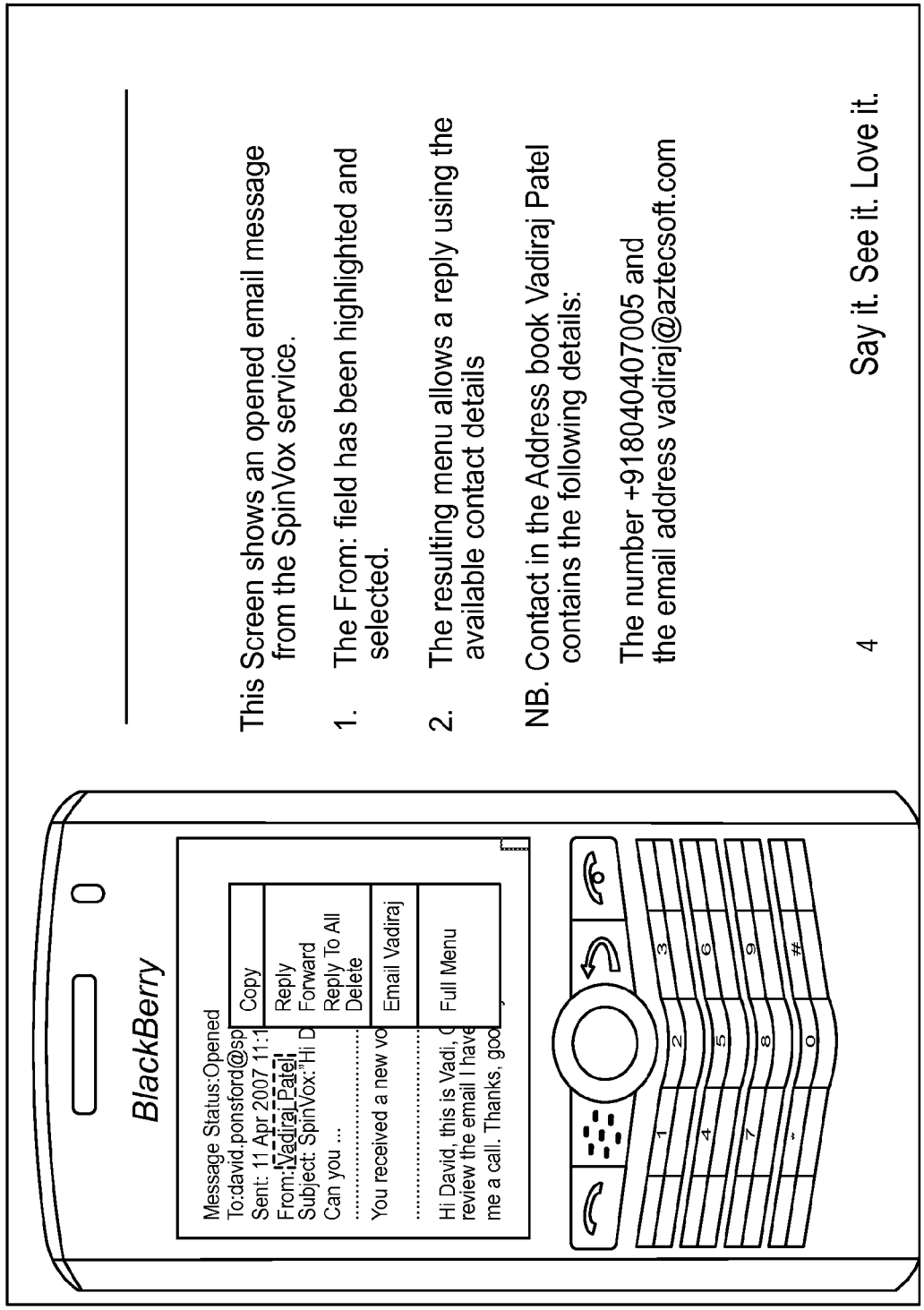
FIG. 36 shows what happens when a customer clicks on the real name that has now been put into the "From:" field.

FIG. 36 shows what happens when a customer clicks on the real name that has now been put into the From: field. It is now possible to reply directly via email to the sender of the message, by clicking on Email Vadiraj in the menu. It is important to remember that the original message was a spoken message that has been replied to via email, moving the communication method from voice to screen.

Figure 37:
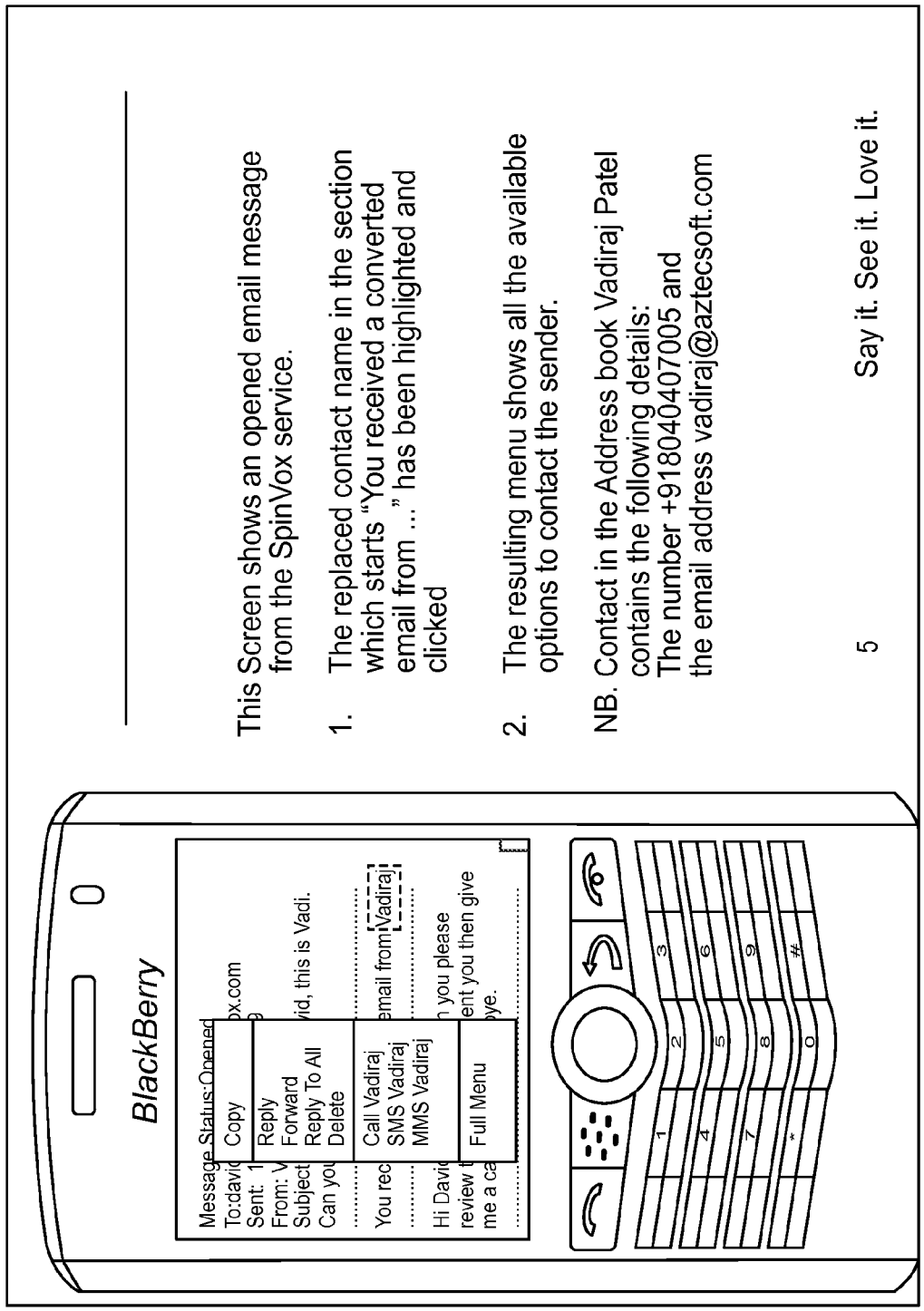
FIG. 37 shows what happens when a customer clicks on the real name that has now been put into the message text in the section which starts 'You received a new voicemail from'.

FIG. 37 shows what happens when a customer clicks on the real name that has now been put into the message text in the section which starts 'You received a new voicemail from' It is now possible to reply directly via SMS, MS or voice to the sender of the message, by clicking on the appropriate menu item. It is important to remember that the original message was a spoken message that is being replied to via SMS or MMS, moving the communication method from voice to screen.

Figure 38:
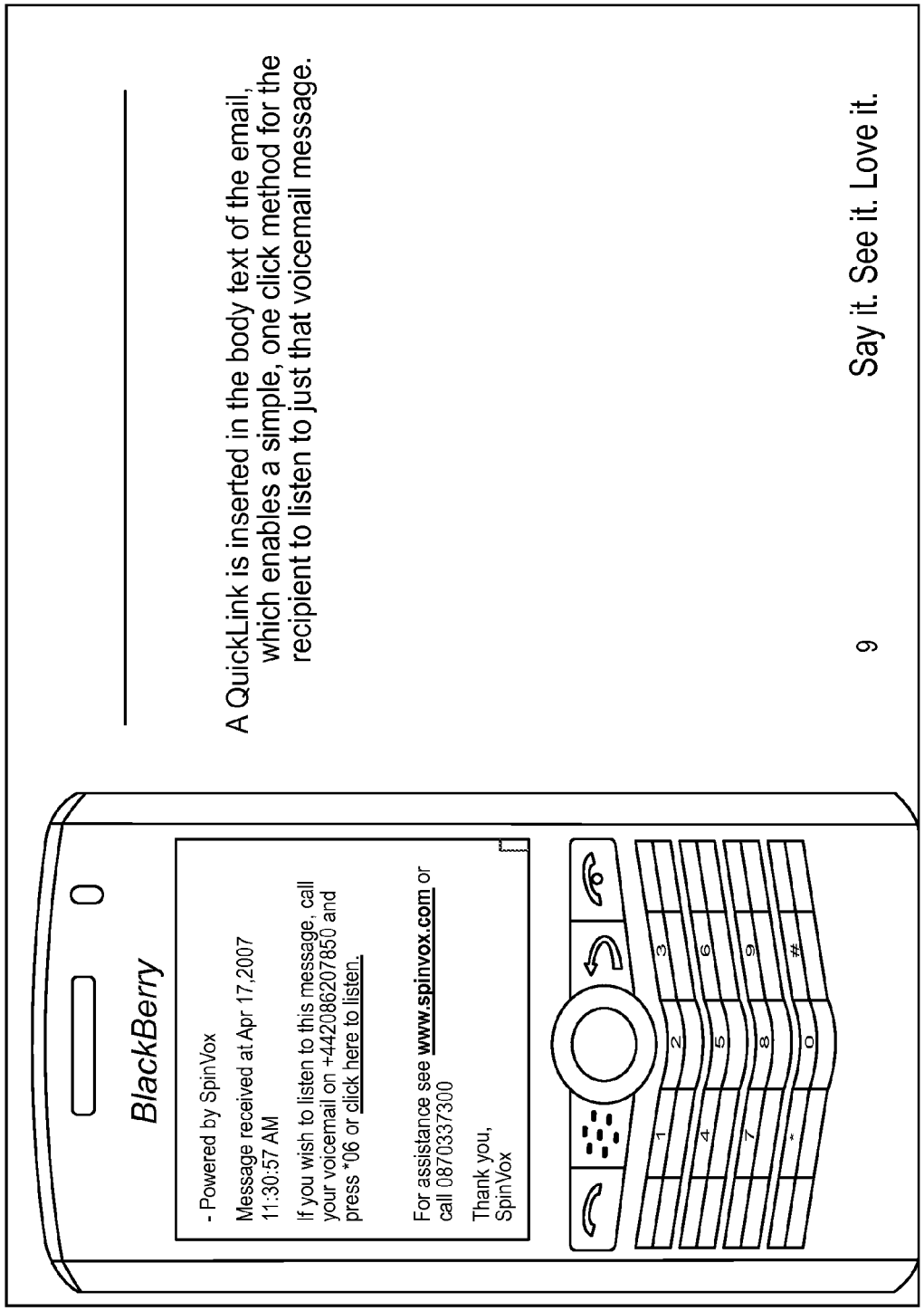
FIG. 38 shows an example of a QuickLink, which has been inserted at the bottom of the converted email message.

FIG. 38 shows an example of a QuickLink, which has been inserted at the bottom of the converted email message. The QuickLink gives a simple and easy one-click method of listening to the original voicemail message the customer is currently reading. It dials the SpinVox voicemail service and automatically replays the correct message.

Figure 39:
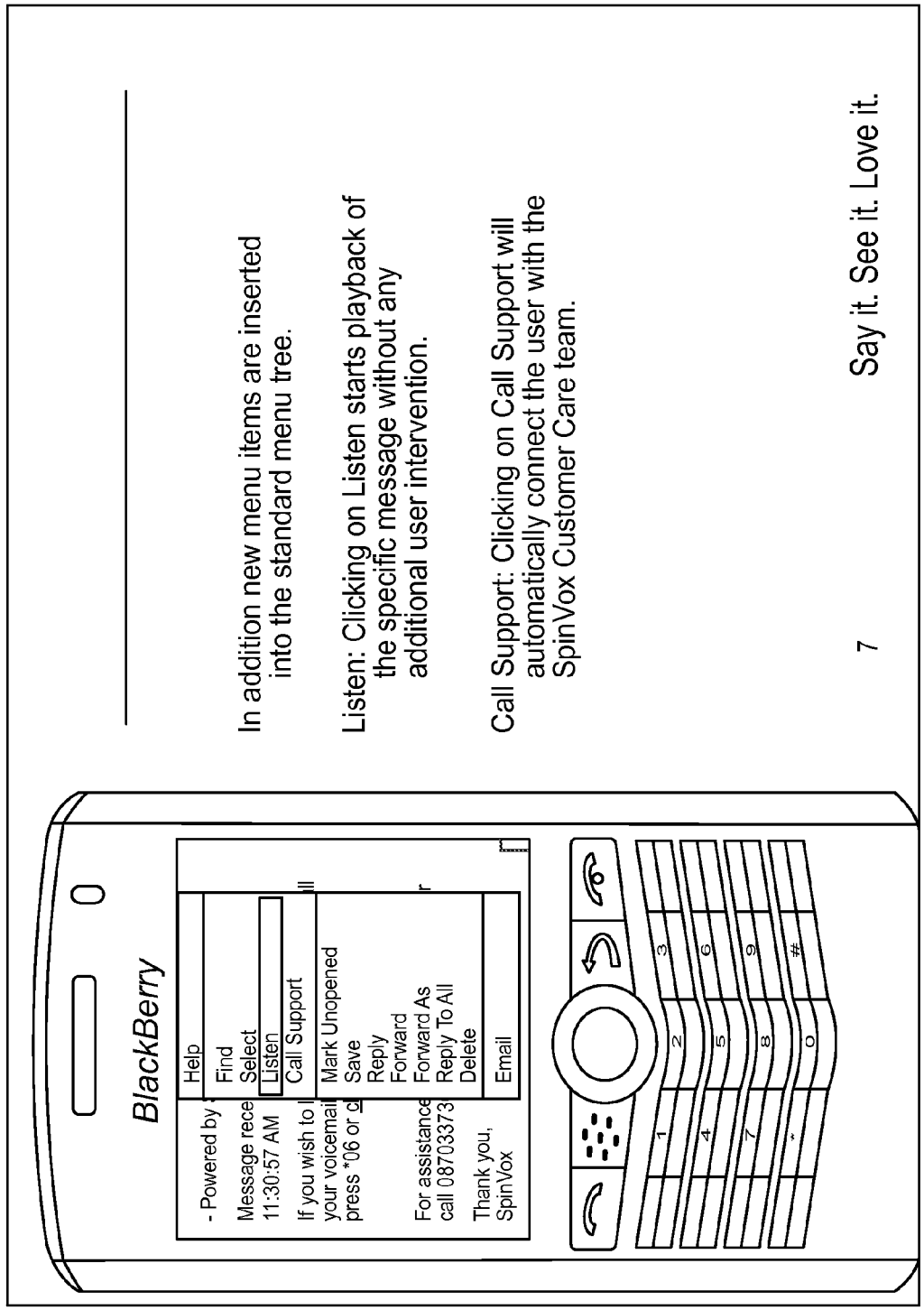
FIG. 39 shows how additional functionality has been added to the device with the inclusion of new menu items.

FIG. 39 shows how additional functionality has been added to the device with the inclusion of new menu items. These new menu items have been embedded into specific places, to ensure their functionality is only shown to the user, when it is of use to them. If it were presented all the time, it would lead to a lot of confusion.

APPENDIX III

Viral/Link Campaigns

This section describes viral or link marketing methods used to spread and market Spinvox products.
Refer a friend (RAFit)
  SpinKey:
    Call your own mobile from your mobile
      We then know you're attempting a special call
      "Please enter your friend's mobile number"
        Type it in, or if a power user, look it up in contacts and hit Call/Send DTMF to us
        "Thank you. Activation codes have been sent to you and your friend"
        This means you have their activation code on screen and can help them through this fuggy process
or . . . .
  Call your voicemail box—new IVR option
  Call 84004 (we're going to get the voice enabled)
  Text your friend's mobile to 84004
    Call your own voicemail box/84004 and leave a message: "Sign up 07812101742"
  SpinDemo:
    Call your own mobile from your mobile
      SV IVR but this time enter * then friend's number, now you speak them a text

APPENDIX IV

Unified Communications

This market, and its derivate Unified Messaging, has tried to unify all of a users' communications into a single in-box for them to manage, typically in email format and accessed from your PC.

The issue is that:
  It's only accessible from one point—your email inbox or a web page meaning you need to be at a particular point in such as your desk, to access your communications. This doesn't help the ever increasing mobile workforce that is estimated to be away from a desk over 50% of their working day.
  Any audio (voice messages) which may now appear as attachments to an email or other format, still require you to listen to them, write down key notes and in effect do the work. In short, it's not transformed into a medium that is synonymous with the task—keyboard, screen, IP based messaging that it came in as. So the user has to be at their PC, listen to messages and do the work of transforming this into say an email reply or notes for a colleague.
  To deploy UC services requires dedicated hardware and software and typically are an expensive IT upgrade cost to deliver and then need maintaining.

SpinVox solves these issues very neatly by converting all voice messages into text and distributing them to any device immediately.
  SpinVox uses existing network services and call management features to unify your voice messages, typically voicemail messages, by either diverting calls to a single voice mail box, or collecting the voicemails from different voicemail boxes. These voice messages are then sent to the SpinVox VMCS for conversion into text. There is no need for any new IT hardware or software or complex systems management.
  For users, there's no need to work through what can be complex decisions on call management or messaging configurations, typically based on time of day and day of week in order to ensure that the caller gets a message to you. By converting any voice message to text, users can instantly receive and see all their messages regardless of where they are and where the message came from—e.g. desk phone, cell phone, switchboard, home phone, etc. . . .
  Once the messages are in text, they are in a format that is now synonymous with the medium in which they are intended to be managed—namely SMS, MMS, email., IP, Web formats. SpinVox can deliver the output text to your email inbox, a web page/service or as a mobile text message in any form. Now the user can choose whether to call or text/mail back or manage this information for colleagues or friends in the format most suited. And because it's in text format, it's immediately indexable and searchable which leverages the power of computers to improve information management and retrieval.
  By undertaking this transform (conversion), SpinVox removes all the existing limitations of UC services and allows the message to not only be delivered to a single point (your inbox/PC), but also as text to any device anywhere solving the 'land-lock' problem of most UC design. This means users can now undertake the key tasks that UC promises, but from wherever they are and at any time.

The reason that unifying voice messages from different sources (mail boxes) makes sense and creates real value is because it the most disparate and difficult for users to access and manage. Email is already largely unified and in a good format for indexing, storage and management, and increasingly accessible from mobile (Blackberry).

Figure 40:
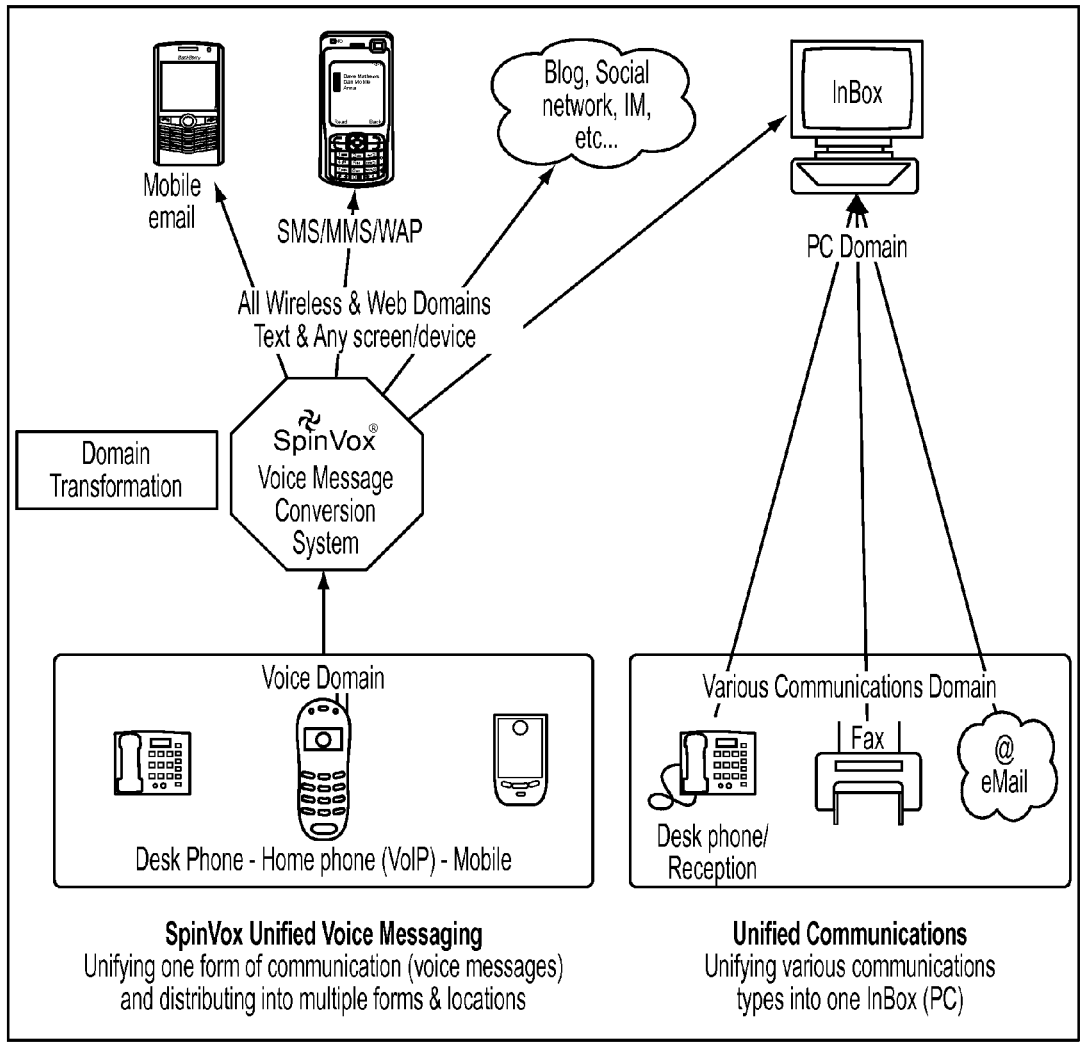
FIG. 40 shows how SpinVox unifies various communications types and channels.

FIG. 40 shows how Spinvox unifies various communications types and channels.

The power of using SpinVox is that you can seamlessly connect for the user (i.e. the UI level) what are traditionally 'disconnected systems' (e.g. voice; blog, SMS, email, etc....) by both standard call management features (diverts/forwards) and by converting the voice message into text, thereby overcoming the technical barriers that would otherwise exist between different communications systems.

APPENDIX V

Voice SMS

SpinVox Voice SMS allows people to speak a voice message and have the recipient notified by SMS, requesting them to then call a number and listen to the message.

The service overcomes issues of language and literacy around text messaging, opening up new revenue streams for wireless Carriers without any additional investment in either infrastructure or handset features. It is more cost-effective and discreet than traditional voicemail, and more expressive than traditional SMS.

SpinVox Voice SMS provides the following end user benefits:
  New, highly personal way to communicate
  (Typically) costs less than a voice conversation
  Easy to use
    Overcomes text usability issues
    Available in all languages
    Does not require literacy
    Less hassle than typing an SMS
  Works with current handsets
  No end user training required
  As there is no barrier to entry, and making a phone call is natural behavior for a wireless user, this product has mass appeal to the entire Carrier user base.

Product Overview

| | |
|---|---|
| Product name | SpinVox Voice SMS |
| Description | Allows a spoken voice message to be deposited from any mobile handset and a notification sent to the recipient by SMS. The recipient can then dial a QuickLink short code to listen to the caller message. |
| Originating Network | GSM and CDMA |
| Terminating Network | GSM and CDMA |

Voice SMS works much like SMS, instead of sending text, callers can easily send voice messages, using expression to convey more information than text alone. For the called party the service is easy to use and adds an emotional dimension to messaging.

A caller simply prefixes a standard mobile number with a short code e.g. *, the service records the voice message and sends an SMS notification to the called party who can then replay the voice message by simply clicking on a QuickLink short code e.g. *3.

SpinVox Voice SMS will generate an incremental sustainable revenue stream for Wireless Carriers without cannibalizing existing services. The availability of Voice SMS creates new situations where people can use messaging, where they would not have thought to use it previously. Subscribers are using Voice SMS to convey more emotional messages in a-way that text-based messaging cannot achieve.

The user experience will be natural and straightforward—the calling party makes a normal voice call, prefixing the mobile number with a short code to initiate a session with the SpinVox Voice SMS platform. The calling party will reach an IVR, which will prompt them to speak their message and then simply select the send option from the IVR.

A typical voice message is expected to be a short duration intentional message. The maximum recording duration will be limited to 30 seconds.

The product must meet the following criteria:
1. No Behaviour Change

In many developing countries literacy levels may be low as well as the inability of the SMS interface to handle local languages—in these cases sending voice instead of text is a more relevant service proposition. Sending and retrieving a Voice SMS must be as simple as making or receiving a normal voice call.

2. Easy & Inexpensive to Deploy

The appeal to Carriers is that service deployment should not require any infrastructure upgrades to their network. The service should be capable of being deployed within 8 weeks.

3. Universal Service Offering

Any customer should be able to use the service on any handset, without the need for any pre-provisioning or handset configuration. This will help drive mass-market penetration across the Carrier's user base.

End-to-End User Experience

Figure 41:
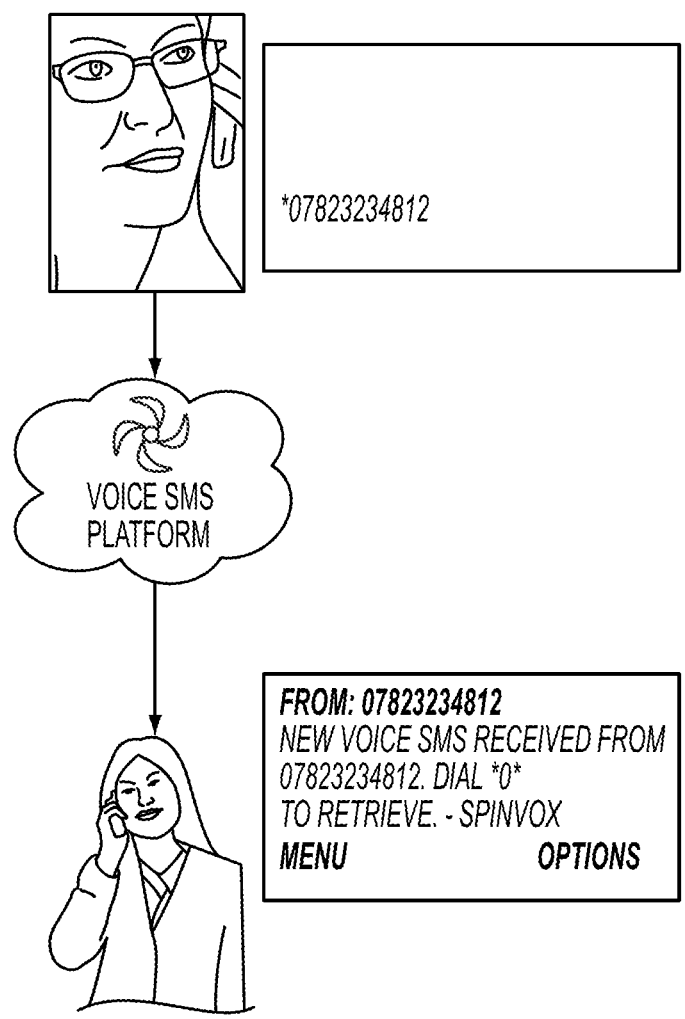
FIG. 41 shows the end-to-end experience of SpinVox Voice SMS service.

FIG. 41 shows the end-to-end experience of SpinVox Voice SMS service:

Caller dials the call prefix, E.G.*, followed by the mobile phone number they wish to send Voice SMS message to an IVR prompt is played requesting the caller to leave their voice message. The caller is then presented with options to send, re-record or cancel their voice SMS.

The voice SMS platform is passed the calling party number, and the dialed digits. An SMS notification is then sent to the called party. Embedded in the text is a Quicklink Short Code.

The called party simply clicks on the Short Code within the text to listen to the voice message.

1. Calling Party Interaction with IVR

It is envisaged there will be minimal interaction between depositing a message and the Voice SMS platform. The calling party will be presented with options to send, re-record or cancel their Voice SMS.

| |
|---|
| Language to use |
| Voice SMS is a standalone integration; it will not require integration with the Carrier voicemail platform. |
| The Voice SMS platform will support multi-lingual prompts in the following languages: |
| Arabic |
| French |
| English |
| Persian |
| Hebrew |
| Standard Chinese |
| Bahasa Indonesia |
| Japanese |
| Korean |
| Fillipino |
| Sinhala |
| Thai |
| Vietnamese |
| Spanish |
| Portuguese |
| Initial voice prompt |
| The calling party will hear the following intro after the Voice SMS service has dialled and connected to the IVR: |
| "Please record your message after the tone" |

-continued

Press 1 to send this Voice SMS
Press 2 to re-record this Voice SMS
Press 3 to cancel this Voice SMS
Message too long prompt If a caller goes over the time allowed to deposit a message they will be prompted to re-record the message or leave the message as is.
End of message warning When the caller is approaching the end of the recording time, a series of beeps shall be played, getting closer together as they get closer to the end of the message prior to Req 1.4 prompting the customer
Forecast The Carrier will provide a volume forecast for SpinVox Voice SMS service
Support Technical support for the SpinVox Voice SMS service will be covered by the support agreement, as outlined in the Carrier contract.
Storage The Voice SMS platform will provide storage of the voice message audio. As standard the audio file will be retained for a period of 5 days.
Audio The sent voice message audio will not be accessible to the calling party 1. SMS Delivery to Recipient When a voice message has been successfully deposited an SMS will be send to the intended recipient. The following requirements cover only this SMS.

SMS to the B Party

The text message must be sent from the original calling party phone number. If this CLI is withheld then 'Withheld' will be presented to the called party.
Message body The body of the message will be specified as part of a new Message Classification template for that Carrier.
Note this will include a SpinVox message tag of 'Spoken through SpinVox'
Message Retrieval - QuickLink Message retrieval will be via a QuickLink short code e.g. *3* will retrieve the $3^{rd}$ message 2. Recipient Interaction with IVR Once the recipient has listened to the voice message they will be presented with a number of additional options to manage their Voice SMS experience. These are outlined below:

Mailbox Configuration

Each Voice SMS recipient will be allocated a virtual mailbox. The Carrier will specify the capacity of this mailbox however it is recommended this is no more than enough for 5 messages for a given time period e.g. 5 days.
IVR - Retrieval of old messages A recipient must be able to listen to old messages stored in their mailbox. LIFO message playback will be used.
IVR - Share the voice SMS A recipient must have the option to forward their Voice SMS to another user. This option will be available from the IVR e.g.
Press 4 to share this Voice SMS
Enter the recipients number followed by the hash key IVR - Deleting voice messages A recipient must have the option to delete a voice message
IVR - Skip to next message A recipient must have the option to skip to the next voice message
IVR - Repeat voice message A recipient must have the option to rewind to the beginning of the current voice message
IVR - Replying to a Voice SMS A recipient must have the following reply options:
Reply to A Party via Voice SMS
Reply to A Party via voice call
IVR - Saving a Voice SMS A recipient will be given the option to save a Voice SMS 3. Service Levels Sign-up requirements The caller should not have to sign up with the Carrier to use this service - all they should have to do is dial a call prefix followed by the recipient number
Compatibility The calling party will require the capability to dial a call prefix number e.g. *
Pricing Depending upon the Carrier pricing model a Voice SMS can be a premium to a standard SMS. As such the calling party may have to be greeted with a pre call announcement advising the cost of Voice SMS delivery.
The Carrier may also include a number of free messages prior to charging.
Service Level The service should meet the same availability requirement as the SpinVox service i.e. 99.99%
Recording time The recording time must be limited to 30 seconds duration.
The caller will be notified via an appropriate voice prompt if they have exceeded the 30 second recording limit.
Number of SMS supported All SMS deliveries should be limited to 1 SMS 4. Carrier Interoperability The SpinVox Voice SMS service must be interoperable with alternative Voice SMS providers thereby enabling a Voice SMS to be sent to recipients regardless of the Carrier service they are using.

Inter-Carrier Interoperability $3^{rd}$ party Carriers should be able to interconnect to the SpinVox Voice SMS service via a SpinVox specified API or through appropriate GSM Association standards
SpinVox-SpinVox Interoperability Interoperability will be available between those Carriers that have solely deployed the SpinVox Voice SMS service
Intra-Carrier Interoperability A single Carrier deploying multiple instances of Voice SMS must be able to interoperate between instances
Commercial A commercial framework will be specified supporting inter-operator accounting

5. Platform Requirements

The service platform must be capable of delivering the Voice SMS as a managed service offering. Carriers must be able to easily introduce new SpinVox services such as SpinVox Messenger and Voicemail to their user base without major changes to infrastructure.

| Record & Playback |
| --- |
| The Voice SMS platform must have the ability to record and playback messages deposited by unique callers |
| Voice Prompts |
| The Voice SMS platform must have the ability to play multi-lingual IVR prompts |
| DTMF Tone Recognition |
| The Voice SMS platform must have the ability to recognize touch tone key presses |
| Platform Availability |
| The Voice SMS platform must support a high availability architecture to ensure a maximum uptime of 99.99% |
| Inter-Carrier Accounting |
| The Voice SMS platform must have the capability to record and report on Inter-Carrier traffic supporting Voice SMS interconnectivity between Carriers |
| SMS Formats |
| The Voice SMS platform must have the ability to construct and format an SMS and interconnect to a Carrier's SMSC infrastructure |

6. Demo

There must be the capability for the Voice SMS product to be demonstrable to the Carrier by SpinVox. The Carrier should also be able to set up a demo of the product for their customers to market the service.

| SpinVox Website - Demo |
| --- |
| It should be possible to demonstrate the Voice SMS service via the SpinVox website |
| Carrier - Demo |
| SpinVox require a way to demonstrate the Voice SMS service to a Carrier as part of the sales process |
| Carrier - Demo charging |
| It should be possible for the Carrier Demo to be free of charge to the caller |
| Carrier - Customer Experience |
| The SpinVox Demo should provide the same customer experience as the Carrier product |

7. Reporting

It will be necessary to report on service activity. The audience for all SpinVox Voice. SMS reporting will be both Internal to SpinVox and external, Carrier facing. Where SpinVox is offering an interconnect capability to specific Carriers then detailed inter-Carrier reports must be provided.

| Reporting requirements |
| --- |
| It must be possible to report on all messages on this service |
| It must be possible to report on the following product metrics. |
| Users by Carrier |
| Traffic by Carrier |
| Average audio length |
| It must be possible to report on the following metrics, where user is defined as the phone number calling the service (i.e. the CLI). |
| Frequency |
| Traffic |
| Average audio length |

8. Billing

| Billing Requirements |
| --- |
| SpinVox must have the billing capability to support pay per message/bundled pricing models |
| Invoicing Requirements |
| It must be possible to invoice the Carrier on a monthly basis for the service |

9. Future Phases

| Future enhancements |
| --- |
| In a future phase, it must be possible to extend the service to fixed line. The following call scenarios will be supported: Fixed line to mobile Fixed line to fixed line Mobile to fixed line Note: a fixed line recipient would receive ringing tone, after lifting the receiver they would hear the voice message |
| In a future phase, it must be possible for the called party to receive Voice SMS delivery via email |
| In a future phase, it must be possible for the caller to send a Voice SMS to multiple recipients (Options include the use of a web portal for setting distribution lists/address book management or through the use of Voice SMS handset application) |
| In a future phase, it must be possible for a caller to send a reserved Voice SMS i.e. at a specified date and time. |

APPENDIX VI

Acronyms

The following is a guide to the normal meaning of the following acronyms.
ACR—anonymous call rejection
AI—artificial intelligence
ASR—automated speech recognition
CLI—caller line identification
CPU—central processing unit
db—database
DDI—direct dial-in
DTMF—dual tone multi frequency
G728—This is specified in ITU-T recommendation G.728, "Coding of speech at 16 kbit/s using low-delay code excited linear prediction".
HTTP—hyper text transfer protocol
IM—instant messaging
IP—internet protocol
ISO—international standards organisation
IVR—interactive voice response
MM—multimedia messaging
MMS—multimedia messaging service
MoBlo—mobile blogging
MSF—mail summary file
MSISDN—mobile station integrated services digital network
N/O—network operator
OTA—over-the-air
p—pause RAS—Repeat Audio Submission
Q—quality
QA—quality assurance
QC—quality control
RAF—refer a friend
ROM—read-only memory
S-Links—spoken links, or smart links
SAT—speak-a-text
SDK—software development toolkit
SIP—simple internet protocol
SLA—software licence agreement
SMPP—short message peer-to-peer
SMS—short message service
SMTP—simple mail transfer protocol
SOAP—Simple Object Access Protocol
SSL—secure sockets layer (a communications protocol)
SV—SpinVox
TAT—turn around time
TLP—transaction layer packet
UI—user interface
UID—unique identifier
URL—uniform resource locator
VAS—value added service
VF—Vodafone
VG—video game
VM2T—voice mail to text
VMCS—voice messaging conversion system
VMP—variational message passing
VoIP—voice over internet protocol
WAP—wireless application protocol

The invention claimed is:

1. A method of communication comprising:
receiving an audio message from a caller to a recipient;
transcribing the audio voice message to produce text;
providing a text message including the text and a link comprising information that links to a conversion system capable of converting speech to text and an identifier indicating a destination for a reply message, such that when the recipient selects the link, the recipient is connected to the conversion system to speak the reply message that is automatically transcribed into a reply text message and provided to the destination associated with the identifier; and
transmitting the text message to a mobile device of the recipient.

2. The method of claim 1 in which the text message is transmitted in a format selected from the group consisting of: SMS, MMS, IM, and e-mail.

3. The method of claim 1, in which the identifier for the destination includes a telephone number, email address, IP address, IM address, and/or VoIP address.

4. The method of claim 1, in which the information that links to the conversion system is a service number.

5. The method of claim 1, in which the information that links to the conversion system comprises selectable text that, when selected, opens a voice channel to enable the reply to be stored for use by the conversion system.

6. The method of claim 1, further comprising:
receiving a communication to connect in response to the recipient selecting the link;
prompting the recipient to provide speech input subsequent to connecting;
receiving speech input from the recipient;
transcribing the speech input from the recipient to text; and
automatically transmitting a text message including the text to the destination identified by the identifier in the link.

7. The method of claim 6, wherein the speech input is transcribed, at least in part, using automatic speech recognition.

8. The method of claim 1, wherein the audio message is transcribed, at least in part, using automatic speech recognition.

9. The method of claim 1, wherein the destination associated with the identifier is a telephone number of the caller.

10. The method of claim 1, wherein the destination associated with the identifier is an electronic address.

11. At least one non-transitory computer readable medium storing instruction that, when executed by at least one processor, performs a method of communication comprising:
receiving an audio message from a caller to a recipient;
transcribing the audio voice message to produce text;
providing a text message including the text and a link comprising information that links to a conversion system capable of converting speech to text and an identifier indicating a destination for a reply message, such that when the recipient selects the link, the recipient is connected to the conversion system to speak the reply message that is automatically transcribed into a reply text message and provided to the destination associated with the identifier; and
transmitting the text message to a mobile device of the recipient.

12. The at least one non-transitory computer readable medium of claim 11, further comprising:
receiving a communication to connect in response to the recipient selecting the link;
prompting the recipient to provide speech input subsequent to connecting;
receiving speech input from the recipient;
transcribing the speech input from the recipient to text; and
automatically transmitting a text message including the text to the destination identified by the identifier in the link.

13. The at least one non-transitory computer readable medium of claim 12, wherein the speech input is transcribed, at least in part, using automatic speech recognition.

14. The at least one non-transitory computer readable medium of claim 11, wherein the audio message is transcribed, at least in part, using automatic speech recognition.

15. The at least one non-transitory computer readable medium of claim 11, wherein the destination associated with the identifier is a telephone number of the caller.

16. The at least one non-transitory computer readable medium of claim 11, wherein the destination associated with the identifier is an electronic address.

17. A system for communication comprising:
a conversion system configured to:
receive an audio message from a caller to a recipient;
transcribe the audio voice message to produce text;
provide a text message including the text and a link comprising information that links to the conversion system capable of converting speech to text and an identifier indicating a destination for a reply message, such that when the recipient selects the link, the recipient is connected to the conversion system to speak the reply message that is automatically transcribed into a reply text message and provided to the destination associated with the identifier; and
transmit the text message to a mobile device of the recipient.

18. The system of claim 17, wherein the conversion system is further configured to:

receive a communication to connect in response to the recipient selecting the link;

prompt the recipient to provide speech input subsequent to connecting;

receive speech input from the recipient;

transcribe the speech input from the recipient to text; and automatically transmit a text message including the text to the destination identified by the identifier in the link.

19. The system of claim 18, wherein the speech input is transcribed, at least in part, using automatic speech recognition.

20. The system of claim 17, further comprising an automatic recognition system and wherein the audio message is transcribed, at least in part, using the automatic speech recognition system.

21. The system of claim 17, wherein the destination associated with the identifier is a telephone number of the caller.

22. The system of claim 17, wherein the destination associated with the identifier is an electronic address.

* * * * *